(12) United States Patent
Bourotte et al.

(10) Patent No.: US 12,509,462 B2
(45) Date of Patent: Dec. 30, 2025

(54) 3-(PHENYLSULFONYL)-[1,2,3]TRIAZOLO[1,5A]QUINAZOLIN-5(4H)-ONE DERIVATIVES

(71) Applicant: BIOVERSYS AG, Basel (CH)

(72) Inventors: Marilyne Bourotte, Perenchies (FR); Michel Pieren, Therwil (CH); Sergio Lociuro, Rancate (CH); Marc Gitzinger, Laufenburg (CH); Christian Kemmer, Riehen (CH); Birgit Schellhorn, Weil am Rhein (DE); Julian Schill, Basel (CH); Peter Schneider, Bottmingen (CH)

(73) Assignee: BIOVERSYS AG, Basel (CH)

( * ) Notice: Subject to any disclaimer, the term of this patent is extended or adjusted under 35 U.S.C. 154(b) by 941 days.

(21) Appl. No.: 17/296,891

(22) PCT Filed: Nov. 27, 2019

(86) PCT No.: PCT/EP2019/082663
§ 371 (c)(1),
(2) Date: May 25, 2021

(87) PCT Pub. No.: WO2020/109350
PCT Pub. Date: Jun. 4, 2020

(65) Prior Publication Data
US 2022/0024928 A1  Jan. 27, 2022

(30) Foreign Application Priority Data
Nov. 28, 2018 (EP) ..................... 18208943

(51) Int. Cl.
| | | |
|---|---|---|
| C07D 487/02 | (2006.01) | |
| A61K 31/5377 | (2006.01) | |
| A61K 45/06 | (2006.01) | |
| A61P 31/04 | (2006.01) | |

(52) U.S. Cl.
CPC ........ *C07D 487/02* (2013.01); *A61K 31/5377* (2013.01); *A61K 45/06* (2013.01); *A61P 31/04* (2018.01)

(58) Field of Classification Search
None
See application file for complete search history.

(56) References Cited

U.S. PATENT DOCUMENTS

| | | |
|---|---|---|
| 8,598,342 B2 | 12/2013 | Kahne et al. |
| 2009/0163545 A1 | 6/2009 | Goldfarb |
| 2015/0057274 A1 | 2/2015 | Anderson et al. |

FOREIGN PATENT DOCUMENTS

| | | |
|---|---|---|
| WO | 2008/045664 A2 | 4/2008 |
| WO | 2009/086303 A2 | 7/2009 |
| WO | 2009/093934 A2 | 7/2009 |
| WO | 2009/151561 A2 | 12/2009 |
| WO | 2013/148813 A2 | 10/2013 |
| WO | 2015/153959 A2 | 10/2015 |

OTHER PUBLICATIONS

CAS Database Registry File for STN Reg No. 1291845-57-2, which was published in the STN registry on May 9, 2011. This file was accessed in the CAS Database on Apr. 18, 2024, https://www.stn.org/. (Year: 2011).*
Katritzky et al. Tautomerism in drug discovery. J Comput Aided Mol Des (2010) 24:475-484. (Year: 2010).*
STN Registry and Caplus for Registry Nos. 1174392-12-1 published 2009; 1221165-83-8 published 2010; 117392-08-5 published 2009. Retrieved from the Internet on Sep. 9, 2024. (Year: 2009).*
International Search Report in PCT/EP2019/082663, mailed Dec. 20, 2019.
Ivachtchenko et al., "Solution phase parallel synthesis of substituted 3-phenylsulfonyl- [1,2,3]triazolo[1,5-a]quinazolines: selective serotonin 5-HT6 receptor antagonists," J Comb Chem. 12(4):445-52 (2010).

(Continued)

*Primary Examiner* — James H Alstrum-Acevedo
*Assistant Examiner* — Lauren Wells
(74) *Attorney, Agent, or Firm* — Biospark Intellectual Property Law

(57) ABSTRACT

The present invention relates to a compound according to formula (I)

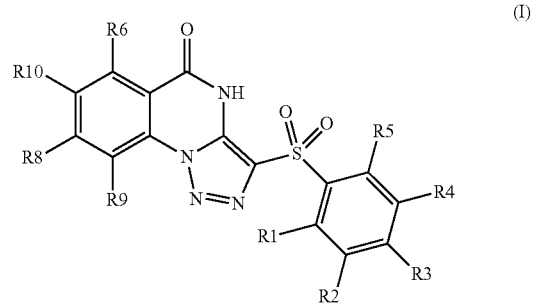

wherein R1 to R9 are as described herein;
and pharmaceutically acceptable salts, stereoisomers, enantiomers, tautomers of the compounds of formula (I) as well as pharmaceutical compositions thereof and their uses in methods of reducing the virulence of bacteria that express AgrA, in methods for preventing or treating diseases caused or exacerbated by bacteria, preferably by *Staphylococcus aureus*, such as skin or lung infections or atopic dermatitis.

18 Claims, 2 Drawing Sheets
Specification includes a Sequence Listing.

(56) References Cited

OTHER PUBLICATIONS

Lee et al., "Development of improved inhibitors of wall teichoic acid biosynthesis with potent activity against *Staphylococcus aureus*," Bioorg Med Chem Lett. 20(5):1767-70 (2010).
Lee et al., Supplementary Data in "Development of improved inhibitors of wall teichoic acid biosynthesis with potent activity against *Staphylococcus aureus*," Bioorg Med Chem Lett. pp. S1-S11 (2010).
Sully et al., "Selective Chemical Inhibition of agr Quorum Sensing in *Staphylococcus aureus* Promotes Host Defense with Minimal Impact on Resistance," PLOS Pathogens 10(6):1-14 (2014).
Dickey et al., "Different drugs for bad bugs: antivirulence strategies in the age of antibiotic resistance," Nat Rev Drug Discov 16(7):457-471 (2017).
Geoghegan et al., "*Staphylococcus aureus* and atopic dermatitis: a complex and evolving relationship," Trends Microbiol 26(6):484-497 (2018).
Gordon et al., "Attenuating *Staphylococcus aureus* Virulence Gene Regulation: A Medicinal Chemistry Perspective," J. Med. Chem. 56(4):1389-404 (2013).
Khan et al., "Investigational therapies targeting quorum-sensing for the treatment of *Staphylococcus aureus* infections," Expert Opin Investig Drugs 24(5):689-704 (2015).
Lee et al., "Methicillin-resistant *Staphylococcus aureus*," Nat Rev Dis Primers, 4(18033) :1-23 (2018).
Mühlen and Dersch, "Anti-virulence strategies to target bacterial infections," Curr Top Microbiol Immunol 398:147-183 (2016).
Oliveira et al., "*Staphylococcus aureus* Toxins and Their Molecular Activity in Infectious Diseases," Toxins 10(6):252 (2018).
Royal Society of Chemistry, ChemSpider Compound Summary for ChemSpider ID 75740504, https://www.chemspider.com/Chemical-Structure.75740504.html?rid=469aee97-90b9-4cbd-a69b-d7b33419829d, (accessed 15:30, Aug. 29, 2024).
SciFinder; Chemical Abstracts Service: Columbus, OH; STN Reg. No. 865657-31-4, STN Reg. No. 866350-25-6, STN Reg. No. 866350-26-7, STN Reg. No. 866870-48-6, STN Reg. No. 892296-01-4, STN Reg. No. 896372-65-9, STN Reg No. 1174392-05-2, STN Reg No. 1174392-06-3, STN Reg No. 1174392-07-4, STN Reg No. 1174392-08-5, (2009), STN Reg No. 1174392-09-6, (2009), STN Reg No. 1174392-10-9, STN Reg No. 1174392-12-1, STN Reg No. 1174392-13-2, STN Reg No. 1174392-63-2, (2009), STN Reg No. 1174392-64-3, (2009), STN Reg No. 1174392-65-4, STN Reg No. 1174392-66-5, (2009), STN Reg No. 1174392-67-6, STN Reg No. 1174392- 73-4, STN Reg No. 1174392-75-6, (2009), STN Reg. No. 1200443-02-2, STN Reg. No. 1221165-83-8, STN Reg. No. 1227262-37-4, STN Reg. No. 1227262-38-5, STN Reg. No. 1227262-39-6, STN Reg. No. 1227262-40-9, STN Reg. No. 1227262-41-0, STN Reg. No. 1227262-42-1, STN Reg. No. 1227262-43-2, STN Reg. No. 1227262-44-3, STN Reg. No. 1227262-45-4, STN Reg. No. 1227262-46-5, STN Reg. No. 1227262-47-6, STN Reg. No. 1227262-48-7, STN Reg. No. 1227262-49-8, STN Reg No. 1227262-50-1, STN Reg No. 1227262-51-2, (2010), STN Reg No. 1227262-52-3, (2010), STN Reg No. 1291873-14-7 https://scifinder.cas.org (accessed Aug. 29, 2024).
CAS Database Registry File for Registry Nos. STN Reg. No. 2163006-04-8 (2017), STN Reg. No. 1291845-57-2 (2011), STN Reg. No. 1227262-41-0 (2010), STN Reg. No. 1174392-09-6, STN Reg. No. 2108948-21-4 (2017), STN Reg. No. 1291873-14-7 (2011), STN Reg. No. 1291871-01-6 (2011), STN Reg. No. 1291852-37-3 (2011), and STN Reg. No. 1174392-73-4 (2009).
National Center for Biotechnology Information, PubChem Compound Summary for CID 6407659, Jul. 14, 2005, https://pubchem.ncbi.nlm.nih.gov/compound/6407659.
STN Registry No. 2325442-06-4. Retrieved from SciFinder (Nov. 14, 2019).

\* cited by examiner

3-(PHENYLSULFONYL)-[1,2,3]TRIAZOLO[1,5A]QUINAZOLIN-5(4H)-ONE DERIVATIVES

The present invention relates to 3-(phenylsulfonyl)-[1,2,3]triazolo[1,5a]quinazolin-5(4H)-one derivatives and pharmaceutical compositions thereof as well as to their uses in methods of reducing the virulence of bacteria that express accessory gene regulator A (AgrA) or an ortholog of AgrA, in methods of inhibition of the quorum sensing in bacteria, preferably in *Staphylococcus aureus*, in methods for preventing or treating diseases caused or exacerbated by bacteria, preferably by *Staphylococcus aureus*, such as skin or lung infections, atopic dermatitis or psoriasis in a subject. Thus, the present invention relates to anti-virulence compositions and methods for treating, amelioration and/or prevention of diseases caused or exacerbated by bacteria, preferably by *Staphylococcus aureus*, and more particular to compositions and methods for reducing the virulence of bacteria that express AgrA or an ortholog of AgrA, preferably AgrA.

RELATED ART

*Staphylococcus aureus* is both a human commensal and a notorious opportunistic pathogen causing serious community-acquired and hospital-acquired infections. *S. aureus* is capable of causing a vast array of infections ranging from mild superficial skin infections to severe systemic life-threatening conditions such as endocarditis, pneumonia or sepsis (Lee A S, et al. (2018) Nat Rev Dis Primers, Vol 4, Article 18033 pp 1-23 (doi:10.1038/nrdp.2018.33). Moreover, *S. aureus* has also been implicated in contributing to allergic skin conditions such as atopic dermatitis (Geoghegan J A, et al. (2018) Trends Microbiol 26(6):484-497). The success of *S. aureus* to cause such a variety of diseases is a consequence of the extensive arsenal of virulence factors produced combined with β-lactam resistance and, for most clones, resistance to other antibiotic classes. Clinically relevant antibiotic resistance has evolved against virtually every antibiotic deployed, while the discovery and development of novel antibiotic classes is lagging behind provoking the antibiotic resistance crisis we are facing today. Consequently, alternative strategies to treat or prevent *S. aureus* mediated bacterial infections that are also efficacious against multidrug-resistant strains, such as the methicillin-resistant *S. aureus* (MRSA), are needed (Dickey S W, et al. (2017) Nat Rev Drug Discov 16(7):457-471).

One of these strategies is the anti-virulence approach by which only virulence-associated, but not survival/fitness-relevant traits are targeted. In contrast to common antibiotic therapies, anti-virulence drugs are not per se bacteriostatic (inhibiting bacterial growth) or bactericidal (killing bacteria). This approach focuses on disarming the pathogenic bacteria by blocking the expression or neutralizing their virulence factors ultimately interfering with bacterial pathogenicity mechanisms and thereby promoting pathogen clearance by the host immune system. Because anti-virulence drugs do not interfere with essential mechanisms of bacterial growth and survival, they are supposed to alleviate the pressure on the pathogen to develop resistance. A further advantage is that specific anti-virulence drugs preserve the healthy host microbiota, and eventually even help to counteract microbial dysbiosis by tuning down the aggressiveness of pathogens such as *S. aureus*. Importantly, anti-virulence approaches offer an increased repository of pharmacological targets, and thus the possibility of generating alternative antimicrobials with novel mode of action (Mühlen S & Dersch P (2016) Curr Top Microbiol Immunol 398:147-183).

How the virulence factors are regulated in *S. aureus*: The agr operon is a bacterial quorum-sensing system that controls cell-density dependent virulence factor expression in *S. aureus*. It consists of two divergent promoters, P2 and P3, where P2 is responsible for producing the components of the quorum-sensing system (AgrB, D, C, A, see FIG. 1). The pre-cursor peptide AgrD is processed by AgrB to form the mature auto-inducing peptide (AIP) that is secreted across the bacterial membrane. AIP binds to the histidine-kinase AgrC and activates the transcriptional regulator AgrA by means of phosphorylation driving the expression from P2 and P3. There are four allelic variants (types I-IV) of agr, each encoding a distinct AIP, which functions as specific ligand for the AgrC of its own cell, but as an inhibitor of other AgrC variants. P3 produces the agr effector molecule RNAIII that together with AgrA is responsible for transcriptional control of approximately 200 genes including multiple virulence factors and metabolic pathways involved in stationary phase growth (Khan B A, et al. (2015) Expert Opin Investig Drugs 24(5):689-704). Examples for AgrA-regulated virulence factors are cell-surface associated proteins, such as protein A (SpA) and fibronectin-binding proteins, secreted toxins such as α-hemolysin/α-toxin (Hla), δ-hemolysin (Hld), phenol-soluble-modulins (PSMs), Panton-Valentine leukocidin (PVL), leukotoxin E and D (LukED), leukotoxin G and H (LukGH), or secreted proteases such as SspA or aureolysin. Taken together, the numerous and multi-functional virulence determinants make *S. aureus* pathogenesis particularly complex and provide the pathogen with an arsenal of mechanisms to damage the host or circumvent and evading the host immune defenses. ImportM to note, most AgrA-regulated virulence factors are causative for the *S. aureus* pathogenicity in skin and soft tissue infections (SSTIs), lung infections, and were also shown to contribute to chronic inflammatory skin diseases, such as atopic dermatitis (Oliveira D et al. (2018) Toxins 10: 252 (doi:10.3390/toxins10060252); Geoghegan J A, et al. (2018) Trends Microbiol 26(6):484-497).

How we could prevent virulence factor expression: Inhibition of expression of the central regulatory RNAIII combined with inhibition of PSMα production is believed to lead to a potent global reduction in levels of virulence factors (see FIG. 1). Current strategies to suppress RNAIII expression can be grouped into different categories (1) competitive inhibitors of histidine kinase AgrC, (2) RNAIII transcription inhibitors (precise mechanisms undetermined) and (3) inhibition of AgrA-P2/P3 interactions. Targeting AgrA has the advantage of blocking AgrA-dependent virulence factor expression on all four agr groups (Gordon C P, et al. (2013) J Med Chem 56(4): 1389-404).

Recently, an AgrA inhibitor termed Savirin was found by Sully and colleagues in a screen of 24'087 compounds selected for inhibition of cyclic thiolactone peptide pheromone (AIP)-induced agr in the context of studies related to acute bacterial skin and soft tissue infections caused by *S. aureus* (Sully E K, et al. (2014) PLoS Pathog 10(6): e1004174). Savirin was shown to be a potent modulator of AgrA-regulated toxin gene transcription such as hla, psmα and pvl across all four agr groups without affecting viability of *S. aureus*. Savirin inhibited exotoxin-induced red blood cell (RBC) lysis. No resistance was developed after multiple passages with Savirin. The molecule was shown to interfere with the AgrA-DNA interaction preventing virulence gene upregulation. A significant reduction in abscess size and dermo necrosis was observed in mice infected with a MRSA USA300 type strain when Savirin was applied multiple times.

Despite the recent findings, there is still an immense need for compounds able to reduce the virulence of bacteria, preferably of *S. aureus*, expressing AgrA and/or to inhibit the quorum sensing in bacteria, preferably in *S. aureus*, thus preventing or treating bacterial infections and/or diseases caused or exacerbated by bacteria, preferably by *S. aureus*, such as skin or lung infections, atopic dermatitis or psoriasis.

SUMMARY OF THE INVENTION

We have now surprisingly identified a novel series of compounds able to interact with AgrA and inhibiting expression of AgrA-regulated virulence factors. In particular, it has been demonstrated by qRT-PCR that the inventive compounds are able to reduce the expression of RNAIII, the most central regulatory RNA that controls expression of most virulence factors, such as α-hemolysin. By qRT-PCR we have demonstrated that the expression of psmα is significantly reduced by the inventive compounds. The inventive compounds reduce the expression of RNAIII and psmα more effectively than Savirin. In addition, incubation of MRSA with the inventive compounds and AgrA inhibitors, respectively, result in prevention of damage of red blood cells (RBCs) monitored by the hemolysis assay. The inventive compounds are more potent in prevention of RBC lysis than Savirin. The inventive compounds are typically not antibacterial and non-cytotoxic to mammalian cells, thus, classifying the inventive compounds as anti-virulence inhibitors, i.e. compounds that modulate the levels of virulence factors of bacteria, preferably *S. aureus*, but do not directly inhibit the growth or kill bacteria.

In a first aspect, the present invention provides a pharmaceutical composition comprising at least one compound according to formula (I)

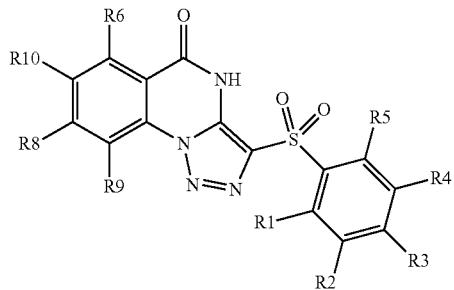

(I)

wherein

R1 and R5 are independently selected from H, halogen, hydroxyl, $NO_2$, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$SO_2$—N(R14)-C(O)—R15; —$C_n$-alkyl-N(R14)-C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3; —O—$C_n$-alkyl-R18 with n=0-3; —OPO(OR10)$_2$, —PO(OR10)$_2$, and a heterocycle optionally substituted by one or more R17;

R3 is selected from halogen, hydroxyl, $NO_2$, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$SO_2$—N(R14)-C(O)—R15; —$C_n$-alkyl-N(R14)-C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3; —O—$C_n$-alkyl-R18 with n=0-3; —OPO(OR10)$_2$, —PO(OR10)$_2$, and a heterocycle optionally substituted by one or more R17;

R2 and R4 are independently selected from H, halogen, $C_1$-$C_6$-alkyl optionally substituted by one or more R11;

R6, R7, R8 and R9 are independently selected from H, halogen, hydroxyl, $NO_2$, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$SO_2$—N(R12)(R13), —$SO_2$—N(R14)-C(O)—R15; —$C_n$-alkyl-N(R14)-C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3; —O—$C_n$-alkyl-R18 with n=0-3; —OPO(OR10)$_2$, —PO(OR10)$_2$, and a heterocycle optionally substituted by one or more R17;

R10 is selected from H and $C_1$-$C_6$-alkyl optionally substituted by one or more R11; said one or more R11 is independently selected from Cl, F and hydroxy;

R12, R13, R14, R15 and R16 are independently selected from H, $C_1$-$C_6$-alkyl optionally substituted by one or more R11, $C_3$-$C_6$-cycloalkyl optionally substituted by one or more R11, —$SO_2$—$C_1$-$C_6$-alkyl optionally substituted by one or more R11, or wherein said R12 and R13 together with the nitrogen to which they are attached form a heterocycle optionally substituted by one or more R17;

said one or more R17 is independently selected from halogen, hydroxy, $NO_2$, CN, —N(R12)(R13), —C(O)—R16, —C(O)—OR16, —$C_n$-alkyl-OR16 with n=0-3, $C_1$-$C_6$-alkyl optionally substituted by one or more R11, and $C_1$-$C_6$-alkoxy optionally substituted by one or more R11;

R18 is selected from —N(R12)(R13), —OR10, —C(O)—R16, —C(O)—OR16, —C(O)—N(R12)(R13), CN, and a heterocycle optionally substituted by one or more R17; and wherein at least one of R1, R2, R4, R5, R6, R7, R8 or R9 is not H;

and pharmaceutically acceptable salts, stereoisomers, enantiomers, tautomers of the compounds of formula (I).

In a further aspect, the present invention provides a compound of formula (I)

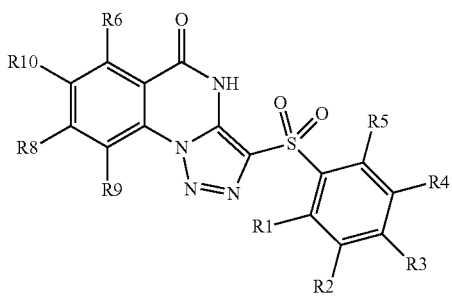

(I)

wherein
R1 and R5 are independently selected from H, halogen, hydroxyl, $NO_2$, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$SO_2$—N(R14)-C(O)—R15; —$C_n$-alkyl-N(R14)-C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3; —O—$C_n$-alkyl-R18 with n=0-3; —OPO(OR10)$_2$, —PO(OR10)$_2$, and a heterocycle optionally substituted by one or more R17;

R3 is selected from halogen, hydroxyl, $NO_2$, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$SO_2$—N(R14)-C(O)—R15; —$C_n$-alkyl-N(R14)-C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3; —O—$C_n$-alkyl-R18 with n=0-3; —OPO(OR10)$_2$, —PO(OR10)$_2$, and a heterocycle optionally substituted by one or more R17;

R2 and R4 are independently selected from H, halogen, $C_1$-$C_6$-alkyl optionally substituted by one or more R11;

R6, R7, R8 and R9 are independently selected from H, halogen, hydroxyl, $NO_2$, CN, $C_1$-$C_6$-alkoxy optionally substituted by one or more R11, $C_1$-$C_6$-alkyl optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$SO_2$—N(R12)(R13), —$SO_2$—N(R14)-C(O)—R15; —$C_n$-alkyl-N(R14)-C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3; —O—$C_n$-alkyl-R18 with n=0-3; —OPO(OR10)$_2$, —PO(OR10)$_2$, and a heterocycle optionally substituted by one or more R17;

R10 is selected from H and $C_1$-$C_6$-alkyl optionally substituted by one or more R11; said one or more R11 is independently selected from Cl, F and hydroxy;

R12, R13, R14, R15 and R16 are independently selected from H, $C_1$-$C_6$-alkyl optionally substituted by one or more R11, $C_3$-$C_6$-cycloalkyl optionally substituted by one or more R11, —$SO_2$—$C_1$-$C_6$-alkyl optionally substituted by one or more R11, or wherein said R12 and R13 together with the nitrogen to which they are attached form a heterocycle optionally substituted by one or more R17;

said one or more R17 is independently selected from halogen, hydroxy, $NO_2$, CN, —N(R12)(R13), —C(O)—R16, —C(O)—OR16, —$C_n$-alkyl-OR16 with n=0-3, $C_1$-$C_6$-alkyl optionally substituted by one or more R11, and $C_1$-$C_6$-alkoxy optionally substituted by one or more R11;

R18 is selected from —N(R12)(R13), —OR10, —C(O)—R16, —C(O)—OR16, —C(O)—N(R12)(R13), CN, and a heterocycle optionally substituted by one or more R17; and wherein at least one of R1, R2, R4, R5, R6, R7, R8 or R9 is not H; and provided that if R3 is methyl and R1 is methyl, then at least one of said R2, R4 to R9 is not H;

if R3 is methyl and R1 is methyl and R5 is methyl, then at least one of said R2, R4, R6 to R9 is not H;

if R3 is methyl and R2 is methyl, then R7 is not Cl;

if R3 is methyl and R7 is Cl, then at least one of R1, R2, R4, R5, R6, R8, R9 is not H; if R3 is methyl and R7 and R8 both are methoxy, then at least one of R1, R2, R4 to R6, R9 is not H;

if R3 is Cl and R7 and R8 both are methoxy, then at least one of R1, R2, R4 to R6, R9 is not H;

if R3 is F and R7 is methyl, then at least one of R1, R2, R4 to R6, R9 is not H;

if R3 is methyl and R2 is methyl, then at least one of R1, R4 to R9 is not H;

if R3 is ethyl and R7 is Cl, then at least one of R1, R2, R4 to R6, R8 to R9 is not H;

if R3 is methoxy and R2 is methoxy, then at least one of R1, R4 to R9 is not H;

if R1 is Cl and R3 is Cl, then at least one of R2, R4 to R9 is not H;

and pharmaceutically acceptable salts, stereoisomers, enantiomers, tautomers of the compounds of formula (I).

Thus, the present invention provides di-, tri- or multi-substituted 3-(phenylsulfonyl)-[1,2,3]triazolo[1,5a]quinazolin-5(4H)-one derivatives, preferably di- and tri-substituted 3-(phenylsulfonyl)-[1,2,3]triazolo[1,5a]quinazolin-5(4H)-one derivatives, wherein beside the 4- or para-position (R3) of the phenyl ring linked to the sulfonyl group, at least one further substituent either on said phenyl ring or on the benzene ring of the quinazoline moiety is present and is not hydrogen.

In a further aspect, the present invention provides a compound according to formula (I) for use in a method of reducing the virulence of bacteria, preferably of bacteria expressing AgrA or an ortho log of AgrA, preferably AgrA, and further preferably of bacteria of the genus selected from *Staphylococcus, Streptococcus* or *Clostridium*, more preferably of *Staphylococcus*, and again further preferably of *Staphylococcus aureus*,

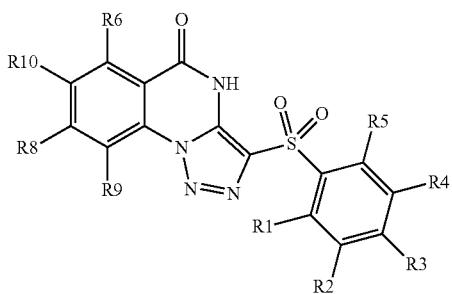

wherein
R1 and R5 are independently selected from H, halogen, hydroxyl, NO$_2$, CN, C$_1$-C$_6$-alkyl optionally substituted by one or more R11, C$_1$-C$_6$-alkoxy optionally substituted by one or more R11, C$_3$-C$_6$-cycloalkyl optionally substituted by one or more R11, —C$_n$-alkyl-N(R12)(R13) with n=0-3, —C$_n$-alkyl-C(O)N(R12)(R13) with n=0-3, —SO$_2$—N(R14)-C(O)—R15; —C$_n$-alkyl-N(R14)-C(O)—R15 with n=0-3, —C$_n$-alkyl-C(O)—OR16 with n=0-3, —O(C$_1$-C$_3$-alkyl-O)$_m$—C$_1$-C$_3$-alkyl-OR10 with m=0-3, —C$_n$-alkyl-OR16 with n=0-3, —NH—C$_n$-alkyl-R18 with n=0-3; —O—C$_n$-alkyl-R18 with n=0-3; —OPO(OR10)$_2$, —PO(OR10)$_2$, and a heterocycle optionally substituted by one or more R17;

R3 is selected from halogen, hydroxyl, NO$_2$, CN, C$_1$-C$_6$-alkyl optionally substituted by one or more R11, C$_1$-C$_6$-alkoxy optionally substituted by one or more R11, C$_3$-C$_6$-cycloalkyl optionally substituted by one or more R11, —C$_n$-alkyl-N(R12)(R13) with n=0-3, —C$_n$-alkyl-C(O)N(R12)(R13) with n=0-3, —SO$_2$—N(R14)-C(O)—R15; —C$_n$-alkyl-N(R14)-C(O)—R15 with n=0-3, —C$_n$-alkyl-C(O)—OR16 with n=0-3, —O(C$_1$-C$_3$-alkyl-O)$_m$—C$_1$-C$_3$-alkyl-OR10 with m=0-3, —C$_n$-alkyl-OR16 with n=0-3, —NH—C$_n$-alkyl-R18 with n=0-3; —O—C$_n$-alkyl-R18 with n=0-3; —OPO(OR10)$_2$, —PO(OR10)$_2$, and a heterocycle optionally substituted by one or more R17;

R2 and R4 are independently selected from H, halogen, C$_1$-C$_6$-alkyl optionally substituted by one or more R11;

R6, R7, R8 and R9 are independently selected from H, halogen, hydroxyl, NO$_2$, CN, C$_1$-C$_6$-alkyl optionally substituted by one or more R11, C$_1$-C$_6$-alkoxy optionally substituted by one or more R11, C$_3$-C$_6$-cycloalkyl optionally substituted by one or more R11, —C$_n$-alkyl-N(R12)(R13) with n=0-3, —C$_n$-alkyl-C(O)N(R12)(R13) with n=0-3, —SO$_2$—N(R12)(R13), —SO$_2$—N(R14)-C(O)—R15; —C$_n$-alkyl-N(R14)-C(O)—R15 with n=0-3, —C$_n$-alkyl-C(O)—OR16 with n=0-3, —O(C$_1$-C$_3$-alkyl-O)$_m$—C$_1$-C$_3$-alkyl-OR10 with m=0-3, —C$_n$-alkyl-OR16 with n=0-3, —NH—C$_n$-alkyl-R18 with n=0-3; —O—C$_n$-alkyl-R18 with n=0-3; —OPO(OR10)$_2$, —PO(OR10)$_2$, and a heterocycle optionally substituted by one or more R17;

R10 is selected from H and C$_1$-C$_6$-alkyl optionally substituted by one or more R11; said one or more R11 is independently selected from Cl, F and hydroxy;

R12, R13, R14, R15 and R16 are independently selected from H, C$_1$-C$_6$-alkyl optionally substituted by one or more R11, C$_3$-C$_6$-cycloalkyl optionally substituted by one or more R11, —SO$_2$—C$_1$-C$_6$-alkyl optionally substituted by one or more R11, or wherein said R12 and R13 together with the nitrogen to which they are attached form a heterocycle optionally substituted by one or more R17;

said one or more R17 is independently selected from halogen, hydroxy, NO$_2$, CN, —N(R12)(R13), —C(O)—R16, —C(O)—OR16, —C$_n$-alkyl-OR16 with n=0-3, C$_1$-C$_6$-alkyl optionally substituted by one or more R11, and C$_1$-C$_6$-alkoxy optionally substituted by one or more R11;

R18 is selected from —N(R12)(R13), —OR10, —C(O)—R16, —C(O)—OR16, —C(O)—N(R12)(R13), CN, and a heterocycle optionally substituted by one or more R17; and wherein at least one of R1, R2, R4, R5, R6, R7, R8 or R9 is not H;

and pharmaceutically acceptable salts, stereoisomers, enantiomers, tautomers of the compounds of formula (I).

In a further aspect, the present invention provides a compound according to formula (I) for use in a method of preventing or treating a disease, preferably an infection or an inflammatory disease, further preferably a bacterial infection or an inflammatory skin disease, caused or exacerbated by bacteria, wherein preferably said bacteria is selected from the genus of *Staphylococcus, Streptococcus* or *Clostridium*, more preferably of *Staphylococcus*, and again further preferably wherein said bacteria is *Staphylococcus aureus*,

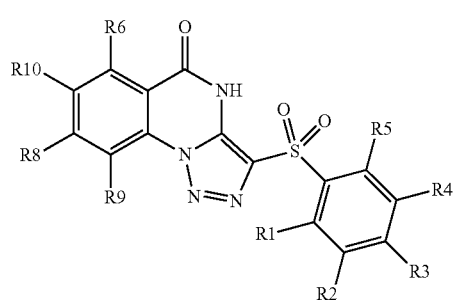

wherein
R1 and R5 are independently selected from H, halogen, hydroxyl, NO$_2$, CN, C$_1$-C$_6$-alkyl optionally substituted by one or more R11, C$_1$-C$_6$-alkoxy optionally substituted by one or more R11, C$_3$-C$_6$-cycloalkyl optionally substituted by one or more R11, —C$_n$-alkyl-N(R12)(R13) with n=0-3, —C$_n$-alkyl-C(O)N(R12)(R13) with n=0-3, —SO$_2$—N(R14)-C(O)—R15; —C$_n$-alkyl-N(R14)-C(O)—R15 with n=0-3, —C$_n$-alkyl-C(O)—OR16 with n=0-3, —O(C$_1$-C$_3$-alkyl-O)$_m$—C$_1$-C$_3$-alkyl-OR10 with m=0-3, —C$_n$-alkyl-OR16 with n=0-3, —NH—C$_n$-alkyl-R18 with n=0-3; —O—C$_n$-alkyl-R18 with n=0-3; —OPO(OR10)$_2$, —PO(OR10)$_2$, and a heterocycle optionally substituted by one or more R17;

R3 is selected from halogen, hydroxyl, NO$_2$, CN, C$_1$-C$_6$-alkyl optionally substituted by one or more R11, C$_1$-C$_6$-alkoxy optionally substituted by one or more R11, C$_3$-C$_6$-cycloalkyl optionally substituted by one or more R11, —C$_n$-alkyl-N(R12)(R13) with n=0-3, —C$_n$-alkyl-C(O)N(R12)(R13) with n=0-3, —SO$_2$—N(R14)-C(O)—R15; —C$_n$-alkyl-N(R14)-C(O)—R15 with n=0-3, —C$_n$-alkyl-C(O)—OR16 with n=0-3, —O(C$_1$-C$_3$-alkyl-O)$_m$—C$_1$-C$_3$-alkyl-OR10 with m=0-3, —C$_n$-alkyl-OR16 with n=0-3, —NH—C$_n$-alkyl-R18 with n=0-3; —O—C$_n$-alkyl-R18 with n=0-3; —OPO (OR10)$_2$, —PO(OR10)$_2$, and a heterocycle optionally substituted by one or more R17;

R2 and R4 are independently selected from H, halogen, C$_1$-C$_6$-alkyl optionally substituted by one or more R11;

R6, R7, R8 and R9 are independently selected from H, halogen, hydroxyl, NO$_2$, CN, C$_1$-C$_6$-alkyl optionally substituted by one or more R11, C$_1$-C$_6$-alkoxy optionally substituted by one or more R11, C$_3$-C$_6$-cycloalkyl optionally substituted by one or more R11, —C$_n$-alkyl-N(R12)(R13) with n=0-3, —C$_n$-alkyl-C(O)N(R12)(R13) with n=0-3, —SO$_2$—N(R12)(R13), —SO$_2$—N(R14)-C(O)—R15; —C$_n$-alkyl-N(R14)-C(O)—R15 with n=0-3, —C$_n$-alkyl-C(O)—OR16 with n=0-3, —O(C$_1$-C$_3$-alkyl-O)$_m$—C$_1$-C$_3$-alkyl-OR10 with m=0-3, —C$_n$-alkyl-OR16 with n=0-3, —NH—C$_n$-alkyl-R18 with n=0-3; —O—C$_n$-alkyl-R18 with n=0-3; —OPO(OR10)$_2$, —PO(OR10)$_2$, and a heterocycle optionally substituted by one or more R17;

R10 is selected from H and C$_1$-C$_6$-alkyl optionally substituted by one or more R11;

said one or more R11 is independently selected from Cl, F and hydroxy;

R12, R13, R14, R15 and R16 are independently selected from H, C$_1$-C$_6$-alkyl optionally substituted by one or more R11, C$_3$-C$_6$-cycloalkyl optionally substituted by one or more R11, —SO$_2$—C$_1$-C$_6$-alkyl optionally substituted by one or more R11, or wherein said R12 and R13 together with the nitrogen to which they are attached form a heterocycle optionally substituted by one or more R17;

said one or more R17 is independently selected from halogen, hydroxy, NO$_2$, CN, —N(R12)(R13), —C(O)—R16, —C(O)—OR16, —C$_n$-alkyl-OR16 with n=0-3, C$_1$-C$_6$-alkyl optionally substituted by one or more R11, and C$_1$-C$_6$-alkoxy optionally substituted by one or more R11;

R18 is selected from —N(R12)(R13), —OR10, —C(O)—R16, —C(O)—OR16, —C(O)—N(R12)(R13), CN, and a heterocycle optionally substituted by one or more R17; and wherein at least one of R1, R2, R4, R5, R6, R7, R8 or R9 is not H;

and pharmaceutically acceptable salts, stereoisomers, enantiomers, tautomers of the compounds of formula (I).

Further aspects and embodiments of the present invention will be become apparent as this description continues.

DETAILED DESCRIPTION OF THE INVENTION

Figure 1:
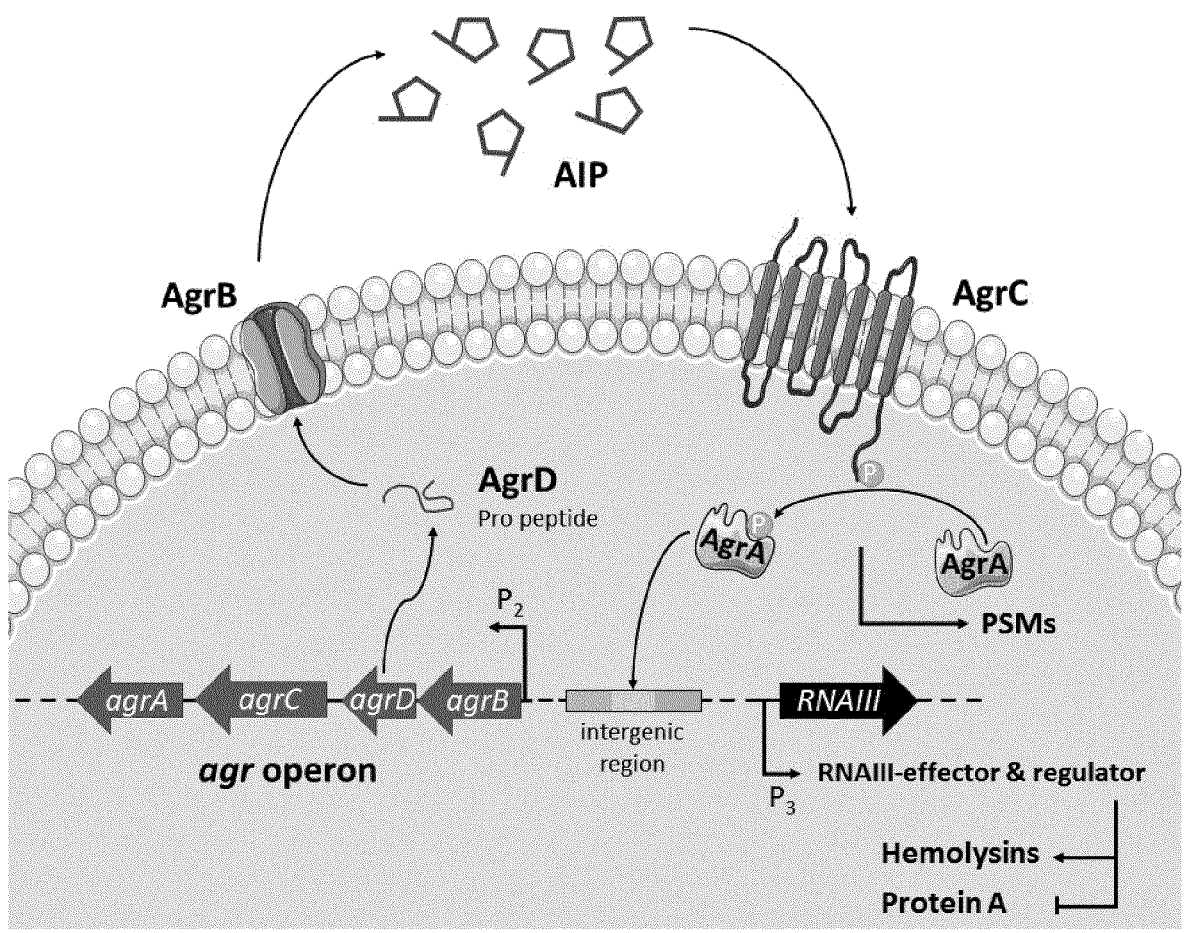
FIG. 1 shows quorum sensing signaling in staphylococci to control virulence factor production. The pre-cursor peptide AgrD is processed by AgrB and the mature auto-inducing peptide (AIP) is secreted across the bacterial membrane. AIP binds to the histidine-kinase AgrC of its own cell or on other bacterial cells. AgrC then activates response regulator AgrA by means of phosphorylation. Phospho-AgrA binds to and activates transcription from the agr P2 and P3 promoters, as well as the promoters of the psm operons (RNAIII-independent AgrA regulation). The classic targets of AgrA are under RNAIII-dependent control, comprising several toxins and proteases that are up- and several surface-binding proteins such as protein A, that are down-regulated. Small molecule inhibitors that bind to the DNA-binding domain of AgrA prevent the binding to P2 and P3 promoter, thus blocking continuous production of AIP (P2 driven) and virulence factors (P3 driven) but also block expression of RNAIII-independent AgrA regulation such as production of PSMs.

Unless defined otherwise, all technical and scientific terms used herein have the same meanings as commonly understood by one of ordinary skill in the art to which this invention belongs. The herein described and disclosed embodiments, preferred embodiments and very preferred embodiments should apply to all aspects and other embodiments, preferred embodiments and very preferred embodiments irrespective of whether is specifically again referred to or its repetition is avoided for the sake of conciseness.

The articles "a" and "an", as used herein, refer to one or to more than one (i.e., to at least one) of the grammatical object of the article. The term "or", as used herein, should be understood to mean "and/or", unless the context clearly indicates otherwise.

"C$_1$-C$_6$-alkyl", as used herein, refers to straight chain or branched C$_1$-C$_6$-alkyl, i.e. containing 1, 2, 3, 4, 5 or 6 carbon atoms, which may be, for example, methyl, ethyl, n-propyl, isopropyl, n-butyl, isobutyl, sec-butyl, tert-butyl, straight or branched pentyl, straight or branched hexyl. Preferred C$_1$-C$_6$-alkyls are C$_1$-C$_4$-alkyls, and further preferably C$_1$-C$_3$-alkyls.

"C$_n$-alkyl", as used herein, refers—depending on the value of n—to a bond if n=0, or to a straight or branched hydrocarbon chain if n is not 0 and, thus, C$_n$-alkyl refers to a straight chain or branched hydrocarbon as defined in C$_1$-C$_6$-alkyl.

"C$_1$-C$_6$-alkoxy", as used herein, refers to a "substituted hydroxyl" of the formula (—OR'), wherein R' is an optionally substituted C$_1$-C$_6$-alkyl, as defined herein, and the oxygen moiety is directly attached to the parent molecule, and thus the term "C$_1$-C$_6$-alkoxy", as used herein, refers to straight chain or branched C$_1$-C$_6$-alkoxy which may be, for example, methoxy, ethoxy, n-propoxy, isopropoxy, n-butoxy, isobutoxy, sec-butoxy, tert-butoxy, straight or branched pentoxy, straight or branched hexyloxy. Preferred C$_1$-C$_8$-alkoxys are C$_1$-C$_4$alkoxys.

"Halogen", as used herein, refers to fluorine (fluoro, —F), chlorine (chloro, —Cl), bromine (bromo, —Br), and iodine (iodo, —I). Preferably it refers to fluorine, chlorine or bromine. This also applies, correspondingly, to halogen in combination with other meanings, such as haloalkyl.

"C$_1$-C$_6$-haloalkyl", as used herein, refers to C$_1$-C$_6$-alkyl as hereinbefore defined substituted by one or more halogen atoms, preferably one, two or three halogen atoms, preferably fluorine or chlorine atoms. Preferably, C$_1$-C$_8$-haloalkyl is C$_1$-C$_4$-alkyl substituted by one, two or three fluorine or chlorine atoms. Preferred examples include difluoromethyl, trifluoromethyl, chlorodifluoromethyl and 2,2,2-trifluoroethyl, most preferably trifluoromethyl.

The term "cycloalkyl", as used herein, refers to a mono- or bi-cyclic form, typically and preferably to a mono-cyclic form, and preferably contains 3 to 8 carbon atoms, more preferably 3 to 6 carbon atoms. Specific and preferred examples of monocyclic cycloalkyl groups include cyclopropyl, cyclobutyl and cyclohexyl. Thus, the term "$C_3$-$C_6$cycloalkyl", as used herein, refers to a monocyclic form containing 3 to 6 carbon atoms and specifically to cyclopropyl, cyclobutyl, cyclopentyl or cyclohexyl.

The term "aryl", as used herein, refers to a $C_6$-$C_{14}$ monocyclic or polycyclic aryl such as phenyl or naphthyl, anthranyl or phenanthryl, preferably to a $C_6$-$C_{14}$ monocyclic aryl, and most preferably to phenyl.

The term "heterocycle", as used herein, refers to an aromatic, partially saturated or fully saturated 4- to 14-membered ring system comprising 1 to 4 hetero atoms selected from nitrogen, oxygen and sulfur, with the proviso that each ring system cannot contain more than 2 oxygen atoms and more than 2 sulfur atoms. A heterocycle, as used herein, may be a single ring or two or more fused rings wherein at least one ring contains a heteroatom. Preferably, the term "heterocycle", as used herein, refers to an aromatic, partially saturated or fully saturated 5- to 7-membered, preferably 4-6 membered, single ring system comprising 1 to 4 hetero atoms selected from nitrogen, oxygen and sulfur, with the proviso that each ring system cannot contain more than 2 oxygen atoms and more than 2 sulfur atoms. Typical and preferred examples of monocyclic aromatic heterocycle of the present invention include pyridyl, pyrazinyl, pyrimidinyl, pyridazinyl, furyl, oxadiazolyl, oxazolyl, imidazolyl, thiazolyl, thiadiazolyl, thienyl, pyrane, pyrrolyl, pyridinyl, triazolyl, tetrazoyl, imidazolidinyl and pyrazolyl. Typical and preferred examples of monocyclic partially saturated or fully saturated heterocycle of the present invention include azetidine, oxetane, dioxolane, pyrrolidine, pyrrolidine-2-one, piperidine, morpholine, piperazine, homopiperazine, tetrahydropyrane.

Where a group is said to be optionally substituted, preferably there are optionally 1-5 substituents, more preferably optionally 1-3 substituents, again more preferably optionally 1 or 2 substituents, and most preferably optionally 1 substituent. Where a group is said to be optionally substituted, and where there is more than one substituent for said optional substitution of said group, said more than one substituent can either be the same or different.

The term "ortholog", as used herein, denotes the well-known meaning of this term. In this art, ortho logs are genes in different species which evolved from a common ancestral gene. Due to their separation following a speciation event, orthologs may diverge, but usually have similarity at the sequence and structure levels; furthermore, orthologs usually have identical functions. Orthology is a type of homology. In this application, the term ortholog is used to include the ortho log gene (DNA or RNA) or the peptide/protein product of the ortholog. Sometimes the peptide/protein product of the ortholog is referred to as "ortholog product' or simply "ortholog". The meaning is evident from the context (e.g., an anti-virulence compositions of the present invention may include an anti-virulence agent capable of reducing the virulence of bacterium that expresses peptides or proteins that may be referred to as orthologs of AgrA—that is, products of an ortholog gene of *Staphylococcus aureus* AgrA from another bacterium, such as *Streptococcus pyogenes*). In certain aspects, an ortho log of AgrA produces proteins/peptides that share greater than about 70%, about 80%, or about 90% identity with the amino acid sequence of the gene product of AgrA.

The terms "reducing" and "inhibiting" have their commonly understood meaning of lessening or decreasing.

The expression "reducing the virulence of bacteria that express AgrA", as used herein, typically and preferably, refers to inhibiting the synthesis of one or more virulence factors by said bacteria by the inventive compounds of formula (I) or the inventive compositions, preferably pharmaceutical compositions, comprising an inventive compound of formula (I). Examples for AgrA-regulated virulence factors are cell-surface associated proteins, such as protein A (SpA) and fibronectin-binding proteins, secreted toxins such as α-hemolysin/α-toxin (Hla), δ-hemolysin (Hld), phenol-soluble-modulins (PSMs), Panton-Valentine leukocidin (PVL), leukotoxin E and D (LukED), leukotoxin G and H (LukGH) or secreted proteases such as SspA or aureolysin. In a preferred example and embodiment of the present invention, said reducing the virulence of bacteria that express AgrA is inhibiting the synthesis of one or more virulence factor selected from PSMα, RNAIII and its downstream targets. In a preferred example and embodiment of the present invention, said reducing the virulence of bacteria that express AgrA is inhibiting the synthesis of PSMα. In a preferred example and embodiment of the present invention, said reducing the virulence of bacteria that express AgrA is inhibiting the synthesis of RNAIII and/or its downstream targets, preferably of RNAIII.

The term "inhibiting the synthesis of one or more virulence factors" as used herein shall refer to a complete or partial inhibition (preferably more than 20%, further preferably more than 30%, further preferably more than 50%, further preferably more than 90%, still more preferably more than 95% or even more than 99%) of the synthesis of one or more virulence factors, as compared to the synthesis of one or more virulence factors by said bacteria in the absence of the inventive compounds of formula (I) or the inventive compositions, preferably pharmaceutical compositions, comprising an inventive compound of formula (I) or as compared to an inventive method where no such inventive compounds of formula (I) or the inventive compositions, preferably pharmaceutical compositions, comprising an inventive compound of formula (I) are applied or used.

Virulence factors as contemplated herein include any molecules expressed and secreted by bacteria to promote colonization and/or adhesion in a host subject, promote inflammation in the host tissue, promote evasion of the host's immune response and obtain nutrition from the host subject. Virulence factors can also include both exotoxins and endotoxins. Non-limiting examples of virulence factors inhibited by an inventive compound of formula (I) or an inventive composition, preferably an inventive pharmaceutical composition, comprising an inventive compound of formula (I), as described herein, include one or more of toxins (e.g., α, β, γ, γ-variant, and δ-hemolysins, PSMs (e.g., PSMα), Panton-Valentine leukocidin (PVL), leukotoxin E and D (LukED), leukotoxin G and H (LukGH), enterotoxins (e.g., enterotoxin B), exfoliative toxin), proteases (e.g., serine proteases, metalloproteases and cysteine proteases), nuclease, lipase, coagulase, hyaluronidase, fibronectin-binding protein, clumping factor, pyrogenic toxin superantigen (e.g., TSST-1). In a preferred embodiment, the virulence factor inhibited is RNAIII and/or its downstream targets or PSMα.

The anti-virulence drugs can be combined with therapeutic agents such as antibiotics typically and preferably used for prevention and treatment of infections caused by bacteria such as *Staphylococcus*, primarily by *Staphylococcus aureus*.

The anti-virulence drugs can be combined with therapeutic agents typically and preferably used for prevention and treatment of chronic inflammatory skin disease (e.g., atopic dermatitis) which are exacerbated by bacteria such as *Staphylococcus*, primarily by *Staphylococcus aureus*.

The term "antibiotic", as used herein, refers to an antimicrobial agent or anti-infective that kills bacteria (bactericidal antibiotics) or inhibits growth and/or metabolism of bacteria (bacteriostatic antibiotics). Antibiotics are well-known to the skilled person in the art, and specific and preferred examples thereof include penicillins, cephalosporins, polymyxins, rifamycins, lipiarmycins, quinolones, sulfonamides, macrolides, oxazolidinones, lincosamides and tetracyclines.

The term "treating", "treatment" or "therapy" as used herein refers to means of obtaining a desired physiological effect. The effect may be therapeutic in terms of partially or completely curing a disease or a condition and/or symptoms attributed to the disease or the condition. The term refers to inhibiting the disease or condition, i.e. arresting its development; or ameliorating the disease or condition, i.e. causing regression of the disease or condition.

The term "prevention" as used herein refers to means of preventing or delaying the onset of disease or condition and/or symptoms attributed to the disease or condition.

The inventive compound of formula (I), the inventive pharmaceutical composition comprising an inventive compound of formula (I), as described herein, can be used in preventative and therapeutic treatments of a disease, preferably an infection or an inflammatory disease, further preferably a bacterial infection or an inflammatory skin disease, caused or exacerbated by bacteria, wherein preferably said bacteria is selected from the genus of *Staphylococcus, Streptococcus* or *Clostridium*, more preferably of *Staphylococcus*, and again further preferably wherein said bacteria is *Staphylococcus aureus*

As used herein, the terms "subject" or "animal" or "patient" or "mammal," refers to any subject, particularly a mammalian subject, for whom diagnosis, prognosis, prophylaxis or therapy is desired, for example, a human or a domesticated mammal such as a dog, cat or horse or a food animal such as a cow or sheep or pig, preferably to a human. Thus, in a preferred embodiment of the present invention, said subject is a human.

The terms "pharmaceutically acceptable" or "therapeutically acceptable" refers to a substance which does not interfere with the effectiveness or the biological activity of the active ingredients and which is not toxic to the host.

"Pharmaceutically acceptable salt" of a compound of formula (I) means a salt that is pharmaceutically acceptable and that possesses the desired pharmacological activity of the parent compound. For example, the salt can be an acid addition salt. One embodiment of an acid addition salt is a hydrochloride salt. The pharmaceutically acceptable salts can be synthesized from a parent compound that contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two; generally, non-aqueous media like ether, ethyl acetate, ethanol, isopropanol, or acetonitrile being preferred. Lists of salts are found in Remington's Pharmaceutical Sciences, 18th ed. (Mack Publishing Company, 1990).

As used herein, the term "for use" as used in "composition for use in treatment or prevention of a disease" shall disclose also the corresponding method of treatment or prevention and the corresponding use of a preparation for the manufacture of a medicament for the treatment or prevention of a disease".

A "therapeutically effective amount" or "effective amount" is the amount of a compound or pharmaceutical composition in accordance with the present invention that will elicit the biological or medical response of a subject, preferably a human subject that is being sought by the researcher, veterinarian, medical doctor or other clinician. The term "therapeutic administration", as used herein, should refer to the administration of therapeutically effective amount. In particular, the terms "effective", "effective amount", and "therapeutically effective amount", as used herein, typically and preferably, refer to that amount of an inventive compounds of formula (I) or an inventive composition, preferably an inventive pharmaceutical composition, comprising an inventive compound of formula (I) that reduces the virulence of a bacterium or that results in amelioration of symptoms or a prolongation of survival in a subject with a bacteria related disease or disorder. The term "effective amount" is used generically herein to refer to the amount of a given compound or in case of a mixture the combined amount of mixture components that provides a measurable effect for a listed function. It will be understood by one of ordinary skill in the art, that for a given application, the effective amount can be determined by application of routine experimentation and without undue experimentation by methods that are described herein or that are known in the art. The term "therapeutically effective amount" is used generically herein to refer to the amount of a given compound or in case of a mixture the combined amount of mixture components when administered to the individual including a human or non-human animal, that provides a measurable therapeutic effect for a listed disease, disorder or condition to at least partially ameliorate a symptom of such disease, disorder or condition. The result of treatment can be partially or completely alleviating, inhibiting, preventing, ameliorating and/or relieving the disorder, condition or one or more symptoms thereof.

In a first aspect, the present invention provides a compound of formula (I)

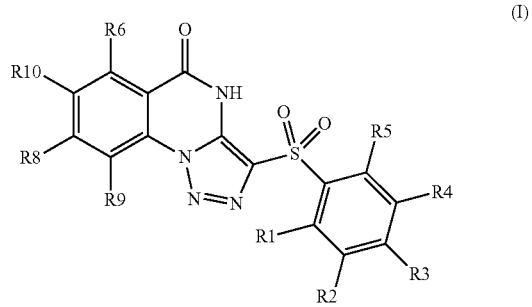

(I)

wherein

R1 and R5 are independently selected from H, halogen, hydroxyl, $NO_2$, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$SO_2$—N(R14)-C(O)—R15; —$C_n$-alkyl-N(R14)-C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—C$_n$-alkyl-R18 with n=0-3; —O—C$_n$-alkyl-R18 with n=0-3; —OPO(OR10)$_2$, —PO(OR10)$_2$, and a heterocycle optionally substituted by one or more R17;

R3 is selected from halogen, hydroxyl, NO$_2$, CN, C$_1$-C$_6$-alkyl optionally substituted by one or more R11, C$_1$-C$_6$-alkoxy optionally substituted by one or more R11, C$_3$-C$_6$-cycloalkyl optionally substituted by one or more R11, —C$_n$-alkyl-N(R12)(R13) with n=0-3, —C$_n$-alkyl-C(O)N(R12)(R13) with n=0-3, —SO$_2$—N(R14)-C(O)—R15; —C$_n$-alkyl-N(R14)-C(O)—R15 with n=0-3, —C$_n$-alkyl-C(O)—OR16 with n=0-3, —O(C$_1$-C$_3$-alkyl-O)$_m$—C$_1$-C$_3$-alkyl-OR10 with m=0-3, —C$_n$-alkyl-OR16 with n=0-3, —NH—C$_n$-alkyl-R18 with n=0-3; —O—C$_n$-alkyl-R18 with n=0-3; —OPO(OR10)$_2$, —PO(OR10)$_2$, and a heterocycle optionally substituted by one or more R17;

R2 and R4 are independently selected from H, halogen, C$_1$-C$_6$-alkyl optionally substituted by one or more R11;

R6, R7, R8 and R9 are independently selected from H, halogen, hydroxyl, NO$_2$, CN, C$_1$-C$_6$-alkyl optionally substituted by one or more R11, C$_1$-C$_6$-alkoxy optionally substituted by one or more R11, C$_3$-C$_6$-cycloalkyl optionally substituted by one or more R11, —C$_n$-alkyl-N(R12)(R13) with n=0-3, —C$_n$-alkyl-C(O)N(R12)(R13) with n=0-3, —SO$_2$—N(R12)(R13), —SO$_2$—N(R14)-C(O)—R15; —C$_n$-alkyl-N(R14)-C(O)—R15 with n=0-3, —C$_n$-alkyl-C(O)—OR16 with n=0-3, —O(C$_1$-C$_3$-alkyl-O)$_m$—C$_1$-C$_3$-alkyl-OR10 with m=0-3, —C$_n$-alkyl-OR16 with n=0-3, —NH—C$_n$-alkyl-R18 with n=0-3; —O—C$_n$-alkyl-R18 with n=0-3; —OPO(OR10)$_2$, —PO(OR10)$_2$, and a heterocycle optionally substituted by one or more R17;

R10 is selected from H and C$_1$-C$_6$-alkyl optionally substituted by one or more R11;

said one or more R11 is independently selected from Cl, F and hydroxy;

R12, R13, R14, R15 and R16 are independently selected from H, C$_1$-C$_6$-alkyl optionally substituted by one or more R11, C$_3$-C$_6$-cycloalkyl optionally substituted by one or more R11, —SO$_2$—C$_1$-C$_6$-alkyl optionally substituted by one or more R11, or wherein said R12 and R13 together with the nitrogen to which they are attached form a heterocycle optionally substituted by one or more R17;

said one or more R17 is independently selected from halogen, hydroxy, NO$_2$, CN, —N(R12)(R13), —C(O)—R16, —C(O)—OR16, —C$_n$-alkyl-OR16 with n=0-3, C$_1$-C$_6$-alkyl optionally substituted by one or more R11, and C$_1$-C$_6$-alkoxy optionally substituted by one or more R11;

R18 is selected from —N(R12)(R13), —OR10, —C(O)—R16, —C(O)—OR16, —C(O)—N(R12)(R13), CN, and a heterocycle optionally substituted by one or more R17; and wherein at least one of R1, R2, R4, R5, R6, R7, R8 or R9 is not H;

and pharmaceutically acceptable salts, stereoisomers, enantiomers, tautomers of the compounds of formula (I).

In an embodiment, if R3 is methyl and R1 is methyl, then at least one of said R2, R4 to R9 is not H. In another embodiment, if R3 is methyl and R1 is methyl and R5 is methyl, then at least one of said R2, R4, R6 to R9 is not H. In another embodiment, if R3 is methyl and R2 is methyl, then R7 is not Cl. In another embodiment, if R3 is methyl and R7 is Cl, then at least one of R1, R2, R4, R5, R6, R8 to R9 is not H. In another embodiment, if R3 is methyl and R7 and R8 both are methoxy, then at least one of R1, R2, R4 to R6, R9 is not H. In another embodiment, if R3 is Cl and R7 and R8 both are methoxy, then at least one of R1, R2, R4 to R6, R9 is not H. In another embodiment, if R3 is F and R7 is methyl, then at least one of R1, R2, R4 to R6, R9 is not H. In another embodiment, if R3 is methyl and R2 is methyl, then at least one of R1, R4 to R9 is not H. In another embodiment, if R3 is ethyl and R7 is Cl, then at least one of R1, R2, R4 to R6, R8, R9 is not H. In another embodiment, if R3 is methoxy and R2 is methoxy, then at least one of R1, R4 to R9 is not H. In another embodiment, if R1 is Cl and R3 is Cl, then at least one of R2, R4 to R9 is not H.

Thus, the present invention provides di-, tri- or multi-substituted 3-(phenylsulfonyl)-[1.2.3]triazolo[1,5a]quinazolin-5(4H)-one derivatives, preferably di- and tri-substituted 3-(phenylsulfonyl)-[1,2,3]triazolo[1,5a]quinazolin-5(4H)-one derivatives, wherein beside the 4- or para-position (R3) of the phenyl ring linked to the sulfonyl group, at least one further substituent either on said phenyl ring or on the benzene ring of the quinazoline moiety is present and not hydrogen.

In a further preferred embodiment, one, two, three, four or five of said R1, R2 and R4 to R9 is independently not H, and wherein the other of said R1, R2 and R4 to R9 are independently H. In a further preferred embodiment, one, two, three or four of said R1, R2 and R4 to R9 is independently not H, and wherein the other of said R1, R2 and R4 to R9 are independently H. In a further preferred embodiment, one, two or three of said R1, R2 and R4 to R9 is independently not H, and wherein the other of said R1, R2 and R4 to R9 are independently H. In an again preferred embodiment, one or two of said R1, R2 and R4 to R9 is independently not H, and wherein the other of said R1, R2 and R4 to R9 are independently H.

Thus, in a preferred embodiment, the present invention provides di-, tri-, tetra-, or penta-substituted 3-(phenylsulfonyl)-[1,2,3]triazolo[1,5a]quinazolin-5(4H)-one derivatives. In a preferred embodiment, the present invention provides di-, tri- or tetra-substituted 3-(phenylsulfonyl)-[1,2,3]triazolo[1,5a]quinazolin-5(4H)-one derivatives. In a further preferred embodiment, the present invention provides di- and tri-substituted 3-(phenylsulfonyl)-[1,2,3]triazolo[1,5a]quinazolin-5(4H)-one derivatives. In a further preferred embodiment, one, two, three or four of said R1, R2 and R4 to R9 being independently not H, and thus said di, tri- tetra- or penta-substitution are selected from (i) one of said R1, R2, R4 and R5 is independently not H; (ii) one of said R6, R7, R8 and R9 is independently not H; (iii) one of said R1, R2, R4 and R5 is independently not H and one of said R6, R7, R8 and R9 is independently not H; (iv) two of said R6, R7, R8 and R9 are independently not H; (v) one of said R1, R2, R4 and R5 are independently not H and two of said R6, R7, R8 and R9 are independently not H, and (vi) two of said R1, R2, R4 and R5 are independently not H and two of said R6, R7, R8 and R9 are independently not H. In a further preferred embodiment, one or two of said R1, R2 and R4 to R9 being independently not H, and thus said di and said di- and tri-substitution, are selected from (i) one of said R1, R2, R4 and R5 is independently not H; (ii) one of said R6, R7, R8 and R9 is independently not H; (iii) one of said R1, R2, R4 and R5 is independently not H and one of said R6, R7, R8 and R9 is independently not H; (iv) one of said R1, R2, R4 and R5 are independently not H and two of said R6, R7, R8 and R9 are independently not H, (v) two of said R6, R7, R8 and R9 are independently not H. In a further preferred embodiment, one or two of said R1, R2 and R4 to R9 being independently not H, and thus said di and said di- and tri-substitution, are selected from (i) one of said R1, R2, R4 and R5 is independently not H; (ii) one of said R6, R7, R8 and R9 is independently not H; (iii) one of said R1, R2, R4 and R5 is independently not H and one of said R6, R7, R8 and R9 is independently not H; and (iv) two of said R6, R7, R8 and R9 are independently not H.

Thus, in a preferred embodiment, the present invention provides di-, tri-, tetra- or penta-substituted 3-(phenylsulfonyl)-[1,2,3]triazolo[1,5a]quinazolin-5(4H)-one derivatives, wherein beside the 4- or para-position (R3) of the phenyl ring linked to the sulfonyl group, one or two further substituent is present either on said phenyl ring and/or none, one or two substituents are present on the benzene ring of the quinazoline moiety and are not H. In a preferred embodiment, the present invention provides di- and tri-substituted 3-(phenylsulfonyl)-[1,2,3]triazolo[1,5a]quinazolin-5(4H)-one derivatives, wherein beside the 4- or para-position (R3) of the phenyl ring linked to the sulfonyl group, one further substituent is present either on said phenyl ring or on the benzene ring of the quinazoline moiety and is not hydrogen, or one further substituent is present on said phenyl ring and on the benzene ring of the quinazoline moiety, or two substituents are present on the benzene ring of the quinazoline moiety and are not H.

In a further preferred embodiment, said one or two of said R1, R2 and R4 to R9 being independently not H, are selected from (i) one of said R1, R2, R4 and R5 is independently not H; (ii) one of said R6, R7, R8 and R9 is independently not H; (iii) one of said R1, R2, R4 and R5 is independently not H and one of said R6, R7, R8 and R9 is independently not H.

In a further preferred embodiment, at least one of said R1, R2, R4 and R5 is not H. In a further very preferred embodiment, one or two of said R1, R2, R4, R5 is not H, and wherein the other of said R1, R2, R4, R5 are H. In a further very preferred embodiment, exactly one of said R1, R2, R4, R5 is not H, and wherein the other of said R1, R2, R4, R5 are H.

Thus, these preferred embodiments of the present invention provides di-, tri- or multi-substituted 3-(phenylsulfonyl)-[1,2,3]triazolo[1,5a]quinazolin-5(4H)-one derivatives, wherein at least two, preferably two or three, further preferably exactly two substituents are present and not being hydrogen on the phenyl ring linked to the sulfonyl group.

In a further preferred embodiment, said R1 or R5 is not H. In a further preferred embodiment, one of said R1 and said R5 is H, wherein the other of said R1 and said R5 is not H. Thus, when R1 is H, then R5 is not H, and when R5 is H then R1 is not H.

Thus, these preferred embodiments of the present invention provides di-, tri- or multi-substituted 3-(phenylsulfonyl)-[1,2,3]triazolo[1,5a]quinazolin-5(4H)-one derivatives, wherein beside the 4- or para-position (R3) of the phenyl ring linked to the sulfonyl group, at least one, preferably one further substituent on said phenyl ring is present and not hydrogen, and which is at the ortho-position (R1 or R5). For these preferred embodiments, the two ortho positions, R1 and R5, are not distinguishable.

In a further very preferred embodiment one of said R1, R2, R4 and R5 is independently not H, and wherein the other of said R1, R2, R4 and R5 are H, and wherein said R6 to R9 are H. In a further very preferred embodiment, one of said R1 and R5 is independently not H, and wherein the other of said R1 and R5 is H, and wherein said R2, R4 and R6 to R9 are H. Thus, when R1 is H, then R5 is not H, and when R5 is H then R1 is not H.

These preferred embodiments of the present invention provides di-substituted 3-(phenylsulfonyl)-[1,2,3]triazolo[1,5a]quinazolin-5(4H)-one derivatives, wherein beside the 4- or para-position (R3) of the phenyl ring linked to the sulfonyl group, one further substituent on said phenyl ring is present and not hydrogen, and which further substitution is at the ortho-position (R1 or R5), and wherein the benzene ring of the quinazoline moiety is unsubstituted. For these preferred embodiments, the two ortho positions, R1 and R5, are not distinguishable.

In a further very preferred embodiment, at least one of said R6 to R9 is not H. In a further preferred embodiment, exactly one of said R6 to R9 is not H.

Thus, these preferred embodiments of the present invention provides di-, tri- or multi-substituted 3-(phenylsulfonyl)-[1,2,3]triazolo[1,5a]quinazolin-5(4H)-one derivatives, wherein beside the 4- or para-position (R3) of the phenyl ring linked to the sulfonyl group, at least one, preferably exactly one further substituent on the benzene ring of the quinazoline moiety is present and is not hydrogen. In a further very preferred embodiment, one of said R6, R7, R8 and R9 is independently not H, and wherein the other of said R6, R7, R8 and R9 are H, and wherein said R1, R2, R4 and R5 are H.

In a further very preferred embodiment, one of said R6, R7, R8 and R9 is not H, and wherein the other of said R6, R7, R8 and R9 are H, and wherein at least one, preferably one or two, and further preferably exactly one of said R1, R2, R4 and R5 are not H. In a further preferred embodiment, at least two of said R1, R2, R4, R5, R6, R7, R8 or R9 are not H. In a further very preferred embodiment, exactly two of said R1, R2, R4, R5, R6, R7, R8 or R9 are not H. In a further very preferred embodiment at least one of said R1, R2, R4, R5 is not H and at least one of said R6 to R9 is not H.

Thus, these preferred embodiments of the present invention provides tri- or multi-substituted 3-(phenylsulfonyl)-[1,2,3]triazolo[1,5a]quinazolin-5(4H)-one derivatives, preferably di- and tri-substituted 3-(phenylsulfonyl)-[1,2,3]triazolo[1,5a]quinazolin-5(4H)-one derivatives, wherein at least two, preferably exactly two substituent are present and not being hydrogen beside the 4- or para-position (R3) of the phenyl ring linked to the sulfonyl group, at least one further substituent either on said phenyl ring or on the benzene ring of the quinazoline moiety is present and not hydrogen.

In a further preferred embodiment, said R1 or R5 is not H and at least one of said R6 to R9 is not H. In a further very preferred embodiment, said R1 or R5 is not H and exactly one of said R6 to R9 is not H. In a further very preferred embodiment, exactly one of R1 and R5 is H, wherein the other of said R1 and R5 is not H. In a further very preferred embodiment, exactly one of R1 and R5 is H, wherein the other of said R1 and R5 is not H, and wherein at least one of said R6 to R9 is not H. In again a further very preferred embodiment, said R2 and R4 is H, and wherein exactly one of R1 and R5 is H, wherein the other of said R1 and R5 is not H, and wherein at least one of said R6 to R9 is not H. In a further very preferred embodiment, one of said R1 and R5 is independently not H, and wherein one of said R6, R7, R8 and R9 is independently not H, and wherein the other of said R1 and R5 is H, and wherein the other of said R6, R7, R8 and R9 are H.

In a further very preferred embodiment, said R1 and said R5 are independently selected from H, $C_1$-$C_6$-alkyl optionally substituted by one or more R11, halogen or $C_1$-$C_6$-alkoxy. In a further very preferred embodiment, said R1 and R5 are independently selected from H, halogen, $C_1$-$C_3$-alkyl optionally substituted by one or more R11, $C_1$-$C_3$-alkoxy optionally substituted by one or more R11. In a further very preferred embodiment, said R1 and said R5 are independently selected from H, halogen, $C_1$-$C_3$-alkyl optionally substituted by one or more R11, or $C_1$-$C_3$-alkoxy.

In a further very preferred embodiment, said R1 and said R5 are independently selected from H, halogen $C_1$-$C_3$-alkyl, $CF_3$, or $C_1$-$C_3$-alkoxy. In a further very preferred embodiment, said R1 and R5 are independently selected from H, halogen, methyl, ethyl, $CF_3$, methoxy and iso-propoxy.

In a further very preferred embodiment, said R1 and said R5 are independently selected from H, methyl, ethyl, $CF_3$, F, Cl, Br or methoxy. In a further very preferred embodiment, said R1 and said R5 are independently selected from H, methyl, ethyl, $CF_3$, F, Cl, or Br. In a further very preferred embodiment, said R1 and said R5 are independently selected from H, methyl, ethyl, $CF_3$, Cl, or Br. In a further very preferred embodiment, said R1 and said R5 are independently selected from methyl, ethyl, $CF_3$, F, Cl, or Br, wherein the other of said R1 and said R5 is H.

In a further very preferred embodiment, said R1 or said R5 is independently hydrogen.

In a further very preferred embodiment, said R1 or said R5 is independently methyl.

In a further very preferred embodiment, said R1 or said R5 is independently ethyl.

In a further very preferred embodiment, said R1 or said R5 is independently $CF_3$.

In a further very preferred embodiment, said R1 or said R5 is independently F.

In a further very preferred embodiment, said R1 or said R5 is independently Cl.

In a further very preferred embodiment, said R1 or said R5 is independently Br.

In a further very preferred embodiment, said R1 or said R5 is independently methoxy.

In a further very preferred embodiment, one of said R1 and R5 is independently selected from H, halogen, $C_1$-$C_3$-alkyl optionally substituted by one or more R11, $C_1$-$C_3$-alkoxy optionally substituted by one or more R11, and wherein the other of said R1 and R5 is H. In a further very preferred embodiment, one of said R1 and R5 is independently selected from H, halogen, $C_1$-$C_3$-alkyl optionally substituted by one or more R11, or $C_1$-$C_3$-alkoxy, and wherein the other of said R1 and R5 is H. In a further very preferred embodiment, one of said R1 and R5 is independently selected from H, halogen $C_1$-$C_3$-alkyl, $CF_3$, or $C_1$-$C_3$-alkoxy, and wherein the other of said R1 and R5 is H. In a further very preferred embodiment, one of said R1 and R5 is independently selected from H, halogen, methyl, ethyl, $CF_3$, methoxy and iso-propoxy, and wherein the other of said R1 and R5 is H. In a further very preferred embodiment, one of said R1 and R5 is independently selected from H, methyl, ethyl, $CF_3$, F, Cl, Br or methoxy, and wherein the other of said R1 and R5 is H.

In a further very preferred embodiment, said R1 or said R5 is independently hydrogen. In a further very preferred embodiment, said R1 is hydrogen. In a further very preferred embodiment, said R5 is hydrogen. In a further very preferred embodiment, one of said R1 and R5 is independently methyl, and wherein the other of said R1 and R5 is H. In a further very preferred embodiment, one of said R1 and R5 is independently ethyl, and wherein the other of said R1 and R5 is H. In a further very preferred embodiment, one of said R1 and R5 is independently $CF_3$, and wherein the other of said R1 and R5 is H. In a further very preferred embodiment, one of said R1 and R5 is independently F, and wherein the other of said R1 and R5 is H. In a further very preferred embodiment, one of said R1 and R5 is independently Cl, and wherein the other of said R1 and R5 is H. In a further very preferred embodiment, one of said R1 and R5 is independently Br, and wherein the other of said R1 and R5 is H. In a further very preferred embodiment, one of said R1 and R5 is independently methoxy, and wherein the other of said R1 and R5 is H.

In a further very preferred embodiment, said R1 and said R5 are independently selected from H, halogen and $C_1$-$C_2$-alkyl optionally substituted by one or more R11. In a further very preferred embodiment, said R1 and said R5 are independently selected from H, Cl, Br and $C_1$-$C_2$-alkyl optionally substituted by one or more R11. In a further very preferred embodiment, said R1 and said R5 are independently selected from H, Cl, Br and $C_1$-$C_2$-alkyl optionally substituted by one or more halogen. In a further very preferred embodiment, said R1 and said R5 are independently selected from H, Cl, Br and $C_1$-$C_2$-alkyl optionally substituted by one or more F. In a further very preferred embodiment, said R1 and said R5 are independently selected from H, Cl, Br and $CH_3$ and $CF_3$. In a further very preferred embodiment, one of said R1 and said R5 is independently selected from Cl, Br and $CH_3$ and $CF_3$, and the other of said R1 and said R5 is H.

In a further very preferred embodiment, one of said R1 or R5 is independently selected from $C_1$-$C_6$-alkyl optionally substituted by one or more R11, halogen or $C_1$-$C_6$-alkoxy, and wherein the other one of said R1 or R5 is H and wherein at least one of said R6 to R9 is not H. In a further very preferred embodiment, one of said R1 or R5 is independently selected from $C_1$-$C_3$-alkyl optionally substituted by one or more R11, halogen or $C_1$-$C_3$-alkoxy, and wherein the other one of said R1 or R5 is H and wherein at least one of said R6 to R9 is not H. In a further very preferred embodiment, said R1 and said R5 are independently selected from H, Cl, Br and $C_1$-$C_2$-alkyl optionally substituted by one or more F and wherein at least one of said R6 to R9 is not H. In a further very preferred embodiment, said R1 and said R5 are independently selected from H, Cl, Br and $CH_3$ and $CF_3$ and wherein at least one of said R6 to R9 is not H.

In a further very preferred embodiment, one of said R1 or R5 is independently selected from $C_1$-$C_3$-alkyl, $CF_3$, halogen or $C_1$-$C_2$-alkoxy, and wherein the other one of said R1 or R5 is H and wherein at least one of said R6 to R9 is not H. In a further very preferred embodiment, said R1 or said R5 is selected from Cl, Br and $C_1$-$C_2$-alkyl optionally substituted by one or more F and wherein the other one of said R1 and R5 is H, and wherein at least one of said R6 to R9 is not H. In a further very preferred embodiment, said R1 and said R5 are independently selected from H, Cl, Br, $CH_3$ and $CF_3$, and wherein at least one of said R6 to R9 is not H. In a further very preferred embodiment, one of said R1 or said R5 is selected from Cl, Br, $CH_3$ and $CF_3$, and wherein the other of said R1 and said R5 is H and wherein at least one of said R6 to R9 is not H.

In a further very preferred embodiment, said R2 and R4 is H, and wherein one of said R1 or R5 is independently selected from $C_1$-$C_6$-alkyl optionally substituted by one or more R11, halogen or $C_1$-$C_6$-alkoxy, and wherein the other one of said R1 or R5 is H and wherein at least one, preferably exactly one, of said R6 to R9 is not H.

In a further very preferred embodiment, said R2 and R4 is H, and wherein one of said R1 or R5 is independently selected from $C_1$-$C_3$-alkyl optionally substituted by one or more R11, halogen or $C_1$-$C_3$-alkoxy, and wherein the other one of said R1 or R5 is H and wherein at least one, preferably exactly one, of said R6 to R9 is not H.

In a further very preferred embodiment, said R2 and R4 is H, and wherein one of said R1 or R5 is independently selected from $C_1$-$C_3$-alkyl, $CF_3$, halogen or $C_1$-$C_2$-alkoxy, and wherein the other one of said R1 or R5 is H and wherein at least one, preferably exactly one, of said R6 to R9 is not H.

In a further very preferred embodiment, said R2 and R4 is H, and wherein one of said R1 or R5 is independently selected from methyl, ethyl, $CF_3$, F, Cl, Br or methoxy, and wherein the other one of said R1 or R5 is H and wherein at least one, preferably exactly one, of said R6 to R9 is not H.

In a further very preferred embodiment, said R2 and R4 is H, and wherein said R1 and said R5 are independently selected from H, Cl, Br and $C_1$-$C_2$-alkyl optionally substituted by one or more F, and wherein at least one of said R6 to R9 is not H. In a further very preferred embodiment, said R2 and R4 is H, and wherein said R1 and said R5 are independently selected from H, Cl, Br and $CH_3$ and $CF_3$ and wherein at least one of said R6 to R9 is not H. In a further very preferred embodiment, said R2 and R4 is H, and wherein said R1 or said R5 is selected from Cl, Br and $C_1$-$C_2$-alkyl optionally substituted by one or more F and wherein the other one of said R1 and R5 is H, and wherein at least one, preferably one or two, further preferably exactly one, of said R6 to R9 is not H. In a further very preferred embodiment, said R2 and R4 is H, and wherein said R1 and said R5 are independently selected from H, Cl, Br, $CH_3$ and $CF_3$, and wherein at least one, preferably one or two, further preferably exactly one, of said R6 to R9 is not H. In a further very preferred embodiment, said R2 and R4 is H, and wherein one of said R1 or said R5 is selected from Cl, Br, $CH_3$ and $CF_3$, and wherein the other of said R1 and said R5 is H and wherein at least one, preferably one or two, further preferably exactly one, of said R6 to R9 is not H.

In a further very preferred embodiment, one of said R1 or R5 is independently selected from $C_1$-$C_6$-alkyl optionally substituted by one or more R11, halogen or $C_1$-$C_6$-alkoxy, and wherein the other one of said R1 or R5 is H, and wherein exactly one of said R6 to R9 is not H.

In a further very preferred embodiment, one of said R1 or R5 is independently selected from $C_1$-$C_3$-alkyl optionally substituted by one or more R11, halogen or $C_1$-$C_3$-alkoxy, and wherein the other one of said R1 or R5 is H, and wherein exactly one of said R6 to R9 is not H.

In a further very preferred embodiment, one of said R1 or R5 is independently selected from $C_1$-$C_3$-alkyl, $CF_3$, halogen or $C_1$-$C_2$-alkoxy, and wherein the other one of said R1 or R5 is H, and wherein exactly one of said R6 to R9 is not H.

In a further very preferred embodiment, one of said R1 or R5 is independently selected from methyl, ethyl, $CF_3$, F, Cl, Br or methoxy, and wherein the other one of said R1 or R5 is H, and wherein one of said R6 to R9 is not H.

In a further very preferred embodiment, said R2 is H.

In a further very preferred embodiment, said R4 is H.

In a further very preferred embodiment, said R2 and said R4 is H.

In a further very preferred embodiment, said R2 and R4 is H, and wherein one of said R1 or R5 is independently selected from $C_1$-$C_6$-alkyl optionally substituted by one or more R11, halogen or $C_1$-$C_6$-alkoxy, and wherein the other one of said R1 or R5 is H and wherein exactly one of said R6 to R9 is not H.

In a further very preferred embodiment, said R2 and R4 is H, and wherein one of said R1 or R5 is independently selected from $C_1$-$C_3$-alkyl optionally substituted by one or more R11, halogen or $C_1$-$C_3$-alkoxy, and wherein the other one of said R1 or R5 is H and wherein exactly one of said R6 to R9 is not H.

In a further very preferred embodiment, said R2 and R4 is H, and wherein one of said R1 or R5 is independently selected from $C_1$-$C_3$-alkyl, $CF_3$, halogen or $C_1$-$C_2$-alkoxy, and wherein the other one of said R1 or R5 is H and wherein exactly one of said R6 to R9 is not H.

In a further very preferred embodiment, said R2 and R4 is H, and wherein one of said R1 or R5 is independently selected from methyl, ethyl, $CF_3$, F, Cl, Br or methoxy, and wherein the other one of said R1 or R5 is H and wherein exactly one of said R6 to R9 is not H.

In a further very preferred embodiment, said R1, R2, R4 and R5 is H, and wherein at least one of said R6 to R9 is not H, and wherein preferably at least one of said R6 to R9 is not H.

In a further very preferred embodiment, said R1, R2, R4 and R5 is H, and wherein exactly one of said R6 to R9 is not H.

In a further preferred embodiment, said R3 is selected from halogen, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$C_n$-alkyl-N(R14)-C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3; —O—$C_n$-alkyl-R18 with n=0-3; —OPO(OR10)$_2$, —PO(OR10)$_2$, and a heterocycle optionally substituted by one or more R17, wherein preferably said heterocycle is aromatic, partially saturated or fully saturated and contains 1 to 4 nitrogen hetero atoms and at most one oxygen atom.

In a further preferred embodiment, said R3 is selected from halogen, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —$C_n$-alkyl-C(O)N(R12)(R13) with n=0-3; —$C_n$-alkyl-N(R12)(R13) with n=0-3, —$C_n$-alkyl-N(R14)-C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3; —O—$C_n$-alkyl-R18 with n=0-3; —OPO(OR10)$_2$, —PO(OR10)$_2$, and a 4 to 6 heterocycle optionally substituted by one or more R17, wherein said heterocycle is aromatic, partially saturated or fully saturated and contains 1 to 4 nitrogen hetero atoms and at most one oxygen atom.

In a further very preferred embodiment, said R3 is selected from halogen, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —C(O)N(R12)(R13); —N(R14)-C(O)—R15; —C(O)—OR16; —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3; —O—$C_n$-alkyl-R18 with n=0-3; —OPO(OR10)$_2$, —PO(OR10)$_2$, and 4 to 6 membered heterocycle optionally substituted by one or more R17, wherein said heterocycle is aromatic and contains 1 to 4 nitrogen hetero atoms and at most one oxygen atom.

In a further very preferred embodiment, said R3 is selected from halogen, CN, $C_1$-$C_3$-alkyl optionally substituted by one or more R11, $C_1$-$C_3$-alkoxy optionally substituted by one or more R11, $C_3$-$C_6$-cycloalkyl optionally substituted by one or more R11, —C(O)N(R12)(R13); —N(R14)-C(O)—R15; —C(O)—OR16; —O($C_1$-$C_3$-alkyl-O)$_m$—$C_1$-$C_3$-alkyl-OR10 with m=0-3, —OR16; —NH—$C_n$-alkyl-R18 with n=0-3; —O—$C_n$-alkyl-R18 with n=0-3; —OPO(OR10)$_2$, —PO(OR10)$_2$, and 4 to 6 membered heterocycle optionally substituted by one or more R17, wherein said heterocycle is aromatic and contains 1 to 4 nitrogen hetero atoms and at most one oxygen atom.

In a further very preferred embodiment, said R3 is selected from halogen, CN, $C_1$-$C_3$-alkyl optionally substituted by one or more R11, $C_1$-$C_3$-alkoxy optionally substituted by one or more R11, $C_3$-$C_6$-cycloalkyl optionally substituted by one or more R11, —C(O)N(R12)(R13); —N(R14)-C(O)—R15; —C(O)—OR16; —O($C_1$-$C_3$-alkyl-O)$_m$—$C_1$-$C_3$-alkyl-OR10 with m=0-3, —OR16, —NH—$C_n$-alkyl-R18 with n=0-3; —O—$C_n$-alkyl-R18 with n=0-3; —OPO(OR10)$_2$, —PO(OR10)$_2$, and 4 to 6 membered heterocycle optionally substituted by one or more R17, wherein said heterocycle is aromatic and contains 1 to 4 nitrogen hetero atoms and at most one oxygen atom, and wherein said R10 is H or methyl.

In a further very preferred embodiment, said R3 is selected from F, Cl, Br, CN, $C_1$-$C_3$-alkyl optionally substituted by one or more F or hydroxyl, $C_1$-$C_3$-alkoxy optionally substituted by one or more F, $C_3$-$C_6$-cycloalkyl, —C(O)N(R12)(R13), —N(R14)-C(O)—R15, —C(O)—OR16, —O($C_1$-$C_3$-alkyl-O)$_m$—$C_1$-$C_3$-alkyl-OR10 with m=0-3, —OR16, —NH—$C_n$-alkyl-R18 with n=0-3; —O—$C_n$-alkyl-R18 with n=0-3; —OPO(OR10)$_2$, —PO(OR10)$_2$, and 4 to 6 membered heterocycle optionally substituted by one or more R17, wherein said heterocycle is aromatic and contains 1 to 4 nitrogen hetero atoms and at most one oxygen atom, and wherein preferably said R10 is H or methyl.

In a further very preferred embodiment, said R3 is selected from F, Cl, Br, CN, $C_1$-$C_3$-alkyl optionally substituted by one or more F or hydroxyl, $C_1$-$C_3$-alkoxy optionally substituted by one or more F, $C_3$-$C_6$-cycloalkyl, —C(O)N(R12)(R13), —N(R14)-C(O)—R15, —C(O)—OR16, and 4 to 6 membered heterocycle optionally substituted by one or more R17, wherein said heterocycle is aromatic and contains 1 to 4 nitrogen hetero atoms and at most one oxygen atom.

In a further very preferred embodiment, said R3 is selected from F, Cl, Br, CN, $C_1$-$C_3$-alkyl optionally substituted by one or more F or hydroxyl, $C_1$-$C_3$-alkoxy optionally substituted by one or more F, $C_3$-$C_5$-cycloalkyl, —C(O)N(R12)(R13), —N(R14)-C(O)—R15, and 5 to 6 membered heterocycle optionally substituted by one or more R17, wherein said heterocycle is aromatic and contains 1 to 4 nitrogen hetero atoms.

In a further very preferred embodiment, said R3 is selected from F, Cl, Br, CN, methyl, ethyl, isopropyl, $CF_3$, methoxy, isopropoxy, $OCF_3$, cyclopropyl, —C(O)NH$_2$, —NHCOCH$_3$, —C(O)OC$_2$H$_5$, 5-methyl-triazolyl, triazolyl and tetrazolyl.

In a further very preferred embodiment, said R3 is selected from F, Cl, Br, CN, methyl, ethyl, isopropyl, $CF_3$, methoxy, isopropoxy, —NHCOCH$_3$ and cyclopropyl.

In a further very preferred embodiment, said R3 is selected from F, Cl, Br, CN, methyl, ethyl, isopropyl, $CF_3$, methoxy, isopropoxy and cyclopropyl.

In a further very preferred embodiment, said R3 is selected from methyl, ethyl, isopropyl, $C_3$-$C_5$-cycloalkyl optionally substituted by one or more R11. In a further very preferred embodiment, said R3 is selected from methyl, ethyl, isopropyl, $C_3$-$C_5$-cycloalkyl. In a further very preferred embodiment, said R3 is selected from methyl, ethyl, isopropyl and cyclopropyl. In a further very preferred embodiment, said R3 is selected from methyl, ethyl, and cyclopropyl.

In a further very preferred embodiment, said R3 is F.
In a further very preferred embodiment, said R3 is Cl.
In a further very preferred embodiment, said R3 is Br.
In a further very preferred embodiment, said R3 is CN.
In a further very preferred embodiment, said R3 is methyl.
In a further very preferred embodiment, said R3 is ethyl.
In a further very preferred embodiment, said R3 is isopropyl.
In a further very preferred embodiment, said R3 is $CF_3$.
In a further very preferred embodiment, said R3 is methoxy.
In a further very preferred embodiment, said R3 is isopropoxy.
In a further very preferred embodiment, said R3 is $OCF_3$.
In a further very preferred embodiment, said R3 is cyclopropyl.
In a further very preferred embodiment, said R3 is —C(O)NH$_2$.
In a further very preferred embodiment, said R3 is —NHCOCH$_3$.
In a further very preferred embodiment, said R3 is —C(O)OC$_2$H$_5$.
In a further very preferred embodiment, said R3 is triazolyl.
In a further very preferred embodiment, said R3 is 5-methyl-triazolyl.
In a further very preferred embodiment, said R3 is tetrazolyl.

In a further very preferred embodiment, said R1 and said R5 are independently selected from H, $C_1$-$C_3$-alkyl optionally substituted by one or more R11, halogen or $C_1$-$C_3$-alkoxy, and said R3 is selected from F, Cl, Br, CN, methyl, ethyl, isopropyl, $CF_3$, methoxy, isopropoxy, $OCF_3$, cyclopropyl, —C(O)NH$_2$, —NHCOCH$_3$, C(O)OC$_2$H$_5$, 5-methyl-triazolyl, triazolyl and tetrazolyl.

In a further very preferred embodiment, said R1 and said R5 are independently selected from H, $C_1$-$C_3$-alkyl, $CF_3$, halogen or $C_1$-$C_2$-alkoxy, and said R3 is selected from F, Cl, Br, CN, methyl, ethyl, isopropyl, $CF_3$, methoxy, isopropoxy, —NHCOCH$_3$ and cyclopropyl.

In a further very preferred embodiment, said R1 and said R5 are independently selected from H, methyl, ethyl, $CF_3$, F, Cl, Br or methoxy, and said R3 is selected from F, Cl, Br, CN, methyl, ethyl, isopropyl, $CF_3$, methoxy, isopropoxy and cyclopropyl.

In a further very preferred embodiment, said R1 or said R5 is selected from Cl, Br and $C_1$-$C_2$-alkyl optionally substituted by one or more F and wherein the other one of said R1 and R5 is H, and wherein said R3 is selected from methyl, ethyl, isopropyl, $C_3$-$C_5$-cycloalkyl optionally substituted by one or more R11. In a further very preferred embodiment, said R1 and said R5 are independently selected from H, Cl, Br, $CH_3$ and $CF_3$, and wherein said R3 is selected from methyl, ethyl, isopropyl, $C_3$-$C_5$-cycloalkyl. In a further very preferred embodiment, one of said R1 or said R5 is selected from Cl, Br, $CH_3$ and $CF_3$, and wherein the other of said R1 and said R5 is H and wherein said R3 is selected from methyl, ethyl, isopropyl and cyclopropyl, and wherein preferably said R3 is selected from methyl, ethyl, and cyclopropyl.

In a further very preferred embodiment, said R1 and said R5 are independently selected from H, $C_1$-$C_3$-alkyl optionally substituted by one or more R11, halogen or $C_1$-$C_3$-alkoxy, said R2 and R4 is H, and said R3 is selected from F, Cl, Br, CN, methyl, ethyl, isopropyl, $CF_3$, methoxy, isopropoxy, $OCF_3$, cyclopropyl, —C(O)$NH_2$, —$NHCOCH_3$, —C(O)O$C_2H_5$ and triazolyl and tetrazolyl.

In a further very preferred embodiment, said R1 and said R5 are independently selected from H, $C_1$-$C_3$-alkyl, $CF_3$, halogen or $C_1$-$C_2$-alkoxy, said R2 and R4 is H, and said R3 is selected from F, Cl, Br, CN, methyl, ethyl, isopropyl, $CF_3$, methoxy, isopropoxy, —$NHCOCH_3$ and cyclopropyl.

In a further very preferred embodiment, said R1 and said R5 are independently selected from H, methyl, ethyl, $CF_3$, F, Cl, Br or methoxy, said R2 and R4 is H, and said R3 is selected from F, Cl, Br, CN, methyl, ethyl, isopropyl, $CF_3$, methoxy, isopropoxy and cyclopropyl.

In a further very preferred embodiment, said R1 or said R5 is selected from Cl, Br and $C_1$-$C_2$-alkyl optionally substituted by one or more F and wherein the other one of said R1 and R5 is H, said R2 and R4 is H, and wherein said R3 is selected from methyl, ethyl, isopropyl, $C_3$-$C_5$-cycloalkyl optionally substituted by one or more R11. In a further very preferred embodiment, said R1 and said R5 are independently selected from H, Cl, Br, $CH_3$ and $CF_3$, and said R2 and R4 is H, and wherein said R3 is selected from methyl, ethyl, isopropyl, $C_3$-$C_5$-cycloalkyl. In a further very preferred embodiment, one of said R1 or said R5 is selected from Cl, Br, $CH_3$ and $CF_3$, and wherein the other of said R1 and said R5 is H and said R2 and R4 is H, and wherein said R3 is selected from methyl, ethyl, isopropyl and cyclopropyl, and wherein preferably said R3 is selected from methyl, ethyl, and cyclopropyl.

In a further very preferred embodiment, said R10 is H or methyl.

In a further very preferred embodiment, said R11 are independently selected from F and hydroxy. In a further very preferred embodiment, said R11 is independently Cl. In a further very preferred embodiment, said R11 is independently F. In a further very preferred embodiment, said R11 is independently hydroxy.

In a further preferred embodiment, said R12, R13, R14, R15 and R16 are independently selected from H, $C_1$-$C_3$-alkyl optionally substituted by one or more R11 or wherein said R12 and R13 together with the nitrogen to which they are attached form a 4-6 membered heterocycle optionally substituted by one or more R17. In a further very preferred embodiment, said R12, R13, R14, R15 and R16 are independently selected from H, $C_1$-$C_3$-alkyl optionally substituted by one or more F and hydroxyl or wherein said R12 and R13 together with the nitrogen to which they are attached form a 4-6 membered heterocycle optionally substituted by one or more R17. In a further very preferred embodiment, said R12 is independently selected from H, $C_1$-$C_3$-alkyl optionally substituted by one or more F and hydroxyl or wherein said R12 and R13 together with the nitrogen to which they are attached form a 4-6 membered heterocycle optionally substituted by one or more R17. In a further very preferred embodiment, said R13 is independently selected from H, $C_1$-$C_3$-alkyl optionally substituted by one or more F and hydroxyl or wherein said R12 and R13 together with the nitrogen to which they are attached form a 4-6 membered heterocycle optionally substituted by one or more R17. In a further very preferred embodiment, said R14 is independently selected from H, $C_1$-$C_3$-alkyl optionally substituted by one or more F and hydroxyl. In a further very preferred embodiment, said R15 is independently selected from H, $C_1$-$C_3$-alkyl optionally substituted by one or more F and hydroxyl. In a further very preferred embodiment, said R16 is independently selected from H, $C_1$-$C_3$-alkyl optionally substituted by one or more F and hydroxyl.

In a further preferred embodiment, said one or more R17 is independently selected from halogen, CN, —N(R12)(R13), —C(O)—R16, —C(O)—OR16, —$C_n$-alkyl-OR16 with n=0-3, $C_1$-$C_3$-alkyl optionally substituted by one or more R11, and $C_1$-$C_3$-alkoxy optionally substituted by one or more R11. In a further very preferred embodiment, said one or more R17 is independently selected from $C_1$-$C_3$-alkyl optionally substituted by one or more R11, and $C_1$-$C_3$-alkoxy optionally substituted by one or more R11. In a further very preferred embodiment, said one or more R17 is independently selected from $C_1$-$C_3$-alkyl optionally substituted by one or more F, and $C_1$-$C_3$-alkoxy. In a further very preferred embodiment, said one or more R17 is independently selected from $C_1$-$C_3$-alkyl and $C_1$-$C_3$-alkoxy.

In a further preferred embodiment, said R18 is selected from —N(R12)(R13), —OR10, and a 4-6 membered heterocycle optionally substituted by one or more R17.

In a further very preferred embodiment, said R1, R2, R4 and R5 is H, and wherein R3 is selected from F, Cl, Br, CN, methyl, ethyl, isopropyl, $CF_3$, methoxy, isopropoxy, $OCF_3$, cyclopropyl, —C(O)$NH_2$, —$NHCOCH_3$, —C(O)O$C_2H_5$ and triazolyl and tetrazolyl, and wherein at least one of said R6 to R9 is not H.

In a further very preferred embodiment, said R1, R2, R4 and R5 is H, and wherein R3 is selected from F, Cl, Br, CN, methyl, ethyl, isopropyl, $CF_3$, methoxy, isopropoxy, $OCF_3$, cyclopropyl, —C(O)$NH_2$, —$NHCOCH_3$, —C(O)O$C_2H_5$ and triazolyl and tetrazolyl, and wherein exactly one of said R6 to R9 is not H.

In a further very preferred embodiment, said R1, R2, R4 and R5 is H, and wherein R3 is selected from F, Cl, Br, CN, methyl, ethyl, isopropyl, $CF_3$, methoxy, isopropoxy, —$NHCOCH_3$ and cyclopropyl, and wherein at least one of said R6 to R9 is not H.

In a further very preferred embodiment, said R1, R2, R4 and R5 is H, and wherein R3 is selected from F, Cl, Br, CN, methyl, ethyl, isopropyl, $CF_3$, methoxy, isopropoxy, —$NHCOCH_3$ and cyclopropyl, and wherein exactly one of said R6 to R9 is not H.

In a further very preferred embodiment, said R1, R2, R4 and R5 is H, and wherein R3 is selected from F, Cl, Br, CN, methyl, ethyl, isopropyl, $CF_3$, methoxy, isopropoxy and cyclopropyl, and wherein at least one of said R6 to R9 is not H.

In a further very preferred embodiment, said R1, R2, R4 and R5 is H, and wherein R3 is selected from F, Cl, Br, CN, methyl, ethyl, isopropyl, $CF_3$, methoxy, isopropoxy and cyclopropyl, and wherein exactly one of said R6 to R9 is not H.

In a further very preferred embodiment, said R1, R2, R4 and R5 is H, and wherein R3 is cyclo-propyl, and wherein at least one of said R6 to R9 is not H.

In a further very preferred embodiment, said R1, R2, R4 and R5 is H, and wherein R3 is cyclo-propyl, and wherein exactly one of said R6 to R9 is not H.

In a further very preferred embodiment, said R1, R2, R4 and R5 is H, and wherein R3 is iso-propyl, and wherein at least one of said R6 to R9 is not H.

In a further very preferred embodiment, said R1, R2, R4 and R5 is H, and wherein R3 is iso-propyl, and wherein exactly one of said R6 to R9 is not H.

In a further very preferred embodiment, said R6, R7, R8 and R9 are independently selected from H, halogen, CN, $C_1$-$C_3$-alkyl optionally substituted by one or more F or hydroxyl, $C_1$-$C_3$-alkoxy optionally substituted by one or more F, $C_3$-$C_6$-cycloalkyl, —O($C_1$-$C_3$-alkyl-O)$_m$—$C_1$-$C_3$- alkyl-OR10 with m=0-3, —C$_n$-alkyl-OR16 with n=0-3, —NH—C$_n$-alkyl-R18 with n=0-3, —O—C$_n$-alkyl-R18 with n=0-3.

In a further very preferred embodiment, said R6, R7, R8 and R9 are independently selected from H, halogen, hydroxyl, NO$_2$, CN, C$_1$-C$_6$-alkyl optionally substituted by one or more R11, C$_1$-C$_6$-alkoxy optionally substituted by one or more R11, C$_3$-C$_6$-cycloalkyl optionally substituted by one or more R11, —C$_n$-alkyl-N(R12)(R13) with n=0-3, —C$_n$-alkyl-C(O)N(R12)(R13) with n=0-3, —SO$_2$—N(R12)(R13), —SO$_2$—N(R14)-C(O)—R15; —C$_n$-alkyl-N(R14)—C(O)—R15 with n=0-3, —C$_n$-alkyl-C(O)—OR16 with n=0-3, —O(C$_1$-C$_3$-alkyl-O)$_m$—C$_1$-C$_3$-alkyl-OR10 with m=0-3, —C$_n$-alkyl-OR16 with n=0-3, —NH—C$_n$-alkyl-R18 with n=0-3; —O—C$_n$-alkyl-R18 with n=0-3; —OPO(OR10)$_2$, —PO(OR10)$_2$, and a heterocycle optionally substituted by one or more R17.

In a further very preferred embodiment, said R6, R7, R8 and R9 are independently selected from H, halogen, CN, C$_1$-C$_3$-alkyl optionally substituted by one or more F, C$_1$-C$_3$-alkoxy optionally substituted by one or more F, C$_3$-C$_6$-cycloalkyl.

In a further very preferred embodiment, said R6, R7, R8 and R9 are independently selected from H, halogen, CN, C$_1$-C$_3$-alkoxy optionally substituted by one or more F.

In a further very preferred embodiment, said R6, R7, R8 and R9 are independently selected from H, halogen, CN, C$_1$-C$_3$-alkoxy.

In a further very preferred embodiment, said R6, R7, R8 and R9 are independently selected from H, F, Cl, Br, CN, methoxy and ethoxy.

In a further very preferred embodiment, said R6, R7, R8 and R9 is independently H. In a further very preferred embodiment, said R6, R7, R8 and R9 is independently halogen. In a further very preferred embodiment, said R6, R7, R8 and R9 is independently CN. In a further very preferred embodiment, said R6, R7, R8 and R9 is independently C$_1$-C$_3$-alkyl optionally substituted by one or more F or hydroxyl. In a further very preferred embodiment, said R6, R7, R8 and R9 is independently hydroxyl. In a further very preferred embodiment, said R6, R7, R8 and R9 is independently C$_1$-C$_3$-alkyl optionally substituted by one or more F. In a further very preferred embodiment, said R6, R7, R8 and R9 are independently C$_1$-C$_3$-alkoxy optionally substituted by one or more F. In a further very preferred embodiment, said R6, R7, R8 and R9 is independently CF$_3$. In a further very preferred embodiment, said R6, R7, R8 and R9 is independently C$_3$-C$_6$-cycloalkyl.

In a further very preferred embodiment, said R6, R7, R8 and R9 is independently-O(C$_1$-C$_3$-alkyl-O)$_m$—C$_1$-C$_3$-alkyl-OR10 with m=0-3, wherein preferably m=1 or 2. In a further very preferred embodiment, said R6, R7, R8 and R9 is independently-O(C$_2$-alkyl-O)$_m$—C$_1$-C$_3$-alkyl-OR10 with m=0-3, wherein preferably m=1 or 2. In a further very preferred embodiment, said R6, R7, R8 and R9 is independently-O(C$_2$-alkyl-O)$_m$—C$_2$-alkyl-OR10 with m=0-3, wherein preferably m=1 or 2.

In a further very preferred embodiment, said R6, R7, R8 and R9 is independently C$_1$-C$_3$-alkyl-O—C$_1$-C$_3$-alkyl.

In a further very preferred embodiment, said R6, R7, R8 and R9 is independently —NH—C$_n$-alkyl-R18 with n=0-3, wherein preferably n=1 or 2. In a further very preferred embodiment, said R6, R7, R8 and R9 is independently —NH—C$_n$-alkyl-R18 with n=0-3, wherein preferably n=0, 1 or 2, and wherein said R18 is a heterocycle optionally substituted by one or more R17. Preferably said heterocycle is a fully saturated 5- or 6-membered, preferably 6 membered, single ring system comprising one or two hetero atoms selected from nitrogen, oxygen and sulfur. Further preferably said heterocycle is selected from piperidine, morpholine and tetrahydropyrane optionally substituted by one or two R17, wherein preferably said R17 is C$_1$-C$_2$-alkyl.

In a further very preferred embodiment, said R6, R7, R8 and R9 is independently —O—C$_n$-alkyl-R18 with n=0-3, wherein preferably n=1, 2 or 3. In a further very preferred embodiment, said R18 is selected from —OR10, —C(O)—R16, —C(O)—OR16, CN, and a heterocycle optionally substituted by one or more R17, wherein preferably said R10 is selected from H or CH$_3$ and wherein preferably R16 is selected from H or CH$_3$ and wherein preferably said heterocycle is a fully saturated 5- or 6-membered, preferably 6 membered, single ring system comprising one or two hetero atoms selected from nitrogen, oxygen and sulfur, and again further preferably said heterocycle is dioxolane optionally substituted by one or two R17, wherein preferably said R17 is CH$_3$. In a further very preferred embodiment, said R6, R7, R8 and R9 is independently —O—C$_n$-alkyl-R18 with n=0-3, wherein preferably n=1, 2 or 3. In a further very preferred embodiment, said R18 is selected from —OR10, —C(O)—OR16, CN, and a heterocycle optionally substituted by one or more R17, wherein preferably said R10 is selected from H or CH$_3$ and wherein preferably R16 is selected from H or CH$_3$ and wherein preferably said heterocycle is a fully saturated 5- or 6-membered, preferably 6 membered, single ring system comprising one or two hetero atoms selected from nitrogen and oxygen.

In a further very preferred embodiment, said R6, R7, R8 and R9 is independently —O—C$_n$-alkyl-R18 with n=2 or 3, and wherein said R18 is —OR10, wherein preferably said R10 is selected from H or CH$_3$. In a further very preferred embodiment, said R6, R7, R8 and R9 is independently —O—C$_n$-alkyl-R18 with n=2 or 3, and wherein said R18 is —C(O)—OR16, wherein preferably said R16 is selected from H or CH$_3$. In a further very preferred embodiment, said R6, R7, R8 and R9 is independently —O—C$_n$-alkyl-R18 with n=2 or 3, and wherein said R18 is CN. In a further very preferred embodiment, said R6, R7, R8 and R9 is independently —O—C$_n$-alkyl-R18 with n=1 or 2, and wherein said R18 is a heterocycle optionally substituted by one or more R17, wherein said heterocycle is a fully saturated 5- or 6-membered, preferably 6 membered, single ring system comprising one or two hetero atoms selected from nitrogen and oxygen, and wherein further preferably said heterocycle is dioxolane optionally substituted by one or two R17, preferably two R17, wherein said R17 is preferably CH$_3$.

In a further very preferred embodiment, said R6, R7, R8 and R9 is independently a heterocycle optionally substituted by one or more R17, wherein preferably said heterocycle is a fully saturated 4-6-membered single ring system comprising one or two hetero atoms selected from nitrogen and oxygen. In a further very preferred embodiment, said R6, R7, R8 and R9 is independently a heterocycle optionally substituted by one or more R17, wherein preferably said heterocycle is azetidine.

In a further very preferred embodiment, said R6, R7, R8 and R9 is independently C$_1$-C$_3$-alkoxy. In a further very preferred embodiment, said R6, R7, R8 and R9 is independently F. In a further very preferred embodiment, said R6, R7, R8 and R9 is independently Cl In a further very preferred embodiment, said R6, R7, R8 and R9 is independently Br. In a further very preferred embodiment, said R6, R7, R8 and R9 is independently I. In a further very preferred embodiment, said R6, R7, R8 and R9 is independently CN. In a further very preferred embodiment, said R6, R7, R8 and R9 is independently methoxy. In a further very preferred embodiment, said R6, R7, R8 and R9 is independently ethoxy.

In a further very preferred embodiment, one or two of said R6, R7, R8 and R9 are independently selected from halogen, CN, $C_1$-$C_3$-alkyl optionally substituted by one or more F or hydroxyl, $C_1$-$C_3$-alkoxy optionally substituted by one or more F, $C_3$-$C_6$-cycloalkyl, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3, —O—$C_n$-alkyl-R18 with n=0-3, and wherein the others of said R6, R7, R8 and R9 are H. In a further very preferred embodiment, exactly one of said R6, R7, R8 and R9 are independently selected from halogen, CN, $C_1$-$C_3$-alkyl optionally substituted by one or more F or hydroxyl, $C_1$-$C_3$-alkoxy optionally substituted by one or more F, $C_3$-$C_6$-cycloalkyl, —O($C_1$-$C_3$-alkyl-O)$_m$—$C_1$-$C_3$-alkyl-OR11 with m=0-3, —$C_n$-alkyl-OR16 with n=0-3, —NH—$C_n$-alkyl-R18 with n=0-3, —O—$C_n$-alkyl-R18 with n=0-3, and wherein the others of said R6, R7, R8 and R9 are H.

In a further very preferred embodiment, one or two of said R6, R7, R8 and R9 are independently selected from halogen, CN, $C_1$-$C_3$-alkyl optionally substituted by one or more F, $C_1$-$C_3$-alkoxy optionally substituted by one or more F, $C_3$-$C_6$-cycloalkyl and wherein the others of said R6, R7, R8 and R9 are H. In a further very preferred embodiment, exactly one of said R6, R7, R8 and R9 are independently selected from halogen, CN, $C_1$-$C_3$-alkyl optionally substituted by one or more F, $C_1$-$C_3$-alkoxy optionally substituted by one or more F, $C_3$-$C_6$-cycloalkyl and wherein the others of said R6, R7, R8 and R9 are H.

In a further very preferred embodiment, one or two of said R6, R7, R8 and R9 are independently selected from halogen, CN, $C_1$-$C_3$-alkoxy optionally substituted by one or more F, and wherein the others of said R6, R7, R8 and R9 are H. In a further very preferred embodiment, exactly one of said R6, R7, R8 and R9 are independently from halogen, CN, $C_1$-$C_3$-alkoxy optionally substituted by one or more F. and wherein the others of said R6, R7, R8 and R9 are H.

In a further very preferred embodiment, one or two of said R6, R7, R8 and R9 are independently selected from halogen, CN, $C_1$-$C_3$-alkoxy and wherein the others of said R6, R7, R8 and R9 are H. In a further very preferred embodiment, exactly one of said R6, R7, R8 and R9 are independently from halogen, CN, $C_1$-$C_3$-alkoxy and wherein the others of said R6, R7, R8 and R9 are H.

In a further very preferred embodiment, one or two of said R6, R7, R8 and R9 are independently selected from F, Cl, Br, CN, methoxy and ethoxy and wherein the others of said R6, R7, R8 and R9 are H. In a further very preferred embodiment, exactly one of said R6, R7, R8 and R9 are independently from F, Cl, Br, CN, methoxy and ethoxy, and wherein the others of said R6, R7, R8 and R9 are H.

In a further very preferred embodiment, exactly one of said R6, R7, R8 and R9 are independently selected from halogen, CN, $C_1$-$C_3$-alkoxy optionally substituted by one or more R11, and wherein the others of said R6, R7, R8 and R9 are H. In a further very preferred embodiment, exactly one of said R6, R7, R8 and R9 are independently selected from F, Cl, CN, methoxy and ethoxy, and wherein the others of said R6, R7, R8 and R9 are H.

In a further very preferred embodiment, one or two of said R6, R7, R8 and R9 is independently —O—$C_n$-alkyl-R18 with n=0-3, wherein preferably n=1, 2 or 3, and wherein the others of said R6, R7, R8 and R9 are H. Preferably, said R18 is selected from —OR10, —C(O)—OR16, CN, and a heterocycle optionally substituted by one or more R17, wherein preferably said R10 is selected from H or $CH_3$ and wherein preferably R16 is selected from H or $CH_3$ and wherein preferably said heterocycle is a fully saturated 5- or 6-membered, preferably 6 membered, single ring system comprising one or two hetero atoms selected from nitrogen and oxygen.

In a further very preferred embodiment, one or two of said R6, R7, R8 and R9 are independently —O—$C_n$-alkyl-R18 with n=2 or 3, and wherein said R18 is —OR10, wherein preferably said R10 is selected from H or $CH_3$, and wherein the others of said R6, R7, R8 and R9 are H. In a further very preferred embodiment, one or two of said R6, R7, R8 and R9 is independently —O—$C_n$-alkyl-R18 with n=2 or 3, and wherein said R18 is —C(O)—OR16, wherein preferably said R16 is selected from H or $CH_3$, and wherein the others of said R6, R7, R8 and R9 are H. In a further very preferred embodiment, one or two of said R6, R7, R8 and R9 is independently —O—$C_n$-alkyl-R18 with n=2 or 3, and wherein said R18 is CN, and wherein the others of said R6, R7, R8 and R9 are H. In a further very preferred embodiment, one or two of said R6, R7, R8 and R9 is independently —O—$C_n$-alkyl-R18 with n=1 or 2, and wherein said R18 is a heterocycle optionally substituted by one or more R17, wherein said heterocycle is a fully saturated 5- or 6-membered, preferably 6 membered, single ring system comprising one or two hetero atoms selected from nitrogen and oxygen, and wherein further preferably said heterocycle is dioxolane optionally substituted by one or two R17, preferably two R17, wherein said R17 is preferably $CH_3$, and wherein the others of said R6, R7, R8 and R9 are H.

In a further very preferred embodiment, exactly one of said R6, R7, R8 and R9 are independently —O—$C_n$-alkyl-R18 with n=2 or 3, and wherein said R18 is —OR10, wherein preferably said R10 is selected from H or $CH_3$, and wherein the others of said R6, R7, R8 and R9 are H. In a further very preferred embodiment, exactly one of said R6, R7, R8 and R9 is independently —O—$C_n$-alkyl-R18 with n=2 or 3, and wherein said R18 is —C(O)—OR16, wherein preferably said R16 is selected from H or $CH_3$, and wherein the others of said R6, R7, R8 and R9 are H. In a further very preferred embodiment, exactly one of said R6, R7, R8 and R9 is independently —O—$C_n$-alkyl-R18 with n=2 or 3, and wherein said R18 is CN, and wherein the others of said R6, R7, R8 and R9 are H. In a further very preferred embodiment, exactly one of said R6, R7, R8 and R9 is independently —O—$C_n$-alkyl-R18 with n=1 or 2, and wherein said R18 is a heterocycle optionally substituted by one or more R17, wherein said heterocycle is a fully saturated 5- or 6-membered, preferably 6 membered, single ring system comprising one or two hetero atoms selected from nitrogen and oxygen, and wherein further preferably said heterocycle is dioxolane optionally substituted by one or two R17, preferably two R17, wherein said R17 is preferably $CH_3$, and wherein the others of said R6, R7, R8 and R9 are H.

In a further very preferred embodiment, one or two of said R6, R7, R8 and R9 are independently halogen, hydroxyl, methoxy, ethoxy, —O—$C_n$-alkyl-R18 with n=1, 2 or 3, and wherein said R18 is —OR10, —C(O)—OR16 or CN, wherein preferably said R10 is selected from H or $CH_3$, wherein preferably said R16 is selected from H or $CH_3$, and wherein preferably at least two of said R6, R7, R8 and R9 are H, and wherein further preferably the others of said R6, R7, R8 and R9 are H. In a further very preferred embodiment, exactly one of said R6, R7, R8 and R9 are independently halogen, hydroxyl, methoxy, ethoxy, —O—$C_n$-alkyl-R18 with n=1, 2 or 3, and wherein said R18 is —OR10, —C(O)—OR16 or CN, wherein preferably said R10 is selected from H or CH₃, wherein preferably said R16 is selected from H or CH₃, and wherein preferably at least two of said R6, R7, R8 and R9 are H, and wherein further preferably the others of said R6, R7, R8 and R9 are H.

In a further very preferred embodiment, said R6 is halogen, hydroxyl, methoxy, ethoxy, —O—$C_n$-alkyl-R18 with n=1, 2 or 3, and wherein said R18 is —OR10, —C(O)—OR16 or CN, wherein preferably said R10 is selected from H or CH₃, wherein preferably said R16 is selected from H or CH₃, and wherein preferably at least two of said R7, R8 and R9 are H, and wherein further preferably R7, R8 and R9 are H.

In a further very preferred embodiment, said R7 is halogen, hydroxyl, methoxy, ethoxy, —O—$C_n$-alkyl-R18 with n=1, 2 or 3, and wherein said R18 is —OR10, —C(O)—OR16 or CN, wherein preferably said R10 is selected from H or CH₃, wherein preferably said R16 is selected from H or CH₃, and wherein preferably at least two of said R6, R8 and R9 are H, and wherein further preferably R6, R8 and R9 are H.

In a further very preferred embodiment, said R8 is halogen, hydroxyl, methoxy, ethoxy, —O—$C_n$-alkyl-R18 with n=1, 2 or 3, and wherein said R18 is —OR10, —C(O)—OR16 or CN, wherein preferably said R10 is selected from H or CH₃, wherein preferably said R16 is selected from H or CH₃, and wherein preferably at least two of said R6, R7 and R9 are H, and wherein further preferably R6, R7 and R9 are H.

In a further very preferred embodiment, said R9 is halogen, hydroxyl, methoxy, ethoxy, —O—$C_n$-alkyl-R18 with n=1, 2 or 3, and wherein said R18 is —OR10, —C(O)—OR16 or CN, wherein preferably said R10 is selected from H or CH₃, wherein preferably said R16 is selected from H or CH₃, and wherein preferably at least two of said R6, R7 and R8 are H, and wherein further preferably R6, R7 and R8 are H.

In a further very preferred embodiment, said R6 is halogen, hydroxyl, methoxy, ethoxy, —O—$C_n$-alkyl-R18 with n=2 or 3, and wherein said R18 is —OR10, wherein preferably said R10 is selected from H or CH₃, and wherein at least two of said R7, R8 and R9 are H, and wherein preferably said R7, R8 and R9 are H. In a further very preferred embodiment, said R6 is halogen, hydroxyl, methoxy, ethoxy, —O—$C_n$-alkyl-R18 with n=2 or 3, and wherein said R18 is —C(O)—OR16, wherein preferably said R16 is selected from H or CH₃, and wherein at least two of said R7, R8 and R9 are H, and wherein preferably said R7, R8 and R9 are H. In a further very preferred embodiment, said R6 is halogen, hydroxyl, methoxy, ethoxy, —O—$C_n$-alkyl-R18 with n=2 or 3, and wherein said R18 is CN, and wherein at least two of said R7, R8 and R9 are H, and wherein preferably said R7, R8 and R9 are H.

In a further very preferred embodiment, said R7 is halogen, hydroxyl, —O—$C_n$-alkyl-R18 with n=2 or 3, and wherein said R18 is —OR10, wherein preferably said R10 is H, and wherein at least two of said R6, R8 and R9 are H, and wherein preferably said R6, R8 and R9 are H. In a further very preferred embodiment, said R7 is halogen, hydroxyl, —O—$C_n$-alkyl-R18 with n=2 or 3, and wherein said R18 is —C(O)—OR16, wherein preferably said R16 is H, and wherein at least two of said R6, R8 and R9 are H, and wherein preferably said R6, R8 and R9 are H. In a further very preferred embodiment, said R7 is halogen, hydroxyl, —O—$C_n$-alkyl-R18 with n=2 or 3, and wherein said R18 is CN, and wherein at least two of said R6, R8 and R9 are H, and wherein preferably said R6, R8 and R9 are H.

In a further very preferred embodiment, said R8 is halogen, hydroxyl, methoxy, ethoxy, —O—$C_n$-alkyl-R18 with n=2 or 3, and wherein said R18 is —OR10, wherein preferably said R10 is selected from H or CH₃, and wherein at least two of said R6, R7 and R9 are H, and wherein preferably said R6, R7 and R9 are H. In a further very preferred embodiment, said R8 is halogen, hydroxyl, methoxy, ethoxy, —O—$C_n$-alkyl-R18 with n=2 or 3, and wherein said R18 is —C(O)—OR16, wherein preferably said R16 is selected from H or CH₃, and wherein at least two of said R6, R7 and R9 are H, and wherein preferably said R6, R7 and R9 are H. In a further very preferred embodiment, said R8 is halogen, hydroxyl, methoxy, ethoxy, —O—$C_n$-alkyl-R18 with n=2 or 3, and wherein said R18 is CN, and wherein at least two of said R7, R8 and R9 are H, and wherein preferably said R6, R7 and R9 are H.

In a further very preferred embodiment, said R9 is halogen, hydroxyl, methoxy, ethoxy, —O—$C_n$-alkyl-R18 with n=2 or 3, and wherein said R18 is —OR10, wherein preferably said R10 is selected from H or CH₃, and wherein at least two of said R6, R7 and R8 are H, and wherein preferably said R6, R7 and R8 are H. In a further very preferred embodiment, said R9 is halogen, hydroxyl, methoxy, ethoxy, —O—$C_n$-alkyl-R18 with n=2 or 3, and wherein said R18 is —C(O)—OR16, wherein preferably said R16 is selected from H or CH₃, and wherein at least two of said R6, R7 and R8 are H, and wherein preferably said R6, R7 and R8 are H. In a further very preferred embodiment, said R9 is halogen, hydroxyl, methoxy, ethoxy, —O—$C_n$-alkyl-R18 with n=2 or 3, and wherein said R18 is CN, and wherein at least two of said R6, R7 and R8 are H, and wherein preferably said R6, R7 and R8 are H.

In a further very preferred embodiment, said R8 is selected from Cl, F, CN and methoxy, and wherein R6, R7, and R9 is H. In a further very preferred embodiment, said R8 is methoxy, and wherein R6, R7, and R9 is H. In a further very preferred embodiment, said R8 is Cl, F, methoxy, hydroxy, or —O—$C_n$-alkyl-R18 with n=2 or 3, and wherein said R18 is —OR10, —C(O)—OR16 or CN, wherein preferably said R10 is selected from H or CH₃, wherein preferably said R16 is selected from H or CH₃, and wherein preferably at least two of said R6, R7 and R9 are H, and wherein further preferably said R6, R7 and R9 are H.

In a further very preferred embodiment, said R6 is Cl, and wherein R7, R8, and R9 is H. In a further very preferred embodiment, said R6 is Cl, OH or methoxy and wherein two of said R7, R8, and R9 are H. In a further very preferred embodiment, said R6 is Cl, OH or methoxy and wherein R7, R8, and R9 is H.

In a further very preferred embodiment, said R7 is Cl or methoxy, and wherein R6, R8, and R9 is H. In a further very preferred embodiment, said R7 is Cl, F, hydroxy, or —O—$C_n$-alkyl-R18 with n=2 or 3, and wherein said R18 is —OR10, —C(O)—OR16 or CN, wherein preferably said R10 is selected from H, wherein preferably said R16 is H, and wherein preferably at least two of said R6, R8 and R9 are H, and wherein further preferably said R6, R8 and R9 are H.

In a further very preferred embodiment, said R9 is Cl, OH or methoxy and wherein two of said R6, R7 and R8 are H. In a further very preferred embodiment, said R6 is Cl, OH or methoxy and wherein R6, R7 and R8 is H.

In a further preferred embodiment, said R6 to R9 is H, wherein at least one of said R1, R2, R4 and R5 is not H. In a further very preferred embodiment, said R6 to R9 is H, and wherein exactly one of said R1, R2, R4 and R5 is not H. In a further very preferred embodiment, said R6 to R9 is H, and wherein R1 or R5 is $C_1$-$C_6$-alkyl optionally substituted by one or more R11, and wherein R2 and R4 is H. In a further very preferred embodiment, said R6 to R9 is H, and wherein R1 or R5 is $C_1$-$C_3$-alkyl optionally substituted by one or more R11, and wherein R2 and R4 is H. In a further very preferred embodiment, said R6 to R9 is H, and wherein R1 or R5 is $C_1$-$C_3$-alkyl, and wherein R2 and R4 is H. In a further very preferred embodiment, said R6 to R9 is H, and wherein R1 or R5 is methyl, ethyl, cyclopropyl or iso-propyl, and wherein R2 and R4 is H.

In a further very preferred embodiment, said R6 to R9 is H, and wherein R3 is $C_1$-$C_6$-alkyl optionally substituted by one or more R11, and wherein R1 or R5 is $C_1$-$C_6$-alkyl optionally substituted by one or more R11, and wherein R2 and R4 is H. In a further very preferred embodiment, said R6 to R9 is H, and wherein R3 is $C_1$-$C_3$-alkyl optionally substituted by one or more R11, and wherein R1 or R5 is $C_1$-$C_3$-alkyl optionally substituted by one or more R11, and wherein R2 and R4 is H. In a further very preferred embodiment, said R6 to R9 is H, and wherein R3 is $C_1$-$C_3$-alkyl, and wherein R1 or R5 is $C_1$-$C_3$-alkyl, and wherein R2 and R4 is H. In a further very preferred embodiment, said R6 to R9 is H, and wherein R3 is methyl, ethyl or iso-propyl, and wherein R1 or R5 is methyl, ethyl, cyclopropyl or iso-propyl, and wherein R2 and R4 is H.

In a further very preferred embodiment, one of said R1 and R5 is selected from halogen, $C_1$-$C_3$-alkyl optionally substituted by one or more R11, $C_1$-$C_3$-alkoxy optionally substituted by one or more R11, and wherein the other of said R1 and R5 is H. In a further very preferred embodiment, one of said R1 and R5 is selected from halogen, $C_1$-$C_3$-alkyl optionally substituted by one or more R11, $C_1$-$C_3$-alkoxy- and wherein the other of said R1 and R5 is H. In a further very preferred embodiment, one of said R1 and R5 is selected from halogen, methyl, ethyl, trifluoromethyl, methoxy and ethoxy, and wherein the other of said R1 and R5 is H. In a further very preferred embodiment, one of said R1 and R5 is selected from F, Cl, Br, methyl, ethyl, trifluoromethyl and methoxy, and wherein the other of said R1 and R5 is H.

In a further very preferred embodiment, said R2 and R4 is H, and wherein one of said R1 and R5 is selected from halogen, $C_1$-$C_3$-alkyl optionally substituted by one or more R11, $C_1$-$C_3$-alkoxy optionally substituted by one or more R11, and wherein the other of said R1 and R5 is H. In a further very preferred embodiment, said R2 and R4 is H, and wherein one of said R1 and R5 is selected from halogen, $C_1$-$C_3$-alkyl optionally substituted by one or more R11, $C_1$-$C_3$-alkoxy- and wherein the other of said R1 and R5 is H. In a further very preferred embodiment, said R2 and R4 is H, and wherein one of said R1 and R5 is selected from halogen, methyl, ethyl, trifluoromethyl, methoxy and iso-propoxy, and wherein the other of said R1 and R5 is H.

In a further very preferred embodiment, said R2 and R4 is H, and wherein one of said R1 and R5 is selected from F, Cl, Br, methyl, ethyl, trifluoromethyl and methoxy, and wherein the other of said R1 and R5 is H. In a further very preferred embodiment, said R2 and R4 is H, and wherein one of said R1 and R5 is selected from F, Cl, Br, methyl, trifluoromethyl and methoxy, and wherein the other of said R1 and R5 is H.

In a further very preferred embodiment, said R3 is selected from halogen, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$C_n$-alkyl-N(R14)-C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3; —O—$C_n$-alkyl-R18 with n=0-3; —OPO(OR10)$_2$, —PO(OR10)$_2$, and a heterocycle optionally substituted by one or more R17, and 4 to 6 membered heterocycle optionally substituted by one or more R17, said heterocycle can be aromatic, partially saturated or fully saturated and contains 1 to 4 hetero atoms selected from nitrogen, oxygen with the proviso that each ring system cannot contain more than 2 oxygen atoms, and wherein preferably said heterocycle contains at least one nitrogen as hetero atom.

In a further very preferred embodiment, said R3 is selected from halogen, CN, $C_1$-$C_3$-alkyl optionally substituted by one or more R11, $C_1$-$C_3$-alkoxy optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$C_n$-alkyl-N(R14)-C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3; —O—$C_n$-alkyl-R18 with n=0-3; —OPO(OR10)$_2$, —PO(OR10)$_2$, and a heterocycle optionally substituted by one or more R17, and 4 to 6 membered heterocycle optionally substituted by one or more R17, said heterocycle can be aromatic, partially saturated or fully saturated and contains 1 to 4 hetero atoms selected from nitrogen and oxygen, with the proviso that each ring system cannot contain more than 2 oxygen atoms, and wherein preferably said heterocycle contains at least one nitrogen as hetero atom.

In a further very preferred embodiment, said R3 is selected from halogen, CN, $C_1$-$C_3$-alkyl optionally substituted by one or more R11, $C_1$-$C_3$-alkoxy optionally substituted by one or more R11, $C_3$-$C_6$-cycloalkyl optionally substituted by one or more R11, —C(O)N(R12)(R13); —N(R14)-C(O)—R15; —C(O)—OR16; —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3; —O—$C_n$-alkyl-R18 with n=0-3; —OPO(OR10)$_2$, —PO(OR10)$_2$, and 4 to 6 membered heterocycle optionally substituted by one or more R17, wherein said heterocycle is selected from tetrazole, pyrazole, pyrrole, oxazole, thiazole, imidazole, triazole, pyrrolidine, pyrrolidine-2-one, piperidine and morpholine. In a further very preferred embodiment, said R3 is selected from halogen, CN, $C_1$-$C_3$-alkyl optionally substituted by one or more R11, $C_1$-$C_3$-alkoxy optionally substituted by one or more R11, $C_3$-$C_6$-cycloalkyl optionally substituted by one or more R11, —C(O)N(R12)(R13); —N(R14)-C(O)—R15; —C(O)—OR16; —O($C_1$-$C_3$-alkyl-O)$_m$—$C_1$-$C_3$-alkyl-OR10 with m=0-3, —OR16; —NH—$C_n$-alkyl-R18 with n=0-3; —O—$C_n$-alkyl-R18 with n=0-3; —OPO(OR10)$_2$, —PO(OR10)$_2$, and 4 to 6 membered heterocycle optionally substituted by one or more R17, wherein said heterocycle is selected from tetrazole, pyrazole, pyrrole, oxazole, thiazole, imidazole, triazole, pyrrolidine, pyrrolidine-2-one, piperidine and morpholine.

In a further very preferred embodiment, said R3 is selected from F, Cl, Br, CN, $C_1$-$C_2$-alkyl-O—$C_1$-$C_2$-alkyl, $C_1$-$C_3$-alkyl, trifluoromethyl, $C_1$-$C_2$-alkoxy, —N(R14)-C(O)—R15, —C(O)—OR16, —O($C_1$-$C_3$-alkyl-O)$_m$—$C_1$-$C_3$-alkyl-OR11 with m=0-3, —OPO(OR10)$_2$, —PO(OR10)$_2$, and 4 to 6 membered heterocycle optionally substituted by one or more R17, wherein said heterocycle is selected from triazole and tetrazole.

In a further very preferred embodiment, said R3 is selected from F, Cl, Br, CN, CH$_2$—O—CH$_3$, methyl, ethyl iso-propyl, trifluoromethyl, methoxy, —N(R14)-C(O)—R15, —C(O)—OR16, —O(C$_1$-C$_3$-alkyl-O)$_m$—C$_1$-C$_3$-alkyl-OR11 with m=0-3, —OPO(OR10)$_2$, —PO(OR10)$_2$, and 4 to 6 membered heterocycle optionally substituted by one or more R17, wherein said heterocycle is selected from triazole and tetrazole.

In another very preferred embodiment, said R1, R2 and R4 are H; R3 is selected from methyl ethyl, cyclopropyl and iso-propyl; R5 is selected from H, Cl, Br, CF$_3$ and methyl; and at least one of said R6 to R9 is not H.

In another very preferred embodiment, said R3 is iso-propyl; and at least one of R6, R7, R8 or R9 is not H.

In another very preferred embodiment, said R1, R2, R4 and R5 are H; R3 is iso-propyl; and at least one of R6, R7, R8 or R9 is not H.

In another very preferred embodiment, said R1 is methyl; R2, R4 and R5 are H; and R3 is methyl; and at least one of R6, R7, R8 or R9 is not H.

In a further very preferred embodiment, said compound of formula (I) is selected from

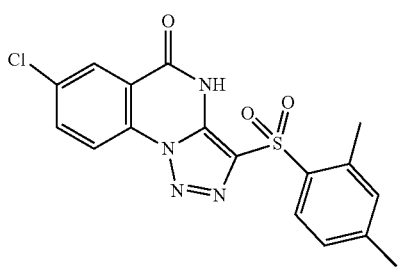

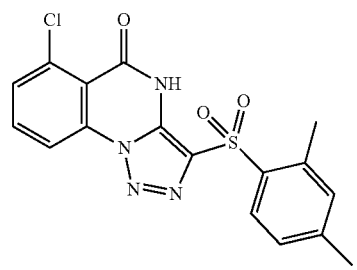

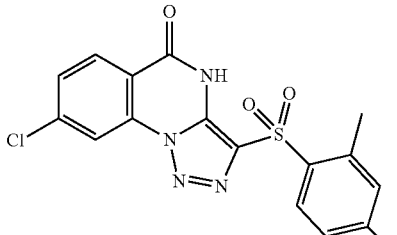

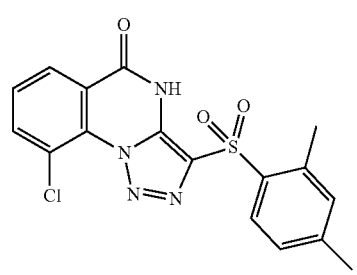

-continued

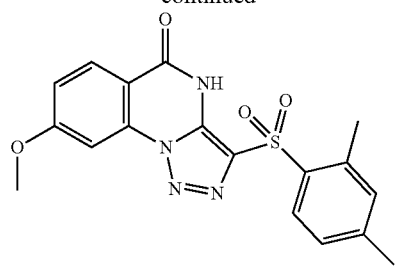

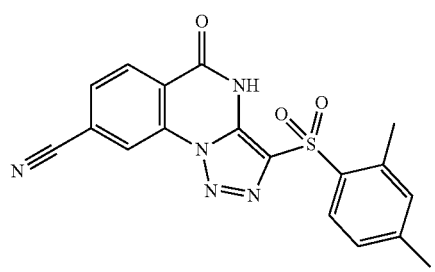

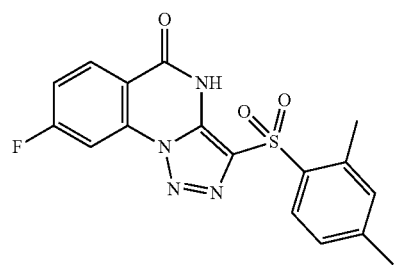

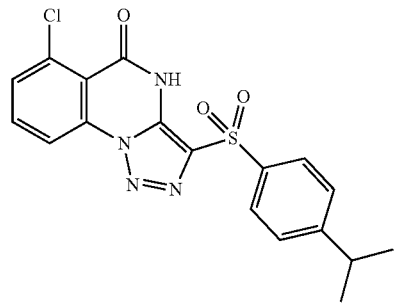

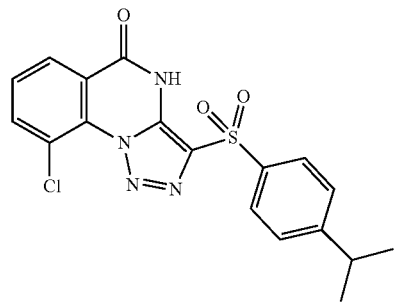

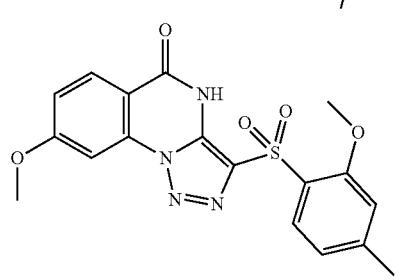

-continued
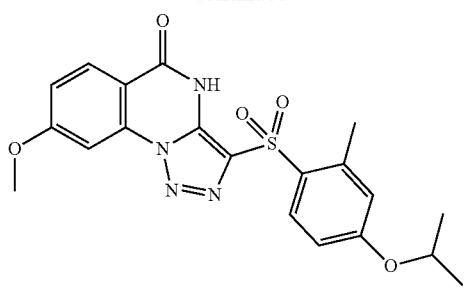
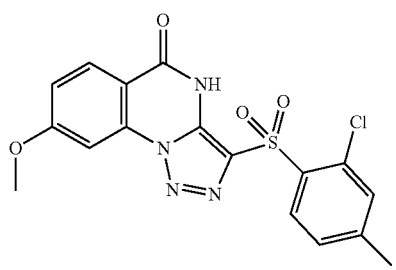
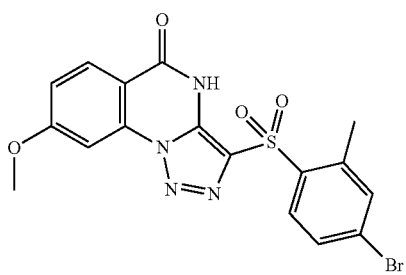
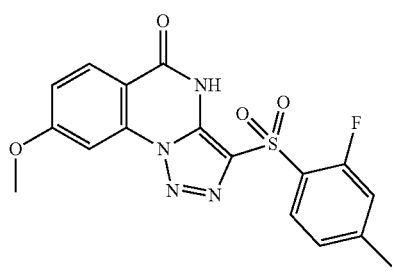
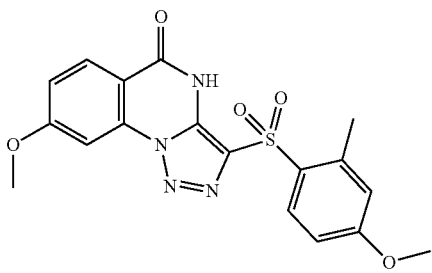
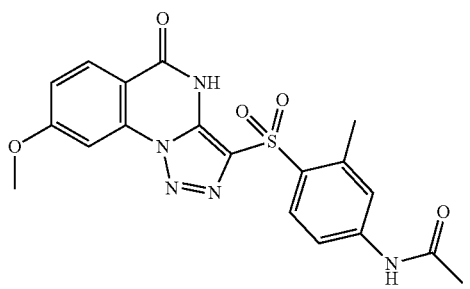
-continued
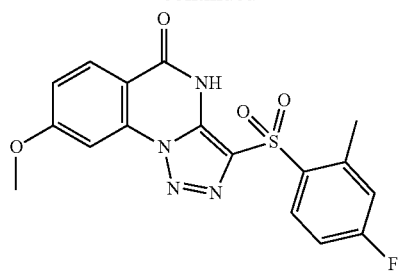
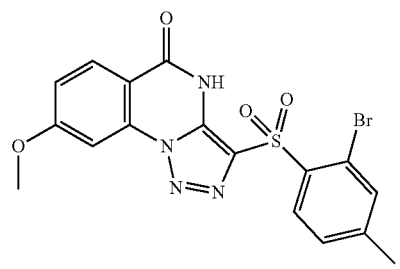
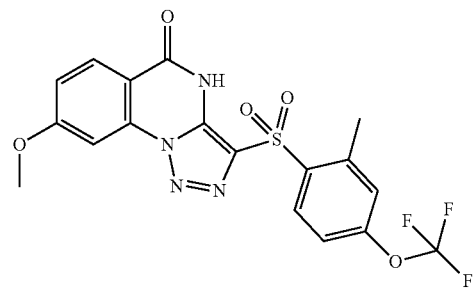
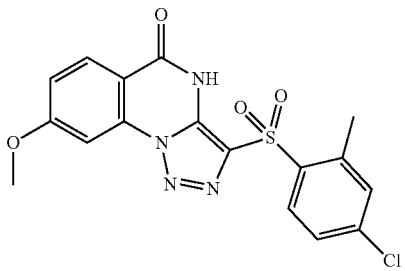
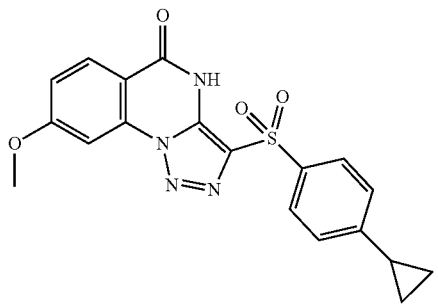
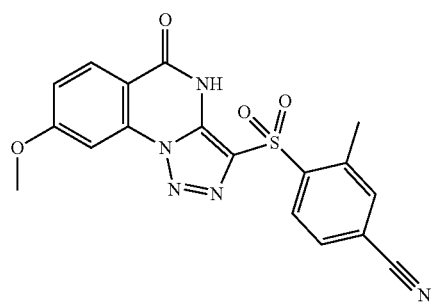

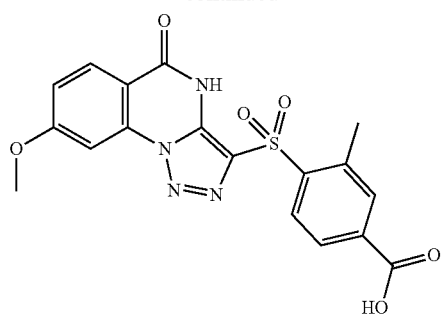
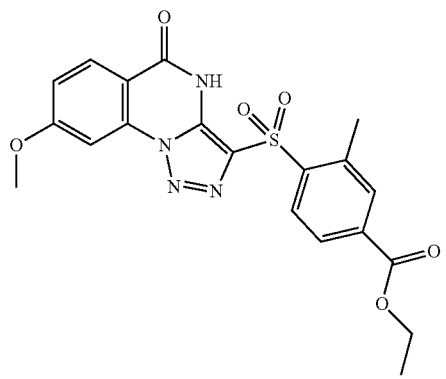
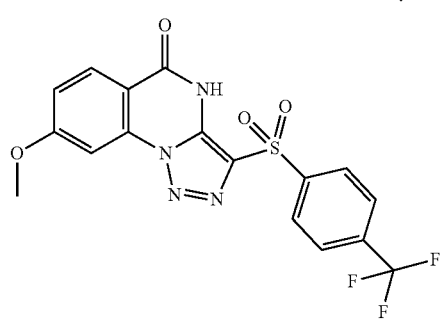
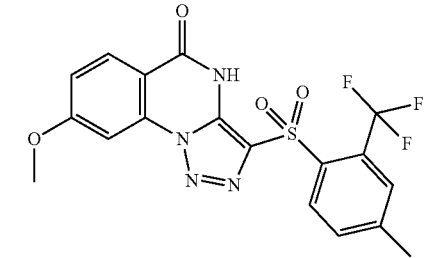
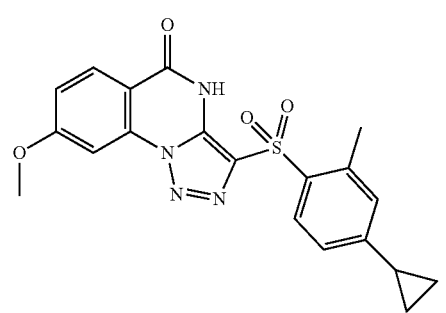
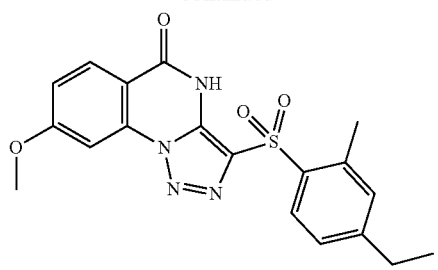
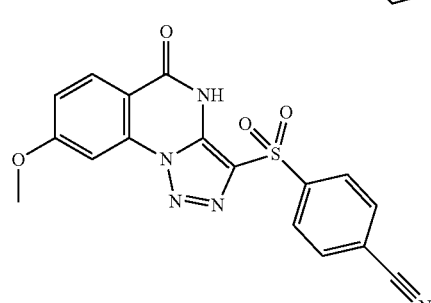
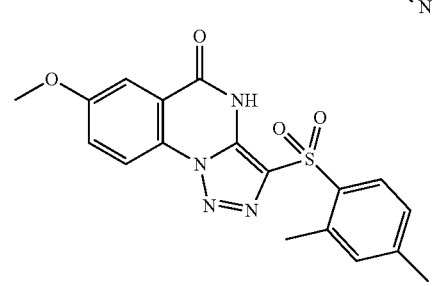
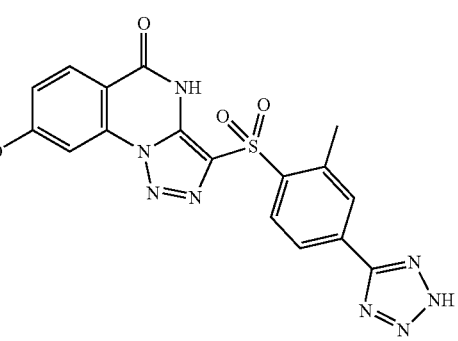
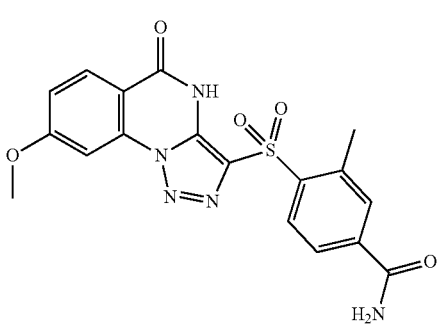

-continued
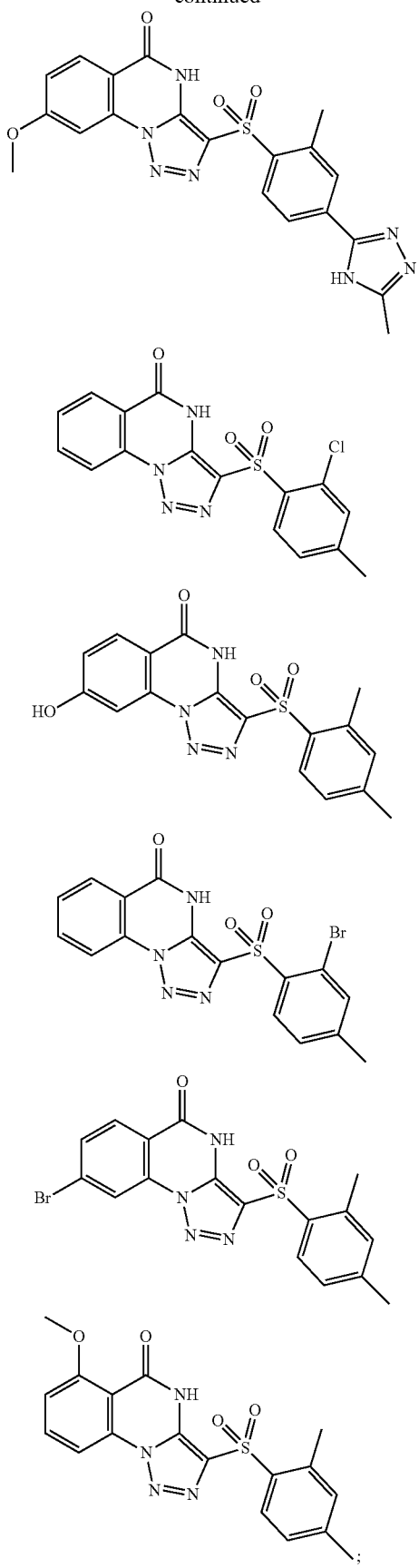
-continued
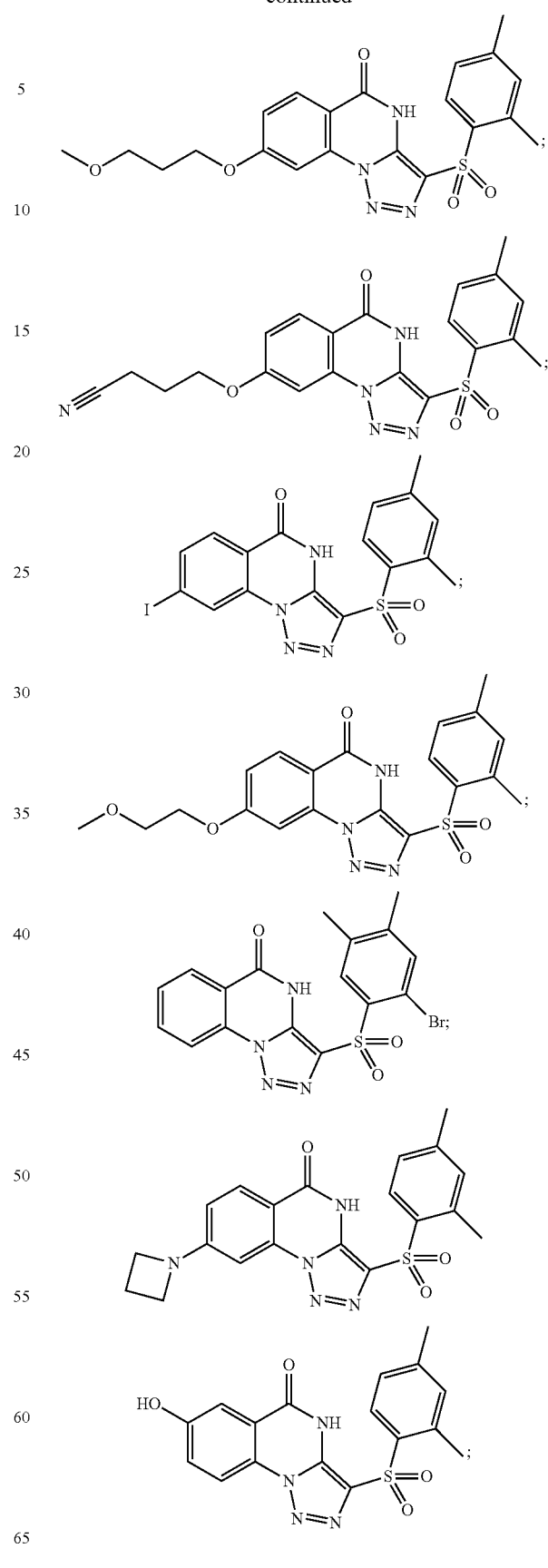

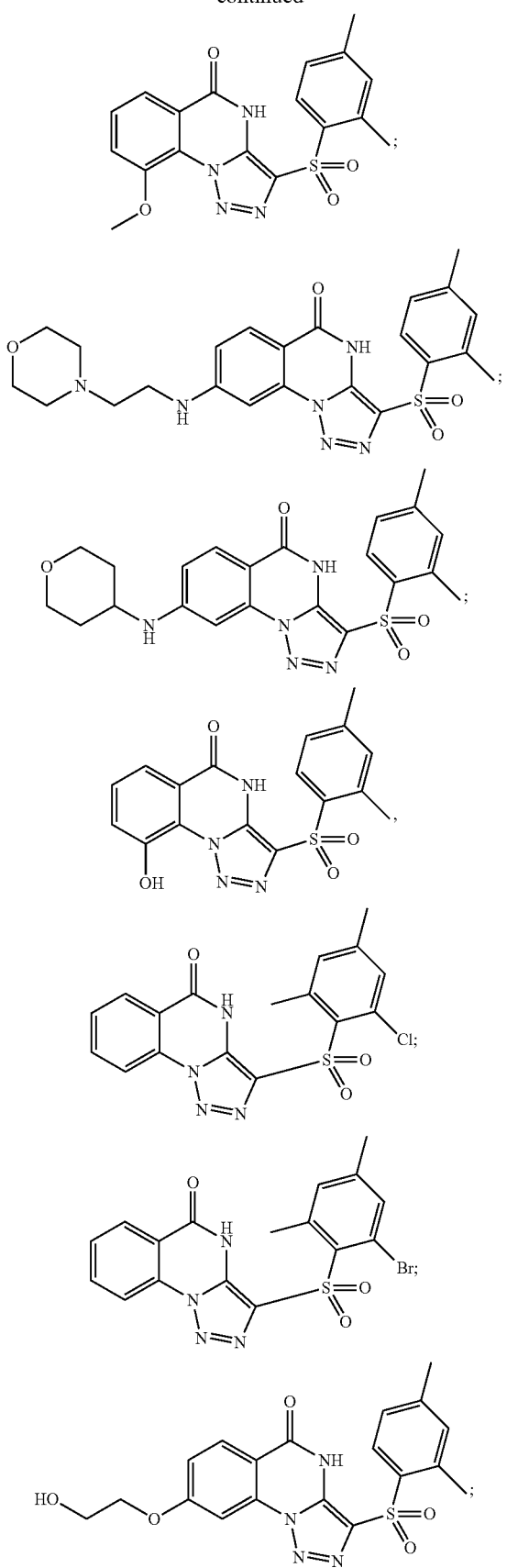
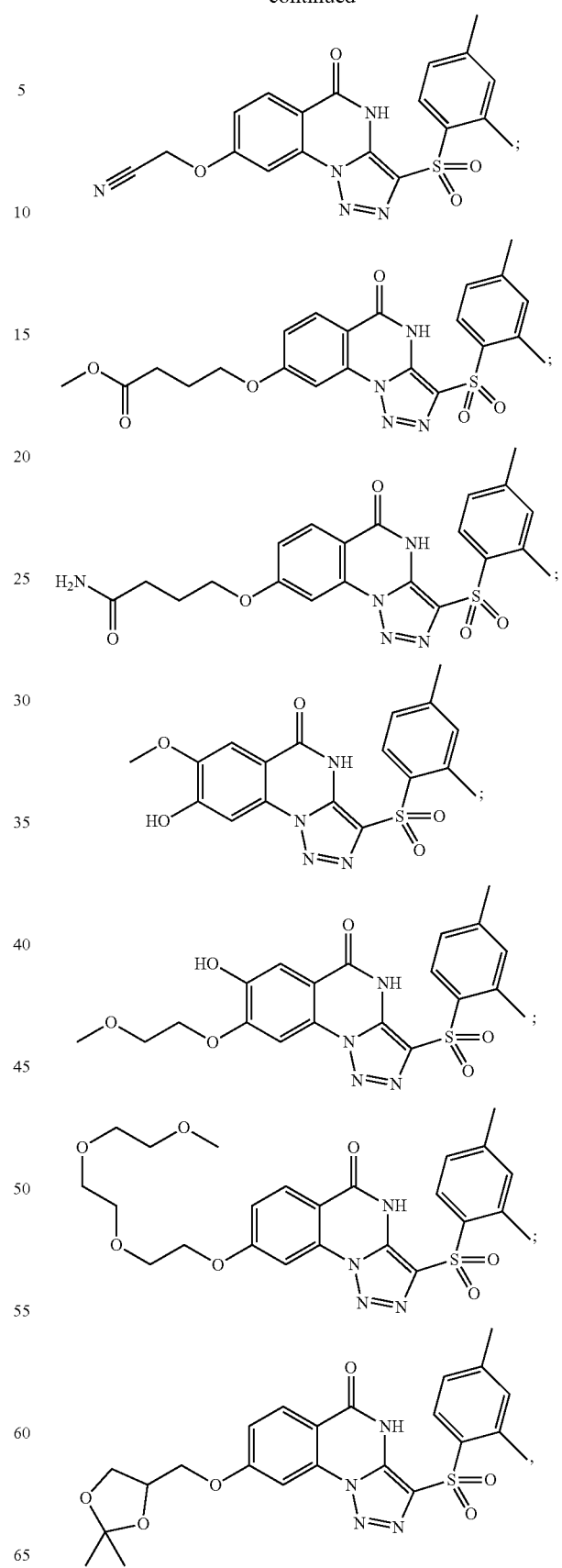

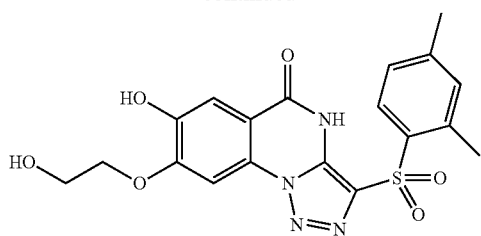
and wherein preferably the compound is selected from
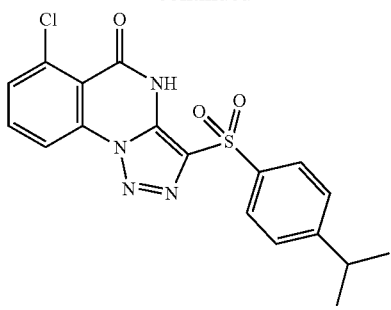
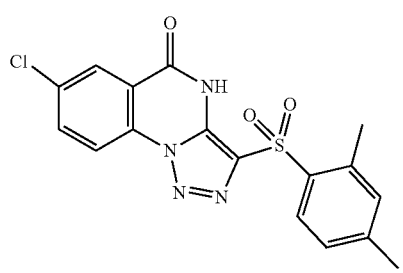
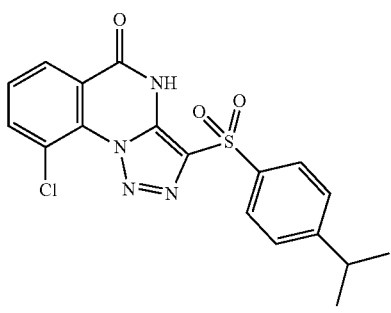
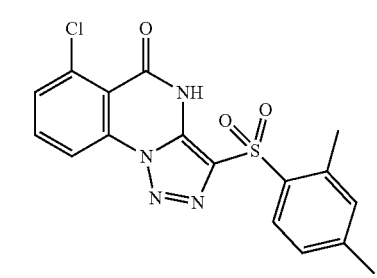
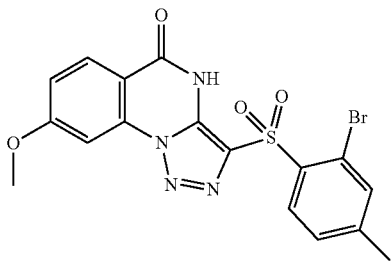
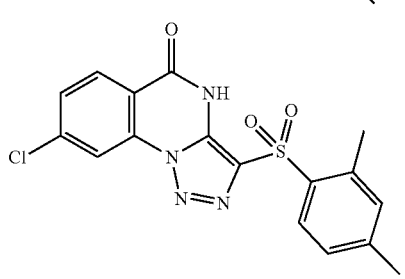
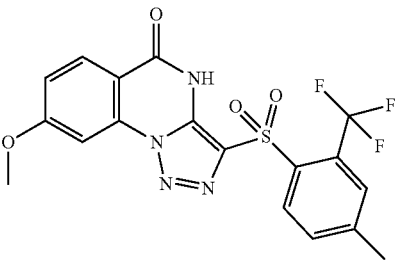
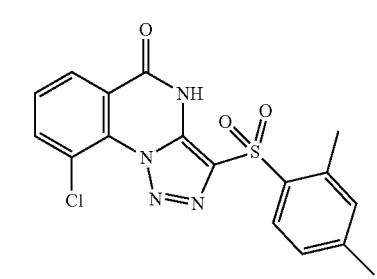
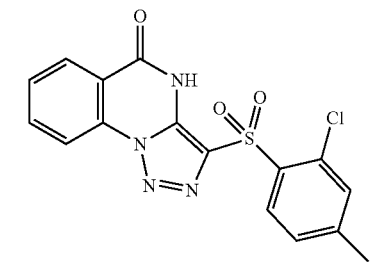
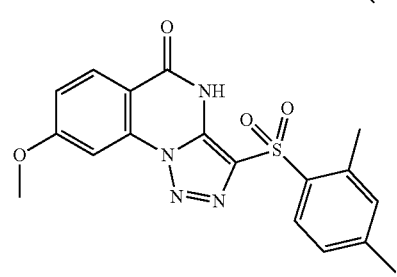

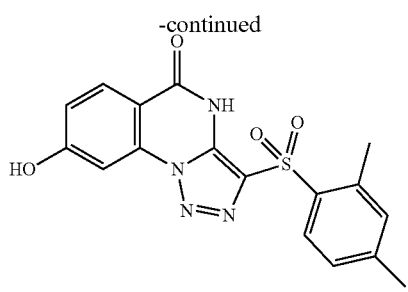
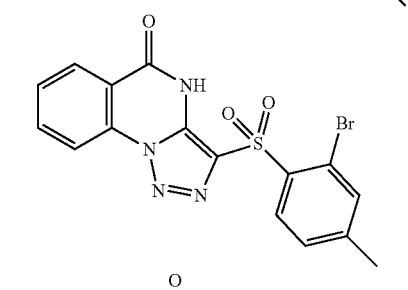
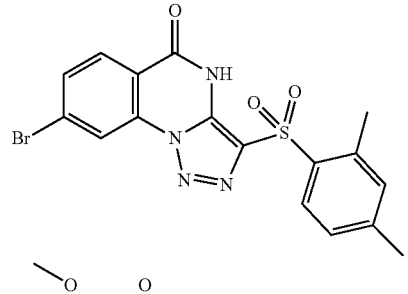
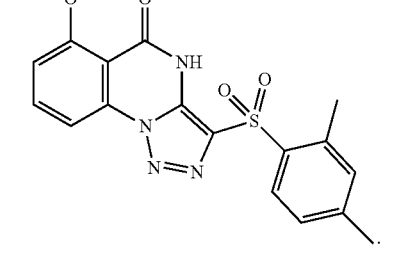
In a further very preferred embodiment, said compound is selected from
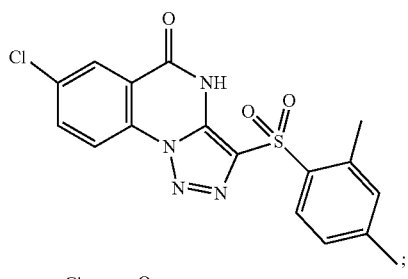
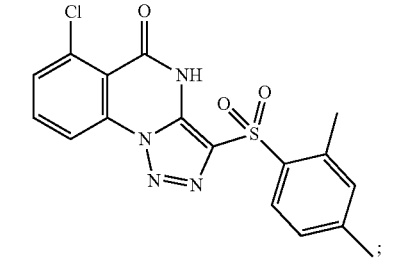
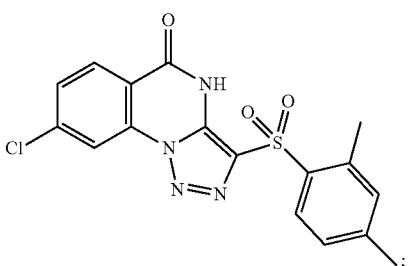
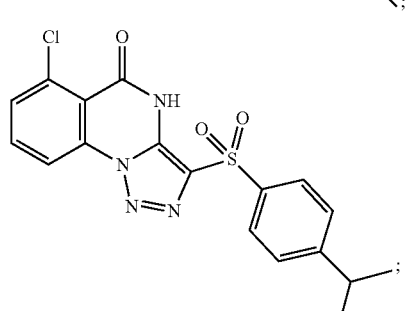
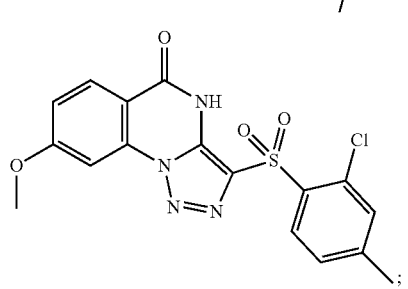
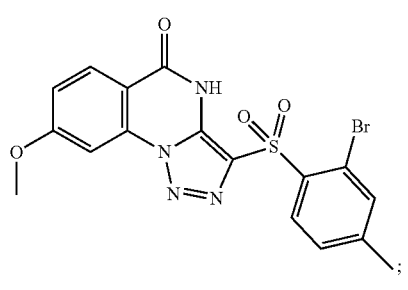
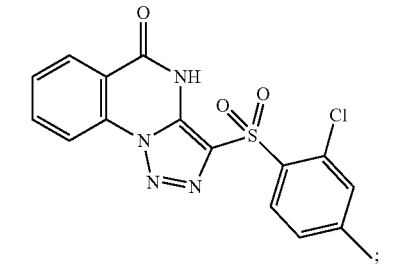
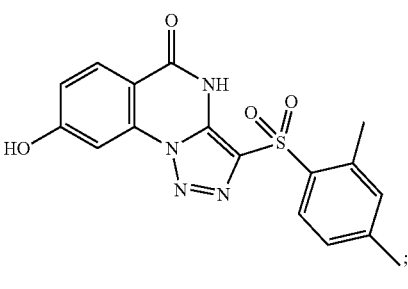

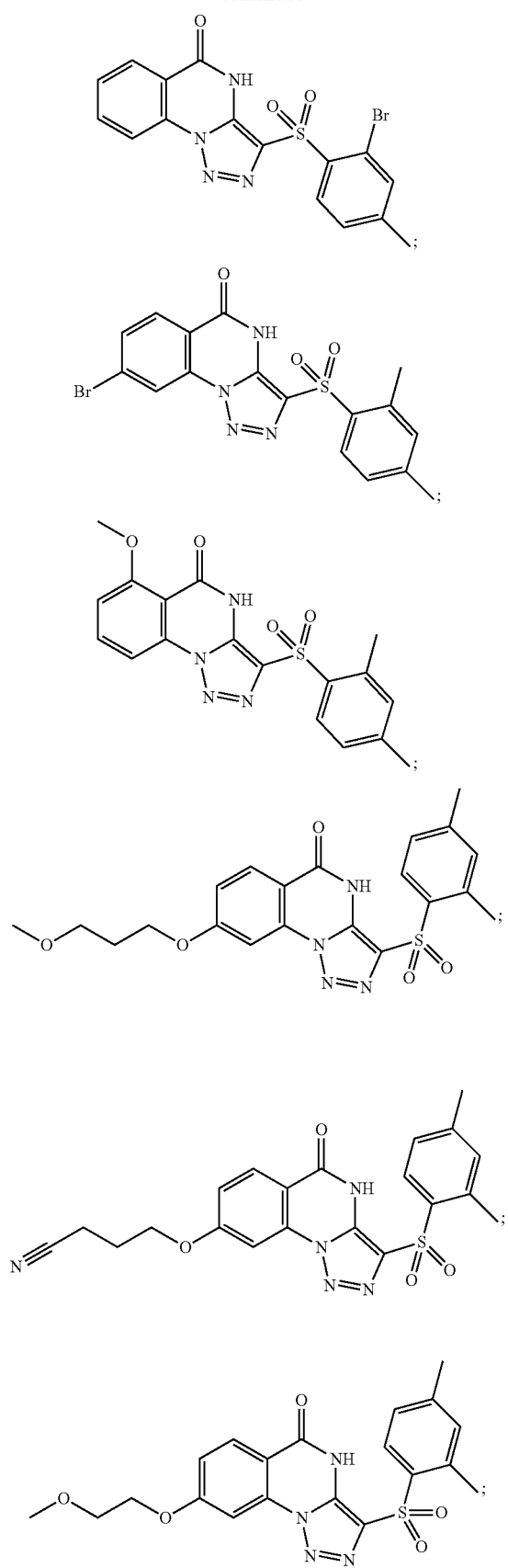
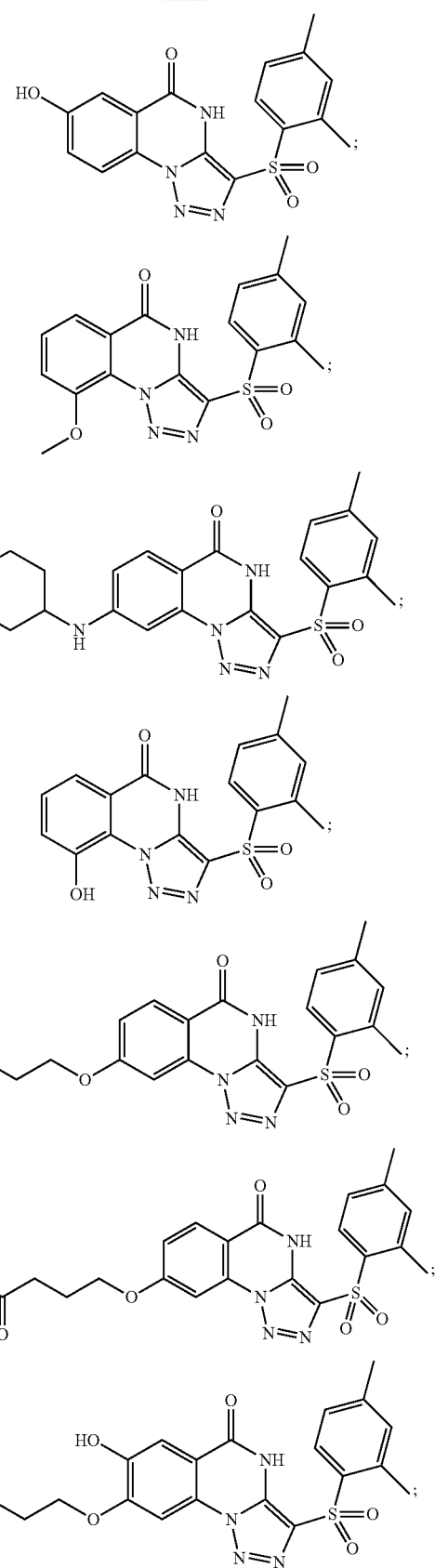

-continued

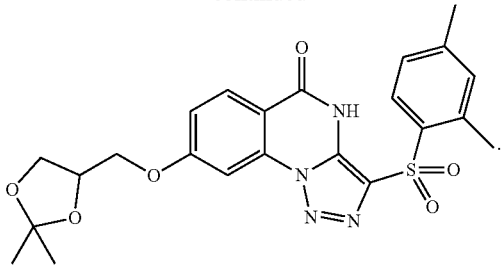

In a further very preferred embodiment, said compound is selected from
7-chloro-3-(2,4-dimethylphenyl)sulfonyl-4H-triazolo[1,5-a]quinazolin-5-one;
6-chloro-3-(2,4-dimethylphenyl)sulfonyl-4H-triazolo[1,5-a]quinazolin-5-one;
8-chloro-3-(2,4-dimethylphenyl)sulfonyl-4H-triazolo[1,5-a]quinazolin-5-one;
9-chloro-3-(2,4-dimethylphenyl)sulfonyl-4H-triazolo[1,5-a]quinazolin-5-one;
3-(2,4-dimethylphenyl)sulfonyl-8-methoxy-4H-triazolo[1,5-a]quinazolin-5-one;
3-(2,4-dimethylphenyl)sulfonyl-5-oxo-4H-triazolo[1,5-a]quinazoline-8-carbonitrile;
3-(2,4-dimethylphenyl)sulfonyl-8-fluoro-4H-triazolo[1,5-a]quinazolin-5-one;
6-chloro-3-(4-isopropylphenyl)sulfonyl-4H-triazolo[1,5-a]quinazolin-5-one;
9-chloro-3-(4-isopropylphenyl)sulfonyl-4H-triazolo[1,5-a]quinazolin-5-one;
8-methoxy-3-(2-methoxy-4-methyl-phenyl)sulfonyl-4H-triazolo[1,5-a]quinazolin-5-one;
3-(4-isopropoxy-2-methyl-phenyl)sulfonyl-8-methoxy-4H-triazolo[1,5-a]quinazolin-5-one;
3-(2-chloro-4-methyl-phenyl)sulfonyl-8-methoxy-4H-triazolo[1,5-a]quinazolin-5-one;
3-(4-bromo-2-methyl-phenyl)sulfonyl-8-methoxy-4H-triazolo[1,5-a]quinazolin-5-one;
3-(2-fluoro-4-methyl-phenyl)sulfonyl-8-methoxy-4H-triazolo[1,5-a]quinazolin-5-one;
8-methoxy-3-(4-methoxy-2-methyl-phenyl)sulfonyl-4H-triazolo[1,5-a]quinazolin-5-one;
N-[4-[(8-methoxy-5-oxo-4H-triazolo[1,5-a]quinazolin-3-yl)sulfonyl]-3-methyl-phenyl]acetamide;
3-(4-fluoro-2-methyl-phenyl)sulfonyl-8-methoxy-4H-triazolo[1,5-a]quinazolin-5-one;
3-(2-bromo-4-methyl-phenyl)sulfonyl-8-methoxy-4H-triazolo[1,5-a]quinazolin-5-one;
8-methoxy-3-[2-methyl-4-(trifluoromethoxy)phenyl]sulfonyl-4H-triazolo[1,5-a]quinazolin-5-one;
3-(4-chloro-2-methyl-phenyl)sulfonyl-8-methoxy-4H-triazolo[1,5-a]quinazolin-5-one;
3-(4-cyclopropylphenyl)sulfonyl-8-methoxy-4H-triazolo[1,5-a]quinazolin-5-one:
4-[(8-methoxy-5-oxo-4H-triazolo[1,5-a]quinazolin-3-yl)sulfonyl]-3-methyl-benzonitrile;
4-[(8-methoxy-5-oxo-4H-triazolo[1,5-a]quinazolin-3-yl)sulfonyl]-3-methyl-benzoic acid;
ethyl 4-[(8-methoxy-5-oxo-4H-triazolo[1,5-a]quinazolin-3-yl)sulfonyl]-3-methyl-benzoate;
8-methoxy-3-[4-(trifluoromethyl)phenyl]sulfonyl-4H-triazolo[1,5-a]quinazolin-5-one;
8-methoxy-3-[4-methyl-2-(trifluoromethyl)phenyl]sulfonyl-4H-triazolo[1,5-a]quinazolin-5-one;
3-(4-cyclopropyl-2-methyl-phenyl)sulfonyl-8-methoxy-4H-triazolo[1,5-a]quinazolin-5-one;
3-(4-ethyl-2-methyl-phenyl)sulfonyl-8-methoxy-4H-triazolo[1,5-a]quinazolin-5-one;
4-[(8-methoxy-5-oxo-4H-triazolo[1,5-a]quinazolin-3-yl)sulfonyl]benzonitrile;
3-(2,4-dimethylphenyl)sulfonyl-7-methoxy-4H-triazolo[1,5-a]quinazolin-5-one;
8-methoxy-3-[2-methyl-4-(2H-tetrazol-5-yl)phenyl]sulfonyl-4H-triazolo[1,5-a]quinazolin-5-one;
4-[(8-methoxy-5-oxo-4H-triazolo[1,5-a]quinazolin-3-yl)sulfonyl]-3-methyl-benzamide;
8-methoxy-3-[2-methyl-4-(5-methyl-4H-1,2,4-triazol-3-yl)phenyl]sulfonyl-4H-triazolo[1,5-a]quinazolin-5-one;
3-(2-chloro-4-methyl-phenyl)sulfonyl-4H-triazolo[1,5-a]quinazolin-5-one;
3-(2,4-dimethylphenyl)sulfonyl-8-hydroxy-4H-triazolo[1,5-a]quinazolin-5-one;
3-(2-Bromo-4-methyl-phenyl)sulfonyl-4H-triazolo[1,5-a]quinazolin-5-one;
8-bromo-3-(2,4-dimethylphenyl)sulfonyl-4H-triazolo[1,5-a]quinazolin-5-one; and
3-(2,4-dimethylphenyl)sulfonyl-6-methoxy-4H-triazolo[1,5-a]quinazolin-5-one;
3-(2,4-dimethylphenyl)sulfonyl-8-(3-methoxypropoxy)-4H-triazolo[1,5-a]quinazolin-5-one;
4-[[3-(2,4-dimethylphenyl)sulfonyl-5-oxo-4H-triazolo[1,5-a]quinazolin-8-yl]oxy]butanenitrile;
3-(2,4-dimethylphenyl)sulfonyl-8-iodo-4H-triazolo[1,5-a]quinazolin-5-one;
3-(2,4-dimethylphenyl)sulfonyl-8-(2-methoxyethoxy)-4H-triazolo[1,5-a]quinazolin-5-one;
3-(2-bromo-4,5-dimethyl-phenyl)sulfonyl-4H-triazolo[1,5-a]quinazolin-5-one;
8-(azetidin-1-yl)-3-(2,4-dimethylphenyl)sulfonyl-4H-triazolo[1,5-a]quinazolin-5-one;
3-(2,4-dimethylphenyl)sulfonyl-7-hydroxy-4H-triazolo[1,5-a]quinazolin-5-one;
3-(2,4-dimethylphenyl)sulfonyl-9-methoxy-4H-triazolo[1,5-a]quinazolin-5-one;
3-(2,4-dimethylphenyl)sulfonyl-8-(2-morpholinoethylamino)-4H-triazolo[1,5-a]quinazolin-5-one;
3-(2,4-dimethylphenyl)sulfonyl-8-(tetrahydropyran-4-ylamino)-4H-triazolo[1,5-a]quinazolin-5-one;
3-(2,4-dimethylphenyl)sulfonyl-9-hydroxy-4H-triazolo[1,5-a]quinazolin-5-one;
3-(2-chloro-4,6-dimethyl-phenyl)sulfonyl-4H-triazolo[1,5-a]quinazolin-5-one;
3-(2-bromo-4,6-dimethyl-phenyl)sulfonyl-4H-triazolo[1,5-a]quinazolin-5-one;
3-(2,4-dimethylphenyl)sulfonyl-8-(2-hydroxyethoxy)-4H-triazolo[1,5-a]quinazolin-5-one;
2-[[3-(2,4-dimethylphenyl)sulfonyl-5-oxo-4H-triazolo[1,5-a]quinazolin-8-yl]oxy]acetonitrile;
methyl 4-[[3-(2,4-dimethylphenyl)sulfonyl-5-oxo-4H-triazolo[1,5-a]quinazolin-8-yl]oxy]butanoate;
4-[[3-(2,4-dimethylphenyl)sulfonyl-5-oxo-4H-triazolo[1,5-a]quinazolin-8-yl]oxy]butanamide;
3-(2,4-dimethylphenyl)sulfonyl-8-hydroxy-7-methoxy-4H-triazolo[1,5-a]quinazolin-5-one;
3-(2,4-dimethylphenyl)sulfonyl-7-hydroxy-8-(2-methoxyethoxy)-4H-triazolo[1,5-a]quinazolin-5-one;
3-(2,4-dimethylphenyl)sulfonyl-8-[2-[2-(2-methoxyethoxy)ethoxy]ethoxy]-4H-triazolo[1,5-a]quinazolin-5-one;
8-[(2,2-dimethyl-1,3-dioxolan-4-yl)methoxy]-3-(2,4-dimethylphenyl)sulfonyl-4H-triazolo[1,5-a]quinazolin-5-one; and 3-(2,4-dimethylphenyl)sulfonyl-7-hydroxy-8-(2-hydroxyethoxy)-4H-triazolo[1,5-a]quinazolin-5-one.

In a further very preferred embodiment, said compound is selected from 7-chloro-3-(2,4-dimethylphenyl)sulfonyl-4H-triazolo[1,5-a]quinazolin-5-one;
6-chloro-3-(2,4-dimethylphenyl)sulfonyl-4H-triazolo[1,5-a]quinazolin-5-one;
8-chloro-3-(2,4-dimethylphenyl)sulfonyl-4H-triazolo[1,5-a]quinazolin-5-one;
9-chloro-3-(2,4-dimethylphenyl)sulfonyl-4H-triazolo[1,5-a]quinazolin-5-one;
3-(2,4-dimethylphenyl)sulfonyl-8-methoxy-4H-triazolo[1,5-a]quinazolin-5-one;
6-chloro-3-(4-isopropylphenyl)sulfonyl-4H-triazolo[1,5-a]quinazolin-5-one;
9-chloro-3-(4-isopropylphenyl)sulfonyl-4H-triazolo[1,5-a]quinazolin-5-one;
3-(2-chloro-4-methyl-phenyl)sulfonyl-8-methoxy-4H-triazolo[1,5-a]quinazolin-5-one;
3-(2-bromo-4-methyl-phenyl)sulfonyl-8-methoxy-4H-triazolo[1,5-a]quinazolin-5-one;
8-methoxy-3-[4-methyl-2-(trifluoromethyl)phenyl]sulfonyl-4H-triazolo[1,5-a]quinazolin-5-one;
3-(2-chloro-4-methyl-phenyl)sulfonyl-4H-triazolo[1,5-a]quinazolin-5-one;
3-(2,4-dimethylphenyl)sulfonyl-8-hydroxy-4H-triazolo[1,5-a]quinazolin-5-one;
3-(2-Bromo-4-methyl-phenyl)sulfonyl-4H-triazolo[1,5-a]quinazolin-5-one;
8-bromo-3-(2,4-dimethylphenyl)sulfonyl-4H-triazolo[1,5-a]quinazolin-5-one;
3-(2,4-dimethylphenyl)sulfonyl-6-methoxy-4H-triazolo[1,5-a]quinazolin-5-one;
3-(2,4-dimethylphenyl)sulfonyl-8-(3-methoxypropoxy)-4H-triazolo[1,5-a]quinazolin-5-one;
4-[[3-(2,4-dimethylphenyl)sulfonyl-5-oxo-4H-triazolo[1,5-a]quinazolin-8-yl]oxy]butanenitrile;
3-(2,4-dimethylphenyl)sulfonyl-8-(2-methoxyethoxy)-4H-triazolo[1,5-a]quinazolin-5-one;
3-(2,4-dimethylphenyl)sulfonyl-7-hydroxy-4H-triazolo[1,5-a]quinazolin-5-one;
3-(2,4-dimethylphenyl)sulfonyl-9-methoxy-4H-triazolo[1,5-a]quinazolin-5-one;
3-(2,4-dimethylphenyl)sulfonyl-8-(tetrahydropyran-4-ylamino)-4H-triazolo[1,5-a]quinazolin-5-one;
3-(2,4-dimethylphenyl)sulfonyl-9-hydroxy-4H-triazolo[1,5-a]quinazolin-5-one;
3-(2,4-dimethylphenyl)sulfonyl-8-(2-hydroxyethoxy)-4H-triazolo[1,5-a]quinazolin-5-one;
methyl 4-[[3-(2,4-dimethylphenyl)sulfonyl-5-oxo-4H-triazolo[1,5-a]quinazolin-8-yl]oxy]butanoate;
3-(2,4-dimethylphenyl)sulfonyl-7-hydroxy-8-(2-methoxyethoxy)-4H-triazolo[1,5-a]quinazolin-5-one; and
8-[(2,2-dimethyl-1,3-dioxolan-4-yl)methoxy]-3-(2,4-dimethylphenyl)sulfonyl-4H-triazolo[1,5-a]quinazolin-5-one.

In a further very preferred embodiment, said compound is 7-chloro-3-(2,4-dimethylphenyl)sulfonyl-4H-triazolo[1,5-a]quinazolin-5-one. In a further very preferred embodiment, said compound is 6-chloro-3-(2,4-dimethylphenyl)sulfonyl-4H-triazolo[1,5-a]quinazolin-5-one. In a further very preferred embodiment, said compound is 8-chloro-3-(2,4-dimethylphenyl)sulfonyl-4H-triazolo[1,5-a]quinazolin-5-one. In a further very preferred embodiment, said compound is 9-chloro-3-(2,4-dimethylphenyl)sulfonyl-4H-triazolo[1,5-a]quinazolin-5-one. In a further very preferred embodiment, said compound is 3-(2,4-dimethylphenyl)sulfonyl-8-methoxy-4H-triazolo[1,5-a]quinazolin-5-one. In a further very preferred embodiment, said compound is 6-chloro-3-(4-isopropylphenyl)sulfonyl-4H-triazolo[1,5-a]quinazolin-5-one. In a further very preferred embodiment, said compound is 9-chloro-3-(4-isopropylphenyl)sulfonyl-4H-triazolo[1,5-a]quinazolin-5-one. In a further very preferred embodiment, said compound is 3-(2-chloro-4-methyl-phenyl)sulfonyl-8-methoxy-4H-triazolo[1,5-a]quinazolin-5-one. In a further very preferred embodiment, said compound is 3-(2-bromo-4-methyl-phenyl)sulfonyl-8-methoxy-4H-triazolo[1,5-a]quinazolin-5-one. In a further very preferred embodiment, said compound is 8-methoxy-3-[4-methyl-2-(trifluoromethyl)phenyl]sulfonyl-4H-triazolo[1,5-a]quinazolin-5-one. In a further very preferred embodiment, said compound for use is 3-(2,4-dimethylphenyl)sulfonyl-4H-triazolo[1,5-a]quinazolin-5-one. In a further very preferred embodiment, said compound is 3-(2-chloro-4-methyl-phenyl)sulfonyl-4H-triazolo[1,5-a]quinazolin-5-one. In a further very preferred embodiment, said compound is 3-(2,4-dimethylphenyl)sulfonyl-8-hydroxy-4H-triazolo[1,5-a]quinazolin-5-one. In a further very preferred embodiment, said compound is 3-(2-Bromo-4-methyl-phenyl)sulfonyl-4H-triazolo[1,5-a]quinazolin-5-one. In a further very preferred embodiment, said compound is 8-bromo-3-(2,4-dimethylphenyl)sulfonyl-4H-triazolo[1,5-a]quinazolin-5-one. In a further very preferred embodiment, said compound is 3-(2,4-dimethylphenyl)sulfonyl-6-methoxy-4H-triazolo[1,5-a]quinazolin-5-one. In a further very preferred embodiment, said compound is 3-(2,4-dimethylphenyl)sulfonyl-8-(3-methoxypropoxy)-4H-triazolo[1,5-a]quinazolin-5-one. In a further very preferred embodiment, said compound is 4-[[3-(2,4-dimethylphenyl)sulfonyl-5-oxo-4H-triazolo[1,5-a]quinazolin-8-yl]oxy]butanenitrile. In a further very preferred embodiment, said compound is 3-(2,4-dimethylphenyl)sulfonyl-8-(2-methoxyethoxy)-4H-triazolo[1,5-a]quinazolin-5-one. In a further very preferred embodiment, said compound is 3-(2,4-dimethylphenyl)sulfonyl-7-hydroxy-4H-triazolo[1,5-a]quinazolin-5-one. In a further very preferred embodiment, said compound is 3-(2,4-dimethylphenyl)sulfonyl-9-methoxy-4H-triazolo[1,5-a]quinazolin-5-one. In a further very preferred embodiment, said compound is 3-(2,4-dimethylphenyl)sulfonyl-8-(tetrahydropyran-4-ylamino)-4H-triazolo[1,5-a]quinazolin-5-one. In a further very preferred embodiment, said compound is 3-(2,4-dimethylphenyl)sulfonyl-9-hydroxy-4H-triazolo[1,5-a]quinazolin-5-one. In a further very preferred embodiment, said compound is 3-(2,4-dimethylphenyl)sulfonyl-8-(2-hydroxyethoxy)-4H-triazolo[1,5-a]quinazolin-5-one. In a further very preferred embodiment, said compound is methyl 4-[[3-(2,4-dimethylphenyl)sulfonyl-5-oxo-4H-triazolo[1,5-a]quinazolin-8-yl]oxy]butanoate. In a further very preferred embodiment, said compound is 3-(2,4-dimethylphenyl)sulfonyl-7-hydroxy-8-(2-methoxyethoxy)-4H-triazolo[1,5-a]quinazolin-5-one. In a further very preferred embodiment, said compound is 8-[(2,2-dimethyl-1,3-dioxolan-4-yl)methoxy]-3-(2,4-dimethylphenyl)sulfonyl-4H-triazolo[1,5-a]quinazolin-5-one.

In a further aspect, the present invention provides a compound according to formula (I) and pharmaceutically acceptable salts, stereoisomers, enantiomers, tautomers of the compounds of formula (I) as disclosed herein for use in a method of reducing the virulence of bacteria, preferably of bacteria expressing AgrA or an ortholog of AgrA, preferably AgrA, and further preferably of bacteria of the genus selected from *Staphylococcus, Streptococcus* or *Clostridium*, more preferably of *Staphylococcus*, and again further preferably of *Staphylococcus aureus*. In a further very preferred embodiment, said bacteria expresses AgrA or an ortholog of AgrA. In a further very preferred embodiment, said bacteria expresses AgrA. In a further very preferred embodiment, said bacteria is of the genus selected from *Staphylococcus, Streptococcus* or *Clostridium*. In a further very preferred embodiment, said bacteria is of the genus *Staphylococcus*. In a further very preferred embodiment, said bacteria is *Staphylococcus aureus*. The herein described and disclosed embodiments, preferred embodiments and very preferred embodiments for the compounds of formula (I) should apply to this inventive method irrespective of whether is specifically referred to again or its repetition is avoided for the sake of conciseness.

In a further aspect, the present invention provides a compound according to formula (I) and pharmaceutically acceptable salts, stereoisomers, enantiomers, tautomers of the compounds of formula (I) as disclosed herein for use in a method of preventing or treating a disease, preferably an infection or an inflammatory disease, further preferably a bacterial infection or an inflammatory skin disease, caused or exacerbated by bacteria, wherein preferably said bacteria is selected from the genus of *Staphylococcus, Streptococcus* or *Clostridium*, more preferably of *Staphylococcus*, and again further preferably wherein said bacteria is *Staphylococcus aureus*. In a further very preferred embodiment, said disease is an infection or an inflammatory disease. In a further very preferred embodiment, said disease is an infection. In a further very preferred embodiment, said disease is a bacterial infection or an inflammatory skin disease, caused or exacerbated by bacteria. In a further very preferred embodiment, said disease a bacterial infection, wherein said bacteria is selected from the genus of *Staphylococcus, Streptococcus* or *Clostridium*. In a further very preferred embodiment, said disease is exacerbated by bacteria of the genus selected from *Staphylococcus*, preferably from *Staphylococcus aureus*. In a further very preferred embodiment, said disease is an infection caused or exacerbated by bacteria selected from the genus of *Staphylococcus*. In a further very preferred embodiment, said disease is an infection caused or exacerbated by *Staphylococcus aureus*. In a further very preferred embodiment, said disease is an inflammatory skin disease, preferably atopic dermatitis. In a further very preferred embodiment, said disease is an inflammatory skin disease, preferably atopic dermatitis exacerbated by *Staphylococcus aureus*. The herein described and disclosed embodiments, preferred embodiments and very preferred embodiments for the compounds of formula I should apply to the this inventive method irrespective of whether is specifically referred to again or its repetition is avoided for the sake of conciseness.

In a further aspect, the present invention provides a compound according to formula (I) for use in a method of inhibition of the quorum sensing, preferably AgrA quorum sensing, in bacteria, preferably in bacteria of the genus selected from *Staphylococcus, Streptococcus* or *Clostridium*, more preferably in *Staphylococcus*, and again further preferably in *Staphylococcus aureus*,

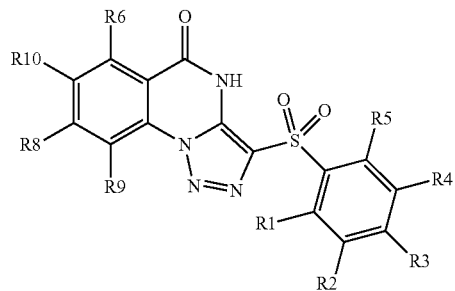

wherein
R1 and R5 are independently selected from H, halogen, hydroxyl, NO$_2$, CN, C$_1$-C$_6$-alkyl optionally substituted by one or more R11, C$_1$-C$_6$-alkoxy optionally substituted by one or more R11, C$_3$-C$_6$-cycloalkyl optionally substituted by one or more R11, —C$_n$-alkyl-N(R12)(R13) with n=0-3, —C$_n$-alkyl-C(O)N(R12)(R13) with n=0-3, —SO$_2$—N(R14)-C(O)—R15; —C$_n$-alkyl-N(R14)-C(O)—R15 with n=0-3, —C$_n$-alkyl-C(O)—OR16 with n=0-3, —O(C$_1$-C$_3$-alkyl-O)$_m$—C$_1$-C$_3$-alkyl-OR10 with m=0-3, —Cr-alkyl-OR16 with n=0-3, —NH—C$_n$-alkyl-R18 with n=0-3; —O—C$_n$-alkyl-R18 with n=0-3; —OPO(OR10)$_2$, —PO(OR10)$_2$, and a heterocycle optionally substituted by one or more R17;
R3 is selected from halogen, hydroxyl, NO$_2$, CN, C$_1$-C$_6$-alkyl optionally substituted by one or more R11, C$_1$-C$_6$-alkoxy optionally substituted by one or more R11, C$_3$-C$_6$-cycloalkyl optionally substituted by one or more R11, —C$_n$-alkyl-N(R12)(R13) with n=0-3, —C$_n$-alkyl-C(O)N(R12)(R13) with n=0-3, —SO$_2$—N(R14)-C(O)—R15; —C$_n$-alkyl-N(R14)-C(O)—R15 with n=0-3, —C$_n$-alkyl-C(O)—OR16 with n=0-3, —O(C$_1$-C$_3$-alkyl-O)$_m$—C$_1$-C$_3$-alkyl-OR10 with m=0-3, —C$_n$-alkyl-OR16 with n=0-3, —NH—C$_n$-alkyl-R18 with n=0-3; —O—C$_n$-alkyl-R18 with n=0-3; —OPO(OR10)$_2$, —PO(OR10)$_2$, and a heterocycle optionally substituted by one or more R17;
R2 and R4 are independently selected from H, halogen, C$_1$-C$_6$-alkyl optionally substituted by one or more R11;
R6, R7, R8 and R9 are independently selected from H, halogen, hydroxyl, NO$_2$, CN, C$_1$-C$_6$-alkyl optionally substituted by one or more R11, C$_1$-C$_6$-alkoxy optionally substituted by one or more R11, C$_3$-C$_6$-cycloalkyl optionally substituted by one or more R11, —C$_n$-alkyl-N(R12)(R13) with n=0-3, —C$_n$-alkyl-C(O)N(R12)(R13) with n=0-3, —SO$_2$—N(R12)(R13), —SO$_2$—N(R14)-C(O)—R15; —C$_n$-alkyl-N(R14)-C(O)—R15 with n=0-3, —C$_n$-alkyl-C(O)—OR16 with n=0-3, —O(C$_1$-C$_3$-alkyl-O)$_m$—C$_1$-C$_3$-alkyl-OR10 with m=0-3, —C$_n$-alkyl-OR16 with n=0-3, —NH—C$_n$-alkyl-R18 with n=0-3; —O—C$_n$-alkyl-R18 with n=0-3; —OPO(OR10)$_2$, —PO(OR10)$_2$, and a heterocycle optionally substituted by one or more R17;
R10 is selected from H and C$_1$-C$_6$-alkyl optionally substituted by one or more R11; said one or more R11 is independently selected from Cl, F and hydroxy;
R12, R13, R14, R15 and R16 are independently selected from H, C$_1$-C$_6$-alkyl optionally substituted by one or more R11, C$_3$-C$_6$-cycloalkyl optionally substituted by one or more R11, —SO$_2$—C$_1$-C$_6$-alkyl optionally substituted by one or more R11, or wherein said R12 and R13 together with the nitrogen to which they are attached form a heterocycle optionally substituted by one or more R17;
said one or more R17 is independently selected from halogen, hydroxy, $NO_2$, CN, —N(R12)(R13), —C(O)—R16, —C(O)—OR16, —$C_n$-alkyl-OR16 with n=0-3, $C_1$-$C_6$-alkyl optionally substituted by one or more R11, and $C_1$-$C_6$-alkoxy optionally substituted by one or more R11;
R18 is selected from —N(R12)(R13), —OR10, —C(O)—R16, —C(O)—OR16, —C(O)—N(R12)(R13), CN, and a heterocycle optionally substituted by one or more R17; and wherein at least one of R1, R2, R4, R5, R6, R7, R8 or R9 is not H;
and pharmaceutically acceptable salts, stereoisomers, enantiomers, tautomers of the compounds of formula (I). In a further preferred embodiment, said bacteria is selected from *Streptococcus pyogenes, Clostridium difficile* or *Staphylococcus aureus*, preferably said bacteria is *Staphylococcus aureus*. In a very preferred embodiment, said bacteria is *Staphylococcus aureus*.

In a further aspect, the present invention provides a pharmaceutical composition comprising at least one compound according to formula (I)

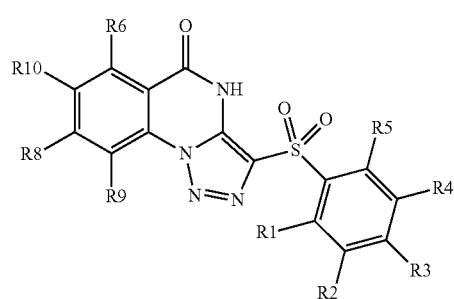

(I)

wherein
R1 and R5 are independently selected from H, halogen, hydroxyl, $NO_2$, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$SO_2$—N(R14)-C(O)—R15; —$C_n$-alkyl-N(R14)-C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3; —O—$C_n$-alkyl-R18 with n=0-3; —OPO(OR10)$_2$, —PO(OR10)$_2$, and a heterocycle optionally substituted by one or more R17;
R3 is selected from halogen, hydroxyl, $NO_2$, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$SO_2$—N(R14)-C(O)—R15; —$C_n$-alkyl-N(R14)-C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3; —O—$C_n$-alkyl-R18 with n=0-3; —OPO(OR10)$_2$, —PO(OR10)$_2$, and a heterocycle optionally substituted by one or more R17;
R2 and R4 are independently selected from H, halogen, $C_1$-$C_6$-alkyl optionally substituted by one or more R11;
R6, R7, R8 and R9 are independently selected from H, halogen, hydroxyl, $NO_2$, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$SO_2$—N(R12)(R13), —$SO_2$—N(R14)-C(O)—R15; —$C_n$-alkyl-N(R14)-C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3; —O—$C_n$-alkyl-R18 with n=0-3; —OPO(OR10)$_2$, —PO(OR10)$_2$, and a heterocycle optionally substituted by one or more R17;
R10 is selected from H and $C_1$-$C_6$-alkyl optionally substituted by one or more R11;
said one or more R11 is independently selected from Cl, F and hydroxy;
R12, R13, R14, R15 and R16 are independently selected from H, $C_1$-$C_6$-alkyl optionally substituted by one or more R11, $C_3$-$C_6$-cycloalkyl optionally substituted by one or more R11, —$SO_2$—$C_1$-$C_6$-alkyl optionally substituted by one or more R11, or wherein said R12 and R13 together with the nitrogen to which they are attached form a heterocycle optionally substituted by one or more R17;
said one or more R17 is independently selected from halogen, hydroxy, $NO_2$, CN, —N(R12)(R13), —C(O)—R16, —C(O)—OR16, —$C_n$-alkyl-OR16 with n=0-3, $C_1$-$C_6$-alkyl optionally substituted by one or more R11, and $C_1$-$C_6$-alkoxy optionally substituted by one or more R11;
R18 is selected from —N(R12)(R13), —OR10, —C(O)—R16, —C(O)—OR16, —C(O)—N(R12)(R13), CN, and a heterocycle optionally substituted by one or more R17; and
wherein at least one of R1, R2, R4, R5, R6, R7, R8 or R9 is not H;
and pharmaceutically acceptable salts, stereoisomers, enantiomers, tautomers of the compounds of formula (I) and a pharmaceutically acceptable excipient.

In a further preferred embodiment, said bacteria is selected from *Streptococcus pyogenes, Clostridium difficile* or *Staphylococcus aureus*, preferably said bacteria is *Staphylococcus aureus*.

In a preferred embodiment, said pharmaceutical composition further comprising at least one antibiotic active against bacteria, preferably against bacteria of the genus selected from *Staphylococcus, Streptococcus* or *Clostridium*, more preferably against *Staphylococcus*, and again further preferably against *Staphylococcus aureus*. In a very preferred embodiment, said pharmaceutical composition further comprising at least one antibiotic active against *Staphylococcus aureus*.

Thus, the inventive compositions and compounds represent anti-virulence therapeutics which may be used as stand-alone therapy to strengthen the infected host's self-defense and -healing capacity through reduction of tissue damage, reduction in inflammation, reduction in disease dissemination, full immune response and reduction in reoccurrence rate. In cases where the disarmed pathogen may not be sufficiently cleared by the host, a combination therapy with traditional antibiotics (for infections caused by *S. aureus*) or with anti-inflammatory agents (for diseases exacerbated by *S. aureus*) might be considered, allowing eventually to optimize the timeliness and/or the dose of therapy (Dickey S W, et al. (2017) Nat Rev Drug Discov 16(7):457-471).

In a preferred embodiment, said pharmaceutical composition further comprising at least one anti-inflammatory agent, preferably at least one anti-inflammatory agent to treat chronic inflammatory skin diseases.

In a further aspect, the present invention provides a combination product containing at least one compound according to formula (I) and at least one antibiotic active against bacteria, preferably against bacteria of the genus selected from *Staphylococcus*, *Streptococcus* or *Clostridium*, more preferably against *Staphylococcus*, and again further preferably against *Staphylococcus aureus*. Thus, in other embodiments, the inventive compound of formula (I) can be administered in combination with an antibiotic. Exemplary antibiotics include, but are not limited to, colloidal silver, penicillins (including penicillin G, ampicillin, amoxicillin, methicillin, oxacillin, dicloxacillin, flucloxacillin, amoxicillin/clavulanate, ampicillin/sulbactam), carbapenems (including imipenem, meropenem, ertapenem, doripenem, imipenem-cilastatin), cephalosporins (including cefalotin, cefazolin, cefalexin, cefradine, cefamandole, cefoxitin, and 3rd-generation cephalosporins), glycopeptides (including vancomycin, teicoplanin, oritavancin, telavancin, dalbavancin), oxazolidinones (including linezolid, tedizolid), lipopeptides (including daptomycin, ramoplanin), lincosamides (including clindamycin and lincomycin), macrolides (including erythromycin, spiramycin, roxithromycin, clarithromycin, azithromycin), aminoglycosides (including streptomycin, gentamycin, amikacin, kanamycin, neomycin, tobramycin), ketolides (including telithromycin, solithromycin), bacitracin, ansamycins (including rifampicin), tetracyclines (including doxycycline, minocycline), glycylcyclines (including tigecycline), quinolones (including ciprofloxacin, moxifloxacin, levofloxacin, ofloxacin), streptogramins (including quinupristin/dalfopristin), trimethoprim-sulfamethoxazole (TMP-SMX), topical mupirocin.

In a further aspect, the present invention provides a combination product containing at least one compound according to formula (I) and at least one agent, preferably an anti-inflammatory agent typically and preferably used to treat inflammatory diseases, preferably chronic inflammatory skin diseases, said diseases are exacerbated by bacteria of the genus selected from *Staphylococcus*, preferably against *Staphylococcus aureus*.

Combination therapies, as described herein, may involve co-administration or sequential administration of the inventive compound of formula (I) and the at least one antibiotic or the at least one agent, preferably anti-inflammatory agent, typically and preferably used to treat inflammatory diseases. The combination of the inventive compound of formula (I) and the at least one antibiotic or the at least one anti-inflammatory agent in the inventive methods and/or compositions or combinations may reduce the amount of either pharmaceutical compound needed as a therapeutically effective dosage, and thereby reduce any negative side effects the antibiotics or agents may induce in vivo. In addition, the combination of the inventive compound of formula (I) and the at least one antibiotic or the at least one anti-inflammatory agent in the inventive methods and/or compositions or combinations may reduce the time of the therapy in vivo. In addition, the combination of the inventive compound of formula (I) and the at least one antibiotic in the inventive methods and/or compositions or combinations may reduce the effective dose or reduce the time needed for successful treatment with antibiotic, which in turn reduces the opportunity for microbial resistance to specific antibiotics.

The inventive compounds of formula (I), pharmaceutical compositions or combination products can be administered to any subject that can experience the beneficial effects of the inventive compounds, compositions or products, as described herein. Preferably said subject is a human. The inventive compounds, compositions or products as described herein can be administered by any means that achieve their intended purpose. For example, administration can be by parenteral, topical, local, subcutaneous, oral, intravenous, intraarticular, intrathecal, intramuscular, intraperitoneal, or intradermal delivery, or by transdermal, buccal, oromucosal, ocular routes or via inhalation. In preferred embodiments, administration to a subject is systemic. In other embodiments, administration to a subject is local such as in a topical solution, topical ointment, or topical cream. Preferably said subject is a human.

In a further aspect, the present invention provides a use of a compound of formula (I), a pharmaceutical composition or a combination product, in accordance with the present invention for the manufacture of a medicament for reducing the virulence of bacteria, preferably of bacteria expressing AgrA or an ortholog of AgrA, preferably AgrA, and further preferably of bacteria of the genus selected from *Staphylococcus*, *Streptococcus* or *Clostridium*, more preferably of *Staphylococcus*, and again further preferably of *Staphylococcus aureus*. In a further very preferred embodiment, said bacteria expresses AgrA. In a further very preferred embodiment, said bacteria is of the genus selected from *Staphylococcus*, *Streptococcus* or *Clostridium*. In a further very preferred embodiment, said bacteria is of the genus *Staphylococcus*. In a further very preferred embodiment, said bacteria is *Staphylococcus aureus*.

In a further aspect, the present invention provides a use of a compound of formula (I), a pharmaceutical composition or a combination product, in accordance with the present invention for the manufacture of a medicament for preventing or treating a disease, preferably an infection or an inflammatory disease, further preferably a bacterial infection or an inflammatory skin disease, caused or exacerbated by bacteria, wherein preferably said bacteria is selected from the genus of *Staphylococcus*, *Streptococcus* or *Clostridium*, more preferably of *Staphylococcus*, and again further preferably wherein said bacteria is *Staphylococcus aureus*. In a further very preferred embodiment, said disease is an infection caused or exacerbated by bacteria selected from the genus of *Staphylococcus*, *Streptococcus* or *Clostridium*. In a further very preferred embodiment, said disease is an infection caused or exacerbated by bacteria selected from the genus of *Staphylococcus*. In a further very preferred embodiment, said disease is an infection caused or exacerbated by *Staphylococcus aureus*.

In a further aspect, the present invention provides a use of a compound of formula (I), a pharmaceutical composition or a combination product, in accordance with the present invention for the manufacture of a medicament effective in the inhibition of the quorum sensing, preferably AgrA quorum sensing, in bacteria, preferably in bacteria of the genus selected from *Staphylococcus*, *Streptococcus* or *Clostridium*, more preferably against *Staphylococcus*, and again further preferably against *Staphylococcus aureus*. In a further aspect, the present invention provides a use of a pharmaceutical composition in accordance with the present invention for the manufacture of a medicament for the inhibition of the quorum sensing, preferably AgrA quorum sensing, in bacteria, preferably in bacteria of the genus selected from *Staphylococcus*, *Streptococcus* or

*Clostridium*, more preferably in *Staphylococcus*, and again further preferably in *Staphylococcus aureus*.

In a further aspect, the present invention provides a method of reducing the virulence of bacteria, preferably of bacteria expressing AgrA or an ortholog of AgrA, preferably AgrA, and further preferably of *Staphylococcus aureus*, comprising administering to a subject an amount of a compound of formula (I), a pharmaceutical composition or a combination product, preferably a compound of formula (I), in accordance with the present invention effective to inhibit the synthesis of one or more virulence factors by the bacteria. In a further very preferred embodiment, said bacteria expresses AgrA. In a further very preferred embodiment, said bacteria is of the genus selected from *Staphylococcus*, *Streptococcus* and *Clostridium*. In a further very preferred embodiment, said bacteria is of the genus *Staphylococcus*. In a further very preferred embodiment, said bacteria is *Staphylococcus aureus*. The herein described and disclosed embodiments, preferred embodiments and very preferred embodiments for the compounds of formula I should apply to the this inventive method irrespective of whether is specifically referred to again or its repetition is avoided for the sake of conciseness.

In a further preferred embodiment of the inventive method, said compound of formula (I) inhibits the synthesis of one or more virulence factors by the bacteria, wherein said one or more virulence factor is selected from the group consisting of one or more of toxins (e.g., $\alpha$, $\beta$, $\gamma$, $\gamma$-variant, and $\delta$-hemolysins, PSMs (e.g., PSM$\alpha$), Panton-Valentine leukocidin (PVL), leukotoxin E and D (LukED), leukotoxin G and H (LukGH), enterotoxins (e.g., enterotoxin B), exfoliative toxin), proteases (e.g., serine proteases, metalloproteases and cysteine proteases), nuclease, lipase, coagulase, hyaluronidase, clumping factor, pyrogenic toxin superantigen (e.g., TSST-1), and combinations thereof. Thus, in a further preferred embodiment of the inventive method, said one toxin is selected from $\alpha$, $\beta$, $\gamma$, $\gamma$-variant, and $\delta$-hemolysins. In a further preferred embodiment of the inventive method, said PSM is PSM$\alpha$. In a further preferred embodiment of the inventive method, said enterotoxin is enterotoxin B or exfoliative toxin. In a further preferred embodiment of the inventive method, said protease is selected from serine proteases, metalloproteases and cysteine proteases. In a further preferred embodiment of the inventive method, said pyrogenic toxin superantigen is TSST-1. In a further preferred embodiment of the inventive method, said compound of formula (I) inhibits the synthesis of one or more virulence factors by the bacteria, wherein said one or more virulence factor is selected from the group consisting of $\alpha$, $\beta$, $\gamma$, $\gamma$-variant, and $\delta$-hemolysin, PSM$\alpha$, Panton-Valentine leukocidin (PVL), leukotoxin E and D (LukED), leukotoxin G and H (LukGH), enterotoxin B, exfoliative toxin, a serine protease, a metalloprotease, a cysteine protease, a nuclease, a lipase, a coagulase, a hyaluronidase, a clumping factor, TSST-1, and any combination of one or more of any specific virulence factor or generic group of virulence factors thereof. In a further very preferred embodiment of the inventive method, said compound of formula (I) inhibits the expression of PSM$\alpha$, RNAIII and/or any of its downstream targets. In a further very preferred embodiment of the inventive method, said compound of formula (I) inhibits the expression of PSM$\alpha$. In a further very preferred embodiment of the inventive method, said compound of formula (I) inhibits the expression of RNAIII. In a further very preferred embodiment of the inventive method, said compound of formula (I) inhibits the expression of a downstream target of RNAIII. In a further very preferred embodiment, said method further comprises administering an antibiotic or an anti-inflammatory agent to said subject, preferably to said human. In a further very preferred embodiment, said method further comprises administering an antibiotic to said subject, preferably to said human. In a further very preferred embodiment, said method further comprises administering an anti-inflammatory agent, preferably to said human.

In a further aspect, the present invention provides for a method of preventing or treating a disease of a subject, preferably an infection or an inflammatory disease, further preferably a bacterial infection or an inflammatory skin disease, caused or exacerbated by bacteria, wherein preferably said bacteria is selected from the genus of *Staphylococcus*, *Streptococcus* or *Clostridium*, more preferably of *Staphylococcus*, and again further preferably wherein said bacteria is *Staphylococcus aureus*, said method comprises administering to the subject in need of such prevention or treatment an effective amount of a compound of formula (I), a pharmaceutical composition or a combination product, preferably a compound of formula (I). In a further very preferred embodiment, said disease is an infection or an inflammatory disease. In a further very preferred embodiment, said disease is an infection. In a further very preferred embodiment, said disease is a bacterial infection. In a further very preferred embodiment, said disease is an inflammatory skin disease caused or exacerbated by bacteria. Preferably said infection, preferably said bacterial infection is caused by bacteria of the genus selected from *Staphylococcus*, *Streptococcus* or *Clostridium*, more preferably by *Staphylococcus*, and again further preferably by *Staphylococcus aureus*. In a further very preferred embodiment, saidaid infection, preferably said bacterial infection comprises an antibiotic resistant *Staphylococcus* infection, preferably said antibiotic resistant *Staphylococcus* infection comprises a Methicillin-resistant *Staphylococcus aureus* infection.

Thus, an inventive compound of formula (I) or an inventive composition, preferably an inventive pharmaceutical composition, comprising an inventive compound of formula (I), as described herein, can be administered to a subject to inhibit the activity of AgrA thereby preventing the production of virulence factors that aid in bacterial infection or development of a disease condition or disorder associated with the bacterial infection. Examples of diseases and disorders associated with a bacterial infection responsive to treatment with the inventive compounds and/or compositions can include, without limitation, skin and soft tissue infections, lung infections or chronic inflammatory skin diseases such as atopic dermatitis.

In a further aspect, the present invention provides a method for inhibiting the quorum sensing, preferably AgrA quorum sensing, in bacteria, preferably in bacteria of the genus selected from *Staphylococcus*, *Streptococcus* or *Clostridium*, more preferably in *Staphylococcus*, and again further preferably in *Staphylococcus aureus*, wherein said comprises administering to a subject an effective amount of a compound of formula (I), a pharmaceutical composition or a combination product, preferably a compound of formula (I), in accordance.

In a further preferred embodiment of the present invention, said compound of formula (I) is provided in a topical composition with a pharmaceutically acceptable carrier and is topically administered to a subject, wherein preferably subject has a disease or disorder associated with a bacterial infection, wherein said bacterial infection is an infection caused or exacerbated by bacteria, preferably by *Staphylococcus aureus*. In a further preferred embodiment said infection caused or exacerbated by bacteria is SSTI or atopic dermatitis. In a further preferred embodiment said bacterial infection is SSTI or atopic dermatitis.

Thus, an inventive compound of formula (I) or an inventive composition or an inventive combination product, preferably an inventive compound of formula (I) inventive pharmaceutical composition, comprising an inventive compound of formula (I), as described herein, can be used to prevent or treat infection of a subject by any bacteria species that utilizes the AgrA response regulator in quorum sensing and the production of virulence factors. The inventive compounds and compositions are typically and preferably administered to subjects having or at risk of having an infection, preferably a bacterial infection such as a *Staphylococcus* and/or *Streptococcus* infection. For example, a subject that can benefit from treatment with an inventive compound or composition, as described herein, can be a hospital patient at risk of developing nosocomial infection or a subject known to be infected with or having been exposed to antibiotic resistant bacteria such as, for example, Methicillin-resistant *S. aureus*, Vancomycin-intermediary-sensible *S. aureus*, and Vancomycin-resistant *S. aureus*. Methods of detecting the presence of a *Staphylococcus* bacterial infection are well known, for example, by culturing from a sample from the subject, e.g. a blood culture, can be used.

In a further aspect, the present invention provides a method for the treatment of a subject suffering from an infection or an inflammatory disease, preferably a bacterial infection or an inflammatory skin disease, caused by bacteria of the genus selected from *Staphylococcus*, *Streptococcus* or *Clostridium*, more preferably by *Staphylococcus*, and again further preferably by *Staphylococcus aureus*, said method comprising administering to the subject a compound of formula (I) in accordance with the present invention and at least one antibiotic active against bacteria, preferably against bacteria of the genus selected from *Staphylococcus*, *Streptococcus* or *Clostridium*, more preferably against *Staphylococcus*, and again further preferably against *Staphylococcus aureus*.

In a further aspect, the present invention provides a method for preventing or treating a bacterial infection in a subject comprising the step of administering an effective amount of a compound of formula (I) in accordance with the present invention to said subject in need of such prevention or treatment. Preferably said bacterial infection is caused by bacteria of the genus selected from *Staphylococcus*, *Streptococcus* or *Clostridium*, more preferably by *Staphylococcus*, and again further preferably by *Staphylococcus aureus*.

In a further aspect, the present invention provides a method of preventing or treating a disease caused or exacerbated by Gram-positive quorum sensing bacteria, comprising administering to a subject an effective amount of a compound of formula (I) in accordance with the present invention to a subject in need of such prevention or treatment.

Compound Preparation

The compounds of the present invention can be prepared by a variety of methods, including standard chemistry. Any previously defined substituent will continue to have the previously defined meaning unless otherwise indicated. Illustrative general synthetic methods are set out in the following schemes and can be readily adapted to prepare other compounds of the present invention. Specific preferred compounds of the invention can be prepared according to the experimental procedures disclosed in the Examples section.

The general procedures used to synthesise the compounds of formula (I) are described in reaction Schemes 1-3 below and are illustrated in the Examples section.

Preparation of Compounds of Formula (I)

Compounds of formula (I) of the present invention, wherein R1 to R9 are as defined hereinbefore can be prepared according to Scheme 1. Appropriately substituted anthranilic esters (III) were readily converted into the corresponding 2-azidobenzoic esters (II) by diazotization and displacement by sodium azide[1] or trimethylsilylazide (Barral, K., et al. *Org. Lett.* 2007, 9 (9), 1809-1811). Treatment of (II) with the substituted arylsulfonylactetonitriles (IV) in the presence of base led to the desired triazoloquinazolinones of formula (I) (Lee, K., et al. *Bioorganic Med. Chem. Lett.* 2010, 20 (5), 1767-1770; Jones, P., et al. *Tetrahedron* 2002, 58 (50), 9973-9981).

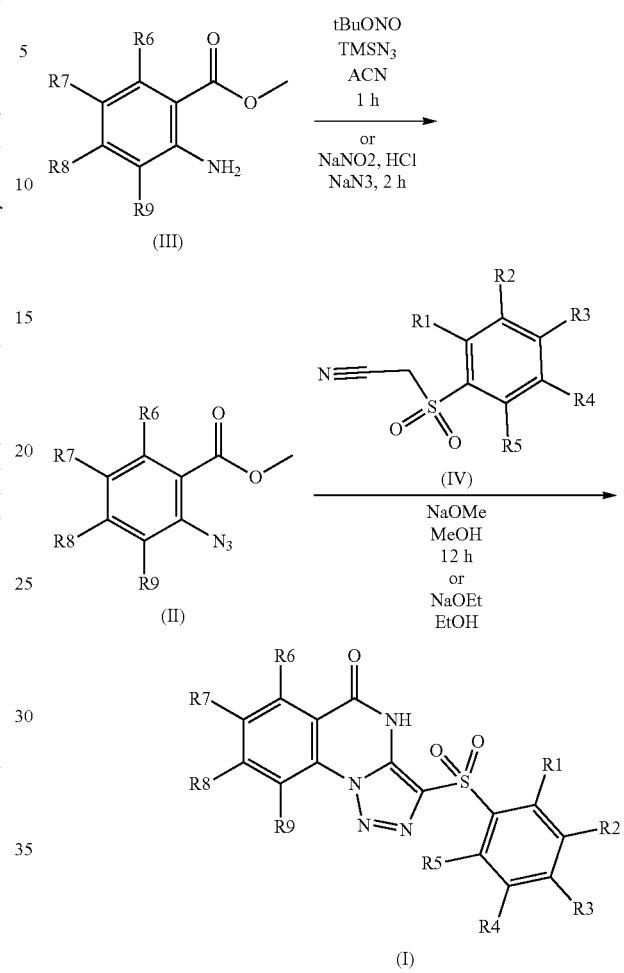

Preparation of Intermediates

Intermediate of formula (IV) can be prepared according to Scheme 2 by reaction of the corresponding commercially available arylsulfonylchloride of Formula (V) with chloroacetonitrile in the presence of sodium sulfite.

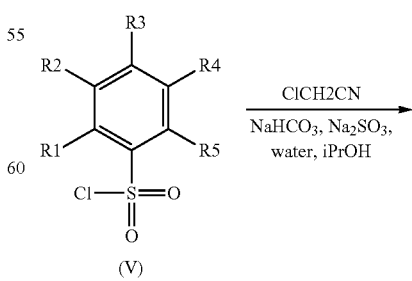

-continued

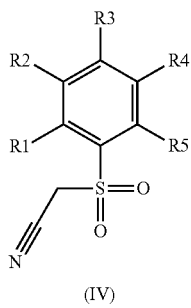

(IV)

Alternatively, Intermediate of formula (IV) can be prepared according to Scheme 3 by oxidation of the sulfides of formula (VI) in the presence of mCPBA (Anderson, M. O., et al. *J. Med. Chem.* 2012, 55 (12), 5942-5950) or hydrogen peroxide (Tsui, G. C., et al. *Org. Lett.* 2011, 13 (2), 208-211). Intermediate of formula (VI) can be prepared by alkylation of the commercially available arylthiol of formula (VII) with bromoacetonitrile in presence of potassium carbonate (Anderson, M. O., et al. *J. Med. Chem.* 2012, 55 (12), 5942-5950). Alternatively, compounds of formula (VI) can be prepared from commercial aniline of formula (VIII) and bromoacetonitrile by a S☐transfer reaction catalyzed by copper (Li, Y., et al. *Org. Lett.* 2014, 16 (10), 2692-2695).

Scheme 3

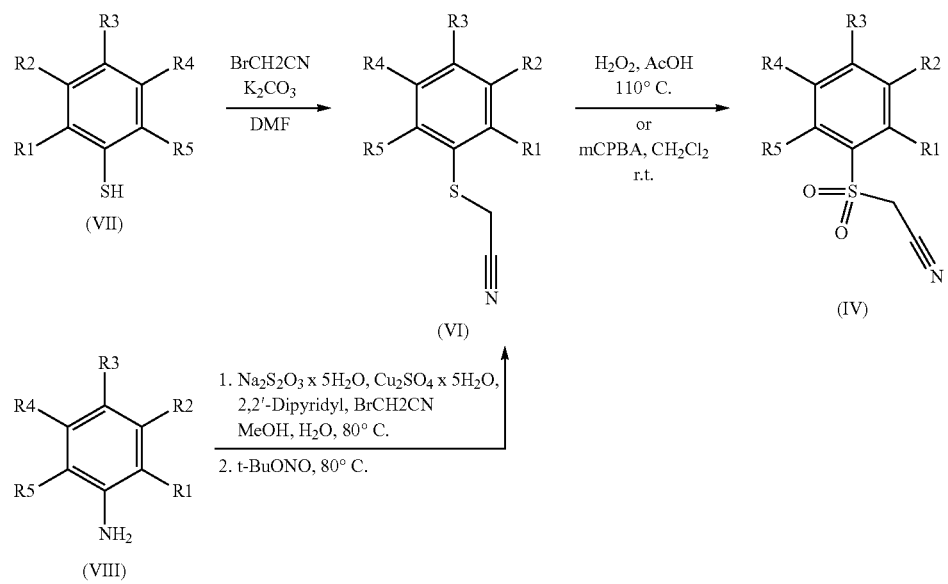

Very preferred compounds of formula (I) of the present invention are listed in Table 1 by providing compound number, chemical structure and name.

TABLE 1

| Very preferred compounds of formula (I) | | |
|---|---|---|
| Compound | Structure | Name |
| 1 | ![structure] | 7-chloro-3-(2,4-dimethylphenyl)sulfonyl-4H-triazolo[1,5-a]quinazolin-5-one |

TABLE 1-continued

Very preferred compounds of formula (I)

| Compound | Structure | Name |
|---|---|---|
| 2 | | 6-chloro-3-(2,4-dimethylphenyl)sulfonyl-4H-triazolo[1,5-a]quinazolin-5-one |
| 3 | | 8-chloro-3-(2,4-dimethylphenyl)sulfonyl-4H-triazolo[1,5-a]quinazolin-5-one |
| 4 | | 9-chloro-3-(2,4-dimethylphenyl)sulfonyl-4H-triazolo[1,5-a]quinazolin-5-one |
| 5 | | 3-(2,4-dimethylphenyl)sulfonyl-8-methoxy-4H-triazolo[1,5-a]quinazolin-5-one |
| 6 | | 3-(2,4-dimethylphenyl)sulfonyl-5-oxo-4H-triazolo[1,5-a]quinazoline-8-carbonitrile |

TABLE 1-continued

Very preferred compounds of formula (I)

| Compound | Structure | Name |
| --- | --- | --- |
| 7 | | 3-(2,4-dimethylphenyl)sulfonyl-8-fluoro-4H-triazolo[1,5-a]quinazolin-5-one |
| 8 | | 6-chloro-3-(4-isopropylphenyl)sulfonyl-4H-triazolo[1,5-a]quinazolin-5-one |
| 9 | | 9-chloro-3-(4-isopropylphenyl)sulfonyl-4H-triazolo[1,5-a]quinazolin-5-one |
| 10 | | 8-methoxy-3-(2-methoxy-4-methyl-phenyl)sulfonyl-4H-triazolo[1,5-a]quinazolin-5-one |
| 11 | | 3-(4-isopropoxy-2-methyl-phenyl)sulfonyl-8-methoxy-4H-triazolo[1,5-a]quinazolin-5-one |

TABLE 1-continued

Very preferred compounds of formula (I)

| Compound | Structure | Name |
|---|---|---|
| 12 | | 3-(2-chloro-4-methyl-phenyl)sulfonyl-8-methoxy-4H-triazolo[1,5-a]quinazolin-5-one |
| 13 | | 3-(4-bromo-2-methyl-phenyl)sulfonyl-8-methoxy-4H-triazolo[1,5-a]quinazolin-5-one |
| 14 | | 3-(2-fluoro-4-methyl-phenyl)sulfonyl-8-methoxy-4H-triazolo[1,5-a]quinazolin-5-one |
| 15 | | 8-methoxy-3-(4-methoxy-2-methyl-phenyl)sulfonyl-4H-triazolo[1,5-a]quinazolin-5-one |
| 16 | | N-[4-[(8-methoxy-5-oxo-4H-triazolo[1,5-a]quinazolin-3-yl)sulfonyl]-3-methyl-phenyl]acetamide |

TABLE 1-continued

Very preferred compounds of formula (I)

| Compound | Structure | Name |
|---|---|---|
| 17 | | 3-(4-fluoro-2-methyl-phenyl)sulfonyl-8-methoxy-4H-triazolo[1,5-a]quinazolin-5-one |
| 18 | | 3-(2-bromo-4-methyl-phenyl)sulfonyl-8-methoxy-4H-triazolo[1,5-a]quinazolin-5-one |
| 19 | | 8-methoxy-3-[2-methyl-4-(trifluoromethoxy)phenyl]sulfonyl-4H-triazolo[1,5-a]quinazolin-5-one |
| 20 | | 3-(4-chloro-2-methyl-phenyl)sulfonyl-8-methoxy-4H-triazolo[1,5-a]quinazolin-5-one |
| 21 | | 3-(4-cyclopropylphenyl)sulfonyl-8-methoxy-4H-triazolo[1,5-a]quinazolin-5-one |

TABLE 1-continued

Very preferred compounds of formula (I)

| Compound | Structure | Name |
|---|---|---|
| 22 | 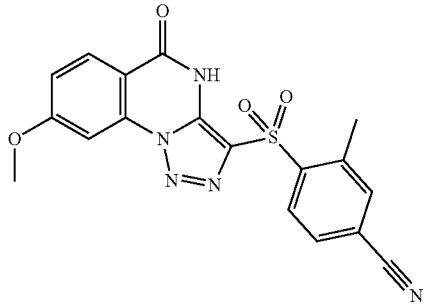 [SMILES: COc1ccc2c(=O)[nH]c3c(S(=O)(=O)c4ccc(C#N)cc4C)nnn3c2c1] | 4-[(8-methoxy-5-oxo-4H-triazolo[1,5-a]quinazolin-3-yl)sulfonyl]-3-methyl-benzonitrile |
| 23 | 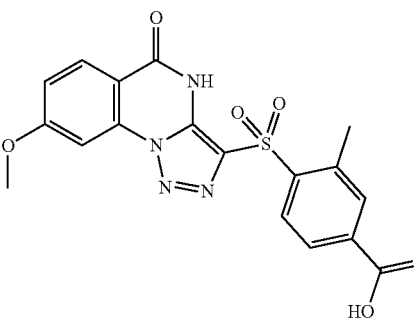 | 4-[(8-methoxy-5-oxo-4H-triazolo[1,5-a]quinazolin-3-yl)sulfonyl]-3-methyl-benzoic acid |
| 24 | 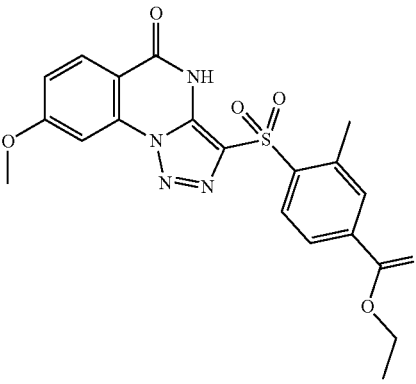 | ethyl 4-[(8-methoxy-5-oxo-4H-triazolo[1,5-a]quinazolin-3-yl)sulfonyl]-3-methyl-benzoate |
| 25 | 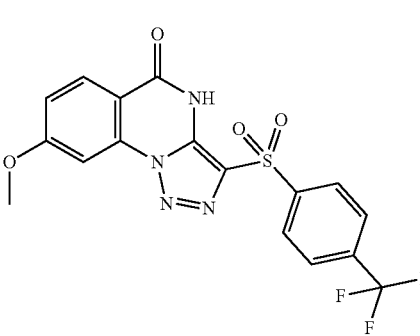 | 8-methoxy-3-[4-(trifluoromethyl)phenyl]sulfonyl-4H-triazolo[1,5-a]quinazolin-5-one |

TABLE 1-continued

Very preferred compounds of formula (I)

| Compound | Structure | Name |
|---|---|---|
| 26 | | 8-methoxy-3-[4-methyl-2-(trifluoromethyl)phenyl]sulfonyl-4H-triazolo[1,5-a]quinazolin-5-one |
| 27 | | 3-(4-cyclopropyl-2-methyl-phenyl)sulfonyl-8-methoxy-4H-triazolo[1,5-a]quinazolin-5-one |
| 28 | | 3-(4-ethyl-2-methyl-phenyl)sulfonyl-8-methoxy-4H-triazolo[1,5-a]quinazolin-5-one |
| 29 | | 4-[(8-methoxy-5-oxo-4H-triazolo[1,5-a]quinazolin-3-yl)sulfonyl]benzonitrile |
| 30 | | 3-(2,4-dimethylphenyl)sulfonyl-7-methoxy-4H-triazolo[1,5-a]quinazolin-5-one |

TABLE 1-continued

Very preferred compounds of formula (I)

| Compound | Structure | Name |
|---|---|---|
| 31 | | 8-methoxy-3-[2-methyl-4-(2H-tetrazol-5-yl)phenyl]sulfonyl-4H-triazolo[1,5-a]quinazolin-5-one |
| 32 | | 4-[(8-methoxy-5-oxo-4H-triazolo[1,5-a]quinazolin-3-yl)sulfonyl]-3-methyl-benzamide |
| 33 | | 8-methoxy-3-[2-methyl-4-(5-methyl-4H-1,2,4-triazol-3-yl)phenyl]sulfonyl-4H-triazolo[1,5-a]quinazolin-5-one |
| 34 | | 3-(2,4-dimethylphenyl)sulfonyl-4H-triazolo[1,5-a]quinazolin-5-one |
| 35 | | 3-(2-chloro-4-methyl-phenyl)sulfonyl-4H-triazolo[1,5-a]quinazolin-5-one |

TABLE 1-continued

Very preferred compounds of formula (I)

| Compound | Structure | Name |
|---|---|---|
| 36 | | 3-(2,4-dimethylphenyl)sulfonyl-8-hydroxy-4H-triazolo[1,5-a]quinazolin-5-one |
| 37 | | 3-(2-Bromo-4-methyl-phenyl)sulfonyl-4H-triazolo[1,5-a]quinazolin-5-one |
| 38 | | 8-bromo-3-(2,4-dimethylphenyl)sulfonyl-4H-triazolo[1,5-a]quinazolin-5-one |
| 39 | | 3-(2,4-dimethylphenyl)sulfonyl-6-methoxy-4H-triazolo[1,5-a]quinazolin-5-one |
| 40 | | 3-(2,4-dimethylphenyl)sulfonyl-8-(3-methoxypropoxy)-4H-triazolo[1,5-a]quinazolin-5-one |
| 41 | | 4-[[3-(2,4-dimethylphenyl)sulfonyl-5-oxo-4H-triazolo[1,5-a]quinazolin-8-yl]oxy]butanenitrile |

TABLE 1-continued

Very preferred compounds of formula (I)

| Compound | Structure | Name |
|---|---|---|
| 42 | | 3-(2,4-dimethylphenyl)sulfonyl-8-iodo-4H-triazolo[1,5-a]quinazolin-5-one |
| 43 | | 3-(2,4-dimethylphenyl)sulfonyl-8-(2-methoxyethoxy)-4H-triazolo[1,5-a]quinazolin-5-one |
| 44 | | 3-(2-bromo-4,5-dimethyl-phenyl)sulfonyl-4H-triazolo[1,5-a]quinazolin-5-one |
| 45 | | 8-(azetidin-1-yl)-3-(2,4-dimethylphenyl)sulfonyl-4H-triazolo[1,5-a]quinazolin-5-one |
| 46 | | 3-(2,4-dimethylphenyl)sulfonyl-7-hydroxy-4H-triazolo[1,5-a]quinazolin-5-one |
| 47 | | 3-(2,4-dimethylphenyl)sulfonyl-9-methoxy-4H-triazolo[1,5-a]quinazolin-5-one |

TABLE 1-continued

Very preferred compounds of formula (I)

| Compound | Structure | Name |
|---|---|---|
| 48 | | 3-(2,4-dimethylphenyl)sulfonyl-8-(2-morpholinoethylamino)-4H-triazolo[1,5-a]quinazolin-5-one |
| 49 | | 3-(2,4-dimethylphenyl)sulfonyl-8-(tetrahydropyran-4-ylamino)-4H-triazolo[1,5-a]quinazolin-5-one |
| 50 | | 3-(2,4-dimethylphenyl)sulfonyl-9-hydroxy-4H-triazolo[1,5-a]quinazolin-5-one |
| 51 | | 3-(2-chloro-4,6-dimethyl-phenyl)sulfonyl-4H-triazolo[1,5-a]quinazolin-5-one |
| 52 | | 3-(2-bromo-4,6-dimethyl-phenyl)sulfonyl-4H-triazolo[1,5-a]quinazolin-5-one |
| 53 | | 3-(2,4-dimethylphenyl)sulfonyl-8-(2-hydroxyethoxy)-4H-triazolo[1,5-a]quinazolin-5-one |

TABLE 1-continued

Very preferred compounds of formula (I)

| Compound | Structure | Name |
|---|---|---|
| 54 | | 2-[[3-(2,4-dimethylphenyl)sulfonyl-5-oxo-4H-triazolo[1,5-a]quinazolin-8-yl]oxy]acetonitrile |
| 55 | | methyl 4-[[3-(2,4-dimethylphenyl)sulfonyl-5-oxo-4H-triazolo[1,5-a]quinazolin-8-yl]oxy]butanoate |
| 56 | | 4-[[3-(2,4-dimethylphenyl)sulfonyl-5-oxo-4H-triazolo[1,5-a]quinazolin-8-yl]oxy]butanamide |
| 57 | | 3-(2,4-dimethylphenyl)sulfonyl-8-hydroxy-7-methoxy-4H-triazolo[1,5-a]quinazolin-5-one |
| 58 | | 3-(2,4-dimethylphenyl)sulfonyl-7-hydroxy-8-(2-methoxyethoxy)-4H-triazolo[1,5-a]quinazolin-5-one |
| 59 | | 3-(2,4-dimethylphenyl)sulfonyl-8-[2-[2-(2-methoxyethoxy)ethoxy]ethoxy]-4H-triazolo[1,5-a]quinazolin-5-one |

TABLE 1-continued

Very preferred compounds of formula (I)

| Compound | Structure | Name |
|---|---|---|
| 60 | | 8-[(2,2-dimethyl-1,3-dioxolan-4-yl)methoxy]-3-(2,4-dimethylphenyl)sulfonyl-4H-triazolo[1,5-a]quinazolin-5-one |
| 61 | | 3-(2,4-dimethylphenyl)sulfonyl-7-hydroxy-8-(2-hydroxyethoxy)-4H-triazolo[1,5-a]quinazolin-5-one |

The syntheses and physical data characterisation for the specifically preferred compounds are described in the Examples section. Compound 34 was purchased from AK Scientific.

EXAMPLES

The invention will now be illustrated by way of the following non-limiting examples. While particular embodiments of the invention are described below a skilled person will appreciate that various changes and modifications can be made. References to preparations carried out in a similar manner to, or by the general method of, other preparations, may encompass variations in routine parameters such as time, temperature, workup conditions, minor changes in reagents amounts, and the like.

Abbreviations

The following list provides definitions of certain abbreviations and symbols as used herein. It will be appreciated that the list is not exhaustive, but the meaning of those abbreviations and symbols not herein below defined will be readily apparent to those skilled in the art. In describing the invention, chemical elements are identified in accordance with the Periodic Table of the Elements.

| | |
|---|---|
| ACN | acetonitrile |
| AcOH | acetic acid |
| anh | anhydrous |
| $CDCl_3$ | deuterated chlorofom |
| $CD_2Cl_2$ | deuterated dichloromethane |
| cHex | cyclohexyl |
| DCM | dichloromethane |
| DMF | dimethylformamide |
| DMSO-$d_6$ | deuterated dimethylsulfoxide |
| EBSS | Earle's balanced salt solution |
| EMEM | Eagle's minimum essential medium |
| EtOAc | ethyl acetate |
| EtOH | ethanol |
| $Et_2O$ | diethylether |
| h | hours |
| HPLC | high performance liquid chromatography |
| Int. | intermediate |
| i-PrOH | isopropanol |
| LC | liquid chromatography |
| M | molar |
| mCPBA | meta-chloroperbenzoic acid |
| MeOH | methanol |
| MS | mass spectroscopy |
| min | minutes |
| N | normal |
| NMR | nuclear magnetic resonance spectroscopy |
| PBS | phosphate buffered saline |
| Pyr-$d_5$ | deuterated pyridine |
| rpm | round per minute |
| rt | room temperature |
| THF | tetrahydrofurane |
| TSB | Tris-buffered saline |

Proton nuclear magnetic resonance ($^1$H NMR) spectra were recorded on Bruker DPX 300 MHz equipped with a 5 mm BBI probe, Bruker AV400 MHz equipped with a 5 mm PABBO probe, Bruker DRX 500 MHz equipped with a 5 mm PABBI probe or Bruker Avance III 600 spectrometers equipped with a 5 mm rt BBI probe. The samples are recorded at 25° C. using DMSO-$d_6$, $C_5D_5N$, $CD_2Cl_2$, Pyr-d5 or $CDCl_3$ as a solvent, unless otherwise stated.

2D $^1$H,$^{15}$N HSQC spectra were acquired at 298 K on a Bruker Avance IIIHD 600 MHz NMR spectrometer, equipped with a cryogenic triple resonance probe (Bruker, Karlsruhe, Germany). The proton chemical shifts were referenced using the methyl signal of sodium 3-trimethylsillyl-[2,2,3,3-d4]-propionate at 0 ppm. Spectra were processed with the Bruker TopSpin software package 3.5 and analyzed with the Sparky software. Assignments of AgrAc were deduced from the Biological Magnetic Resonance Bank (BMRB) entry 18598. Chemical shifts are reported in parts per million (δ) downfield from the internal standard tetramethylsilane (TMS). Abbreviations for NMR data are as follows: s=singlet, d=doublet, t=triplet, q=quartet, sep=septuplet, m=multiplet, app=apparent, br=broad. Mass spectra were obtained using electrospray (ES) ionization techniques. All temperatures are reported in degrees centigrade. Microwave heating is performed with a Biotage Initiator™ with Robot Sixty.

Intermediates VI

Intermediate VI-1: 2-[2-methyl-4-(trifluoromethoxy)phenyl]sulfanylacetonitrile

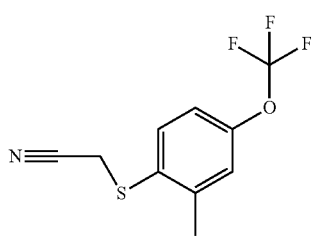

VI-1

A mixture of sodium thiosulfate pentahydrate (Fluorochem, 1818 mg, 7.3 mmol), 2-bromoacetonitrile (Fluorochem, 878.5 mg, 7.3 mmol), copper(II) sulfate pentahydrate (Kemika, 26.12 mg, 0.105 mmol) and 2,2'-dipyridyl (Fluorochem, 16.34 mg, 0.105 mmol) in MeOH/$H_2O$ (10 mL/20 mL) were stirred at 80° C. for 2 h, then 2-methyl-4-(trifluoromethoxy)aniline (ArkPharm, 200 mg, 1.05 mmol) and tert-butyl nitrite (Fluorochem, 186.7 µL, 1.57 mmol) were added and stirred at 80° C. for 3 h. The reaction mixture was concentrated under reduced pressure and DCM was added (30 mL). Organic phase was extracted and evaporated in vacuo to yield 150 mg of brown oily residue which was purified by flash chromatography (eluant cHex:EtOAc 7:3) to give the title compound (97 mg, 37.5%) as a yellowish oil. $^1$H NMR (300 MHz, $CDCl_3$) δ ppm: 7.57 (d, J=8.6 Hz, 1H), 7.17-7.06 (m, 2H), 3.52 (s, 2H), 2.51 (s, 3H).

Intermediates VI-2 to VI-8 were analogously prepared as described for VI-1, replacing 2-methyl-4-(trifluoromethoxy)aniline with those indicated in the table below. Modifications in the protocol and purification step are also indicated.

| Int. | Structure | Starting material | Physical data |
|---|---|---|---|
| VI-2 | (structure) | (structure) Combi Blocks 6.05 mmol | $^1$HNMR (300 MHz, $CDCl_3$) δ ppm: 7.58-7.48 (m, 2H), 7.43 (d, J = 7.8 Hz, 1H), 3.69 (s, 2H), 2.43 (s, 3H). |
| VI-3 | (structure) | (structure) Combi Blocks 3.02 mmol | $^1$HNMR (300 MHz, DMSO-d6) δ ppm: 7.88-7.76 (m, 2H), 7.55-7.47 (m, 1H), 4.39 (s, 2H), 3.84 (s, 3H), 2.33 (s, 3H). |
| VI-4[1] | (structure) | (structure) Fluorochem 2.85 mmol | $^1$HNMR (300 MHz, DMSO-d6) δ ppm: 7.72 (d, J = 8.14 Hz, 1H), 7.64 (s, 1H), 7.56 (d, J = 8.14 Hz, 1H), 4.29 (s, 2H), 2.38 (s, 3H). |
| VI-5 | (structure) | (structure) Enamine 0.19 mmol | $^1$HNMR (500 MHz, $CDCl_3$) δ ppm: 7.44 (d, J = 8.1 Hz, 1H), 7.00-6.96 (m, 1H), 6.93-6.88 (m, 1H), 3.45 (s, 2H), 2.46 (s, 3H), 1.90-1.70 (m, 1H), 1.02-0.92 (m, 2H), 0.72-0.66 (m, 2H). |

| Int. | Structure | Starting material | Physical data |
| --- | --- | --- | --- |
| VI-6 | | Enamine 0.20 mmol | ¹HNMR (500 MHz, CDCl₃) δ ppm: 7.47 (d, J = 7.9 Hz, 1H), 7.13-7.09 (m, 1H), 7.08-7.04 (m, 1H), 3.48 (s, 2H), 2.62 (q, J = 7.6 Hz, 2H), 2.48 (s, 3H), 1.22 (t, J = 7.6 Hz, 3H). |
| VI-7 | | Fluorochem 3.21 mmol | ¹HNMR (300 MHz, DMSO-d6) δ ppm: 7.31 (s, 1H), 7.18 (s, 1H), 3.92 (s, 2H), 2.52 (s, 3H), 2.28 (s, 3H). |
| VI-8 | | Fluorochem 2.50 mmol | ¹HNMR (300 MHz, DMSO-d6) δ ppm: 7.48 (s, 1H), 7.22 (s, 1H), 3.93 (s, 2H), 3.03 (s, 3H), 2.27 (s, 3H). |

¹purified by flash chromatography (eluant chex:EtOAc 9:1)

Intermediates IV

Intermediate IV-1:
2-(2,4-dimethylphenyl)sulfonylacetonitrile

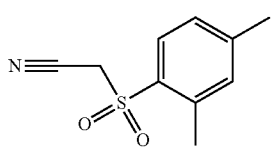

2-bromoacetonitrile (Alfa Aesar, 174 μL, 2.50 mmol) was dissolved in DMF (0.4M), stirred in an ice bath, and then treated with 2,4-dimethylbenzenethiol (Enamine, 321 μL, 2.38 mmol) and K₂CO₃ (691 mg, 5.00 mmol), and allowed to stir for 2 h at 0° C. The reaction mixture was taken up into excess H₂O and extracted 3 times with Et₂O. The combined organic extracts were washed twice with water and NaCl (saturated aqueous solution), followed by concentration in vacuo to generate 2-(2,4-dimethylphenyl)sulfanylacetonitrile in approximately 90% yield. The 2-(2,4-dimethylphenyl)sulfanylacetonitrile (380 mg, 2.14 mmol) was then dissolved in DCM (0.4 M) and treated portionwise with mCPBA (77.0%, 961 mg, 4.29 mmol) at 0° C. The reaction was stirred at rt under argon for 3 days. The reaction mixture was quenched with excess sodium sulfite solution and extracted twice with DCM. Organic layer was washed with saturated aqueous solution NaHCO₃, brine, dried over MgSO₄, and concentrated in vacuo to generate the title compound (300 mg, 67%). ¹H NMR (300 MHz, CD₂Cl₂) δ ppm: 7.95 (d, J=8.0 Hz, 1H), 8.32-8.25 (m, 2H), 4.15 (s, 2H), 2.69 (s, 3H), 2.45 (s, 3H). [ES-MS] m/z 208 (MH−).

Intermediate IV-2:
2-(4-chloro-2-methyl-phenyl)sulfonylacetonitrile

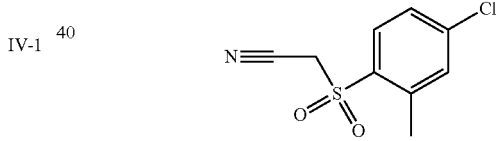

2-bromoacetonitrile (Aldrich, 159 mg, 1.33 mmol) was dissolved in DMF (0.4M), stirred in an ice bath, and then treated with 4-chloro-2-methylbenzenethiol (Fluorochem, 200 mg, 1.26 mmol) and K₂CO₃ (348 mg, 2.52 mmol), and allowed to stir for 1 h at 0° C. The reaction mixture was taken up into excess H₂O and extracted 3 times with Et₂O. The combined organic extracts were washed twice with water and NaCl (saturated aqueous solution), dried over MgSO₄, filtered followed by concentration in vacuo to generate 2-(4-chloro-2-methylphenyl)sulfanylacetonitrile in 23% yield. The 2-(4-chloro-2-methylphenyl)sulfanylacetonitrile was dissolved in glacial acetic acid (5 mL) and 30% H₂O₂ in water (413 μL) was added. The solution was heated at 110° C. for 1.5 h. The reaction mixture was cooled to rt and evaporated under vacuum. Water was added, and the residue was extracted with DCM. Organic layer was washed with saturated aqueous solution NaHCO₃, dried over MgSO₄, filtered and concentrated in vacuo to generate the title compound (107 mg, 92%). ¹H NMR (300 MHz, DMSO-d6) δ ppm: 7.94 (d, J=8.47 Hz, 1H), 7.70 (d, J=2.16 Hz, 1H), 7.63 (dd, J=8.44, 2.07 Hz, 1H), 5.22 (s, 2H), 2.64 (s, 3H). [ES-MS] m/z 227 (MH−).

Intermediate IV-3: 2-(2-methoxy-4-methylphenyl)sulfonylacetonitrile

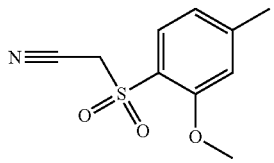

IV-3

The mixture of 2-methoxy-4-methyl-benzenesulfonyl chloride (Santa Cruz, 200 mg, 0.906 mmol), sodium sulfite (183 mg, 1.45 mmol) and sodium bicarbonate (122 mg, 1.45 mmol) was suspended in the mixture of water (2.0 mL) and i-PrOH (0.5 mL). The resulting suspension was heated by microwave irradiation at 120° C. for 30 min. 2-chloroacetonitrile (Aldrich, 2.72 mmol, 172 µL) was added to the reaction mixture which was then heated by microwave irradiation at 120° C. for 20 min. NH₄Cl (saturated aqueous solution, 15 mL) was then added and the resulting suspension was extracted with EtOAc (3×10 mL). Organic layer was dried over MgSO₄, filtered and evaporated on vacuo. The crude product was purified by flash chromatography (cHex:EtOAc 4:1) to yield the title compound (177 mg, 87%) as a colourless oil. $^1$H NMR (300 MHz, DMSO-d6) δ ppm: 7.71 (d, J=8.1 Hz, 1H), 7.20 (s, 1H), 7.05-7.60 (m, 1H), 5.08 (s, 2H), 3.94 (s, 3H), 2.42 (s, 3H). [ES-MS] m/z 224 (MH−).

Intermediates IV-4 to IV-14 were analogously prepared as described for IV-3, replacing 2-methoxy-4-methyl-benzenesulfonyl chloride with those indicated as starting material in the table below. Modifications in the purification step are also indicated.

| Int. | Structure | Starting material | Physical data |
|---|---|---|---|
| IV-4[1] | | 0.8 mmol Fluorochem | $^1$H NMR (500 MHz, DMSO-d6) δ ppm: 7.84 (d, J = 9.4 Hz, 1H), 7.08-6.98 (m, 2H), 5.08 (s, 2H), 4.84-4.73 (m, 1H), 2.59 (s, 3H), 1.30 (s, 3H), 1.29 (s, 3H). [ES− MS] m/z 252 (MH−). |
| IV-5 | | 0.8 mmol Fluorochem | $^1$H NMR (300 MHz, DMSO-d6) δ ppm: 7.99 (d, J = 7.4 Hz, 1H), 7.72-7.65 (m, 1H), 7.55-7.45 (m, 1H), 5.30 (s, 2H), 2.44 (s, 3H). [ES− MS] m/z 228 (MH−). |
| IV-6 | | 0.74 mmol Fluorochem | $^1$H NMR (300 MHz, DMSO-d6) δ ppm: 7.89-7.82 (m, 2H), 7.81-7.75 (m, 1H), 5.23 (s, 2H), 2.64 (s, 3H). [ES− MS] m/z 273 (MH−). |
| IV-7 | | 0.9 mmol J&W PharmLab | $^1$H NMR (300 MHz, DMSO-d6) δ ppm: 7.86 (d, J = 8.43 Hz, 1H), 7.10-7.00 (m, 2H), 5.08 (s, 2H), 3.85 (s, 3H), 2.60 (s, 3H). [ES− MS] m/z 224 (MH−). |

| Int. | Structure | Starting material | Physical data |
|---|---|---|---|
| IV-8[2] | 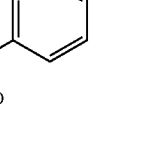 | 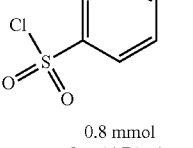

0.8 mmol
Combi Blocks | $^1$H NMR (300 MHz, DMSO-d6) δ ppm: 10.40 (s, 1H), 7.89-7.82 (m, 1H), 7.71-7.63 (m, 2H), 5.10 (s, 2H), 2.59 (s, 3H), 2.08 (s, 3H). [ES+ MS] m/z 253 (MH+). |
| IV-9[2] | 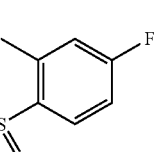 | 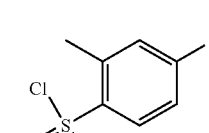

0.95 mmol
Fluorochem | $^1$H NMR (300 MHz, DMSO-d6) δ ppm: 8.05-7.97 (m, 1H), 7.52-7.31 (m, 2H), 5.21 (s, 2H), 2.65 (s, 3H). [ES− MS] m/z 212 (MH−). |
| IV-10[2] | 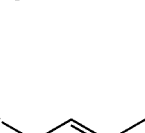 | 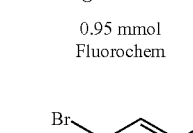

0.74 mmol
Enamine | $^1$H NMR (500 MHz, DMSO-d6) δ ppm: 8.01 (d, J = 8.1 Hz, 1H), 7.86 (d, J = 0.7 Hz, 1H), 7.54 (dd, J = 8.2, 0.7 Hz, 1H), 5.28 (s, 2H), 2.43 (s, 3H). [ES− MS] m/z 273 (MH−). |
| IV-11 | 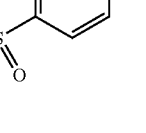 | 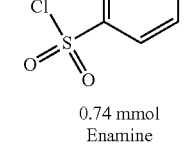

0.55 mmol
Bepharm | $^1$H NMR (300 MHz, DMSO-d6) δ ppm: 7.81 (d, J = 8.6 Hz, 2H), 7.41 (d, J = 8.4 Hz, 2H), 5.18 (s, 2H), 2.14-2.01 (m, 1H), 1.15-1.05 (m, 2H), 0.88-0.77 (m, 2H). [ES− MS] m/z 220 (MH−). |
| IV-12[2] | 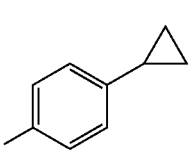 | 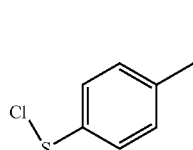

0.82 mmol
Sigma-aldrich | $^1$H NMR (300 MHz, DMSO-d6) δ ppm: 8.18 (q, J = 16.60, 8.65, 4H), 5.39 (s, 2H). [ES− MS] m/z 248 (MH−). |
| IV-13[2] |  | 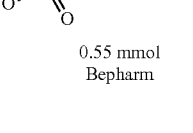

0.19 mmol
TCI | $^1$H NMR (300 MHz, DMSO-d6) δ ppm: 8.18 (d, J = 8.4 Hz, 2H), 7.97 (d, J = 8.5 Hz, 2H), 4.11 (s, 2H). [ES− MS] m/z 205 (MH−). |

| Int. | Structure | Starting material | Physical data |
|---|---|---|---|
| IV-14[2] | | 1.8 mmol Fluorochem | $^1$H NMR (300 MHz, DMSO-d6) δ ppm: 7.87 (s, 1H), 7.80 (s, 1H), 5.25 (s, 2H), 2.32 (s, 3H), 2.29 (s, 3H). [ES− MS] m/z 287 (MH−). |

[1](cHex:EtOAc 7:3)
[2](cHex:EtOAc 1:1)

Intermediate IV-15: 2-[2-methyl-4-(trifluoromethoxy)phenyl]sulfonylacetonitrile

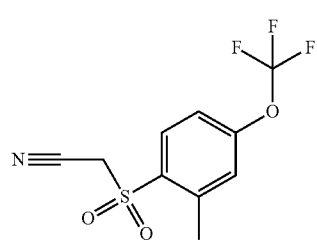

IV-15

Intermediate VI-1 (93 mg, 0.38 mmol) was dissolved in DCM (5 mL) and mCPBA (Apollo Scientific, 204 mg, 1.18 mmol) was added portion-wise at 0° C. The mixture was stirred overnight at rt. mCPBA (Apollo Scientific, 102 mg, 1 equiv) was added and stirring was continued at rt for 72 h. Saturated $Na_2SO_3$ aqueous solution (10 mL) was added to the reaction mixture. The aqueous layer was extracted with DCM (10 mL×2). The combined organic layers were washed with saturated $NaHCO_3$ aqueous solution, water then brine, dried over $MgSO_4$, filtered and concentrated in vacuo to yield the title compound (84 mg, 80%) as a light-yellow solid. $^1$H NMR (300 MHz, DMSO-d6) δ ppm: 8.07 (d, J=8.8 Hz, 1H), 7.63-7.51 (m, 2H), 5.26 (s, 2H), 2.69 (s, 3H). [ES-MS] m/z 278 (MH−).

Intermediates IV-16 to IV-17 were analogously prepared as described for IV-15, replacing Intermediate VI-1, 2-[2-methyl-4-(trifluoromethoxy)phenyl]sulfanylacetonitrile, with those indicated as starting material in the table below. Modifications in the protocol and purification step are also indicated.

| Int. | Structure | Starting material | Physical data |
|---|---|---|---|
| IV-16[1] | | Int. VI-2 2.12 mmol | $^1$H NMR (300 MHz, CDCl3) δ ppm: 8.22 (d, J = 8.1 Hz, 1H), 7.80-7.69 (m, 2H), 4.14 (s, 2H), 2.81 (s, 3H). [ES− MS] m/z 219 (MH−). |
| IV-17[2] | | Int. VI-3 0.57 mmol | $^1$H NMR (300 MHz, DMSO-d6) δ ppm: 8.12-8.01 (m, 3H), 5.29 (s, 2H), 3.90 (s, 3H), 2.72 (s, 3H). [ES− MS] m/z 252 (MH−). |

[1]no second addition of mCPBA and the reaction mixture was stirred at rt 96 h.
[2]the compound was purified by flash chromatography, eluant cHex:EtOAc 10:0 to 5:5

Intermediate IV-18: 2-[4-methyl-2-(trifluoromethyl)phenyl]sulfonylacetonitrile

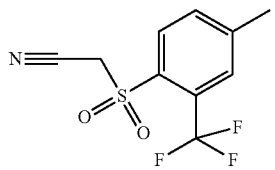

IV-18

Intermediate VI-4 (167 mg, 0.63 mmol) was dissolved in glacial acetic acid (5 mL) and 30% $H_2O_2$ in water (513 μL, 5 mmol) was added. The solution was heated at 110° C. for 5 h. The reaction mixture was cooled to rt and evaporated under vacuum. Water was added, and the residue was extracted with DCM. Organic layer was washed with saturated $NaHCO_3$ aqueous solution, dried over $MgSO_4$, filtered and concentrated in vacuo. The residue was purified by flash chromatography (eluant cHex:EtOAc 8:2) to generate the title compound (98 mg, 54%). $^1$H NMR (300 MHz, DMSO-d6) δ ppm: 8.15 (d, J=8.2 Hz, 1H), 7.97 (s, 1H), 7.85 (d, J=8.3 Hz, 1H), 5.21 (s, 2H), 2.52 (s, 3H, under solvent). [ES-MS] m/z 262 (MH−).

Intermediates IV-19 to IV-22 were analogously prepared as described for IV-18, replacing Intermediate VI-4 with those indicated as starting material in the table below. Modifications in the protocol and purification step are also indicated.

Intermediates II

Intermediate II-1: methyl 2-azido-5-chloro-benzoate

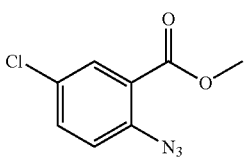

II-1

Methyl 2-amino-5-chloro-benzoate (Enamine, 400 mg, 2.16 mmol) was dissolved in dry ACN (2 mL) and cool down to 0° C. Tert-butyl nitrite (Sigma-aldrich, 388 μL, 3.23 mmol) was added and the reaction mixture was stirred 5 min. Azido(trimethyl)silane (Acros, 343 μL, 2.59 mmol) was added dropwise and the reaction mixture was stirred 2 h at rt. $NaHCO_3$ saturated aqueous solution was added and the reaction mixture was extracted with EtOAc. Organic layer was washed with $NaHCO_3$ saturated aqueous solution, brine, dried over $MgSO_4$ and evaporated under vacuum to give the title compound (391 mg, 86%) as an orange solid which was used in the next step without further purification. $^1$H NMR (300 MHz, DMSO-d6) δ ppm: 7.77 (d, J=2.5 Hz, 1H), 7.69 (dd, J=8.6 & 2.6 Hz, 1H), 7.44 (d, J=8.6 Hz, 1H), 3.82 (s, 3H).

| Int. | Structure | Starting material | Physical data |
|---|---|---|---|
| IV-19[1] | | Int. VI-5<br>2.12 mmol | [ES– MS] m/z 234 (MH−). |
| IV-20[1] | | Int. VI-6<br>0.57 mmol | [ES– MS] m/z 222 (MH−). |
| IV-21[2] | | Int. VI-7<br>0.85 mmol | [ES– MS] m/z 242 (MH−). |
| IV-22 | | Int. VI-8<br>0.84 mmol | [ES– MS] m/z 286 (MH−). |

[1]The solution was heated at 110° C. for 1.5 h. No purification was performed. The residue was used as such in the next step.
[2]The solution was heated at 110° C. for 2 h. The residue was purified by flash chromatography (eluant cHex:EtOAc 6:4).

Intermediates II-2 to II-4 were prepared by a method analogous to that described for II-1, replacing methyl 2-amino-5-chloro-benzoate with those indicated in the table below.

filtered and evaporated under vacuum to yield the title product (1.1 g, 94%) as a yellow oil. $^1$H NMR (300 MHz, DMSO-d6) δ ppm: 7.83-7.58 (m, 1H), 6.89-6.80 (m, 2H), 3.85 (s, 3H), 3.78 (s, 3H).

| Int. | Structure | Starting material | Physical data |
|---|---|---|---|
| II-2 | (Cl, CO$_2$Me, N$_3$ substituted benzene) | (Cl, CO$_2$Me, NH$_2$ substituted benzene) Enamine 1.08 mmol | $^1$H NMR (300 MHz, DMSO-d6) δ ppm: 7.59-7.52 (m, 1H), 7.44-7.35 (m, 2H), 3.89 (s, 3H). |
| II-3 | (CO$_2$Me, N$_3$, Cl substituted benzene) | (CO$_2$Me, NH$_2$, Cl substituted benzene) Enamine 1.08 mmol | $^1$H NMR (300 MHz, DMSO-d6) δ ppm: 7.81-7.75 (m, 2H), 7.39-7.33 (m, 1H), 3.85 (s, 3H). |
| II-4 | (MeO, CO$_2$Me, N$_3$ substituted benzene) | (MeO, CO$_2$Me, NH$_2$ substituted benzene) Enamine 1.08 mmol | $^1$H NMR (300 MHz, CD$_2$Cl$_2$) δ ppm: 7.38 (d, J = 2.9 Hz, 1H), 7.20 (dd, J = 8.8 & 0.3 Hz, 1H), 7.11 (dd, J = 8.8 & 2.9 Hz, 1H), 3.90 (s, 3H), 3.84 (s, 3H). |

Intermediate II-5: methyl 2-azido-4-methoxy-benzoate

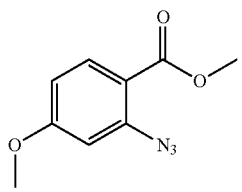

II-5

To the ice chilled suspension of methyl 2-amino-4-methoxy-benzoate (1 g, 5.4 mmol), in HCl (aqueous solution, 6 M, 27 mL), a solution of sodium nitrite (564 mg, 8.2 mmol) in water (7.0 mL) was added under N$_2$ atmosphere. Resulting yellow solution was stirred at 0° C. for 20 min. Resulting solution was added dropwise to ice chilled solution of sodium azide (703 mg, 11 mmol) and sodium acetate (4437 mg, 54 mmol) in water (30 mL) under the N$_2$ atmosphere. Resulting solution was stirred at 0° C. for 15 min and then was left to spontaneously reach the rt for 2 h. Reaction mixture was extracted with Et$_2$O (3×80 mL). Combined organic layers were washed with NaHCO$_3$ (saturated aqueous solution, 2×100 mL), dried over MgSO4, Intermediate II-6: methyl 2-azido-benzoate

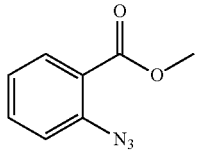

II-6

To the ice chilled suspension of methyl 2-amino-benzoate (0.5 g, 3.3 mmol), in HCl (aqueous solution, 6 M, 17 mL), a solution of sodium nitrite (345 mg, 5 mmol) in water (4.0 mL) was added under N$_2$ atmosphere. Resulting yellow solution was stirred at 0° C. for 20 min and was added dropwise to ice chilled solution of sodium azide (430 mg, 6.6 mmol) and sodium acetate (2713 mg, 33 mmol) in water (18 mL) under the N$_2$ atmosphere. Resulting solution was stirred at 0° C. for 30 min and then was left to spontaneously reach the rt for 1.5 h. Reaction mixture was extracted with Et$_2$O (3×50 mL). Combined organic layers were washed with NaHCO$_3$ (saturated aqueous solution, 3×50 mL), dried over Na$_2$SO4, filtered and evaporated under vacuum to yield the title product (413 mg, 70%) as a yellow oil. $^1$H NMR (300 MHz, DMSO-d6) δ ppm: 7.76 (d, J=7.8 Hz, 1H), 7.63 (t, J=7.6 Hz, 1H), 7.40 (d, J=8.4 Hz, 1H) 7.28 (t, J=7.6 Hz, 1H), 3.81 (s, 3H).

Intermediate II-7: methyl 2-azido-4-bromo-benzoate

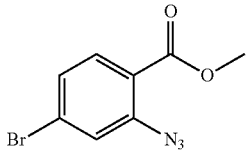

To the ice chilled suspension of methyl 2-amino-4-bromo-benzoate (0.5 g, 2.2 mmol), in HCl (aqueous solution, 6 M, 17 mL), a solution of sodium nitrite (226 mg, 3.3 mmol) in water (3.0 mL) was added under $N_2$ atmosphere. Resulting yellow solution was stirred at 0° C. for 20 min and was added dropwise to ice chilled solution of sodium azide (212 mg, 3.3 mmol) and sodium acetate (3.57 g, 43 mmol) in water (22 mL) under the $N_2$ atmosphere. Resulting solution was stirred at 0° C. for 20 min and then was left to spontaneously reach the rt for 2 h. Reaction mixture was extracted with $Et_2O$ (3×50 mL). Combined organic layers were washed with $NaHCO_3$ (saturated aqueous solution, 3×50 mL), dried over $Na_2SO4$, filtered and evaporated under vacuum to yield the title product (410 mg, 74%) as a yellow oil.

Intermediate II-8: methyl 2-azido-6-methoxy-benzoate

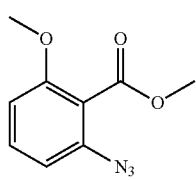

To the ice chilled suspension of methyl 2-amino-6-methoxy-benzoate (0.25 g, 1.4 mmol), in HCl (aqueous solution, 6 M, 8 mL), a solution of sodium nitrite (144 mg, 2.1 mmol) in water (1.5 mL) was added under $N_2$ atmosphere. Resulting yellow solution was stirred at 0° C. for 20 min and was added dropwise to ice chilled solution of sodium azide (135 mg, 2.1 mmol) and sodium acetate (2.26 g, 28 mmol) in water (10 mL) under the $N_2$ atmosphere. Resulting solution was stirred at 0° C. for 20 min and then was left to spontaneously reach the rt for 1 h. Reaction mixture was extracted with $Et_2O$ (3×50 mL). Combined organic layers were washed with $NaHCO_3$ (saturated aqueous solution, 3×50 mL), dried over $Na_2SO4$, filtered and evaporated under vacuum to yield the title product (260 mg, 91%) as a yellow oil which was used without further purification in the next step.

Intermediates II-9 to II-12 were prepared by a method analogous to that described for II-8, replacing methyl 2-amino-6-methoxy-benzoate with those indicated in the table below.

| Int. | Structure | Starting material |
|---|---|---|
| II-9 | | Aldrich 0.9 mmol |
| II-10 | | Aldrich 2.8 mmol |
| II-11 | | Aldrich 1.3 mmol |
| II-12 | | Aldrich 1.3 mmol |

Intermediate II-13: methyl 2-azido-5-methoxy-4-(2-methoxyethoxy)benzoate

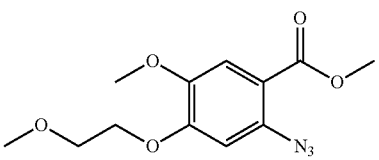

To a solution of Intermediate II-11 (130 mg, 0.58 mmol) in DMF (2 mL), 1-bromo-2-methoxy-ethane (82.1 μL, 0.87 mmol), and $K_2CO_3$ (242 mg, 1.75 mmol) were added and the reaction mixture was stirred at r.t for 4 days. The reaction mixture was diluted with EtOAc (75 ml), washed with sat. NH4Cl solution and brine, dried over $Na_2SO_4$, filtered and evaporated under vacuum to yield the title product (170 mg, 100%).

Intermediate II-14: methyl 2-azido-4-[2-[2-(2-methoxyethoxy)ethoxy]ethoxy]benzoate

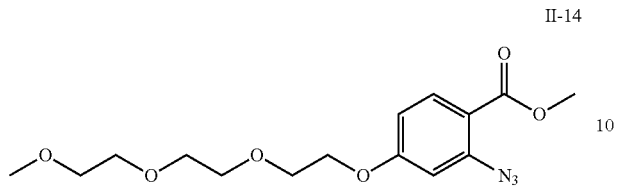
II-14

To a solution of Intermediate II-12 (75 mg, 0.39 mmol) in DMF (1 mL), 1-[2-(2-bromoethoxy)ethoxy]-2-methoxyethane (135 μL, 0.78 mmol), and K₂CO₃ (215 mg, 1.55 mmol) were added and the reaction mixture was stirred at r.t overnight. The reaction mixture was diluted with EtOAc (150 mL), washed with sat. NH4Cl solution and brine, dried over Na₂SO₄, filtered and evaporated under vacuum to yield the title product (130 mg, 98%).

Intermediate II-15: methyl 2-azido-4-[(2,2-dimethyl-1,3-dioxolan-4-yl)methoxy]benzoate

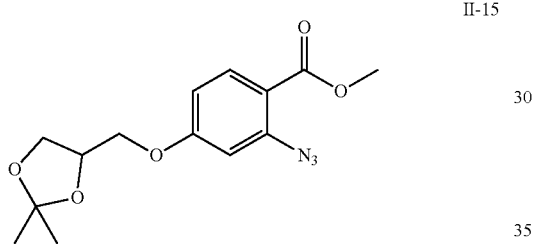
II-15

To a solution of Intermediate II-12 (75 mg, 0.39 mmol) in DMF (1 mL), 4-(bromomethyl)-2,2-dimethyl-1,3-dioxolane (66 μL, 0.47 mmol), and K₂CO₃ (215 mg, 1.55 mmol) were added and the reaction mixture was stirred at 50° C. for 4 days. The reaction mixture was diluted with EtOAc (150 mL), washed with sat. NH4Cl solution and brine, dried over Na₂SO₄, filtered and evaporated under vacuum to yield the title product (85 mg, 71%).

Intermediate II-16: methyl 2-azido-4-(2-hydroxyethoxy)-5-methoxy-benzoate

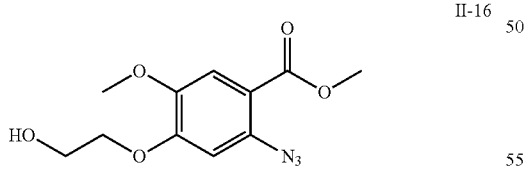
II-16

To a solution of Intermediate II-11 (120 mg, 0.54 mmol) in DMF (2 mL), 2-bromoethanol (153 μL, 2.1 mmol), and K₂CO₃ (594 mg, 4.3 mmol) were added and the reaction mixture was stirred at r.t for 6 days. The reaction mixture was diluted with EtOAc (75 ml), washed with sat. NH4Cl solution and brine, dried over Na₂SO₄, filtered and evaporated under vacuum to yield the title product (144 mg, 100%).

Compounds of Formula (I)

Compound 1: 7-chloro-3-(2,4-dimethylphenyl)sulfonyl-4H-triazolo[1,5-a]quinazolin-5-one

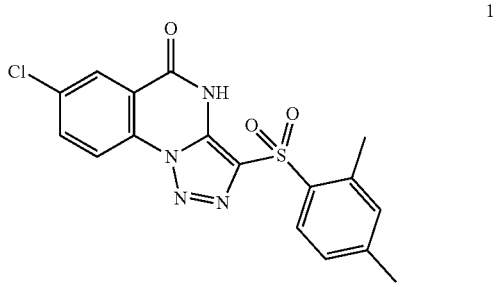
1

A sodium methoxide solution was prepared carefully in situ by dissolving sodium (27.2 mg, 1.18 mmol) in anhydrous MeOH (0.1M) under argon. To this solution was added Intermediate IV-1 (112 mg, 0.536 mmol) and the solution was stirred 20 min at rt. The intermediate II-1 (100 mg, 0.47 mmol) was added portion wise and the resulting orange solution was stirred overnight at rt. After concentrating under reduced pressure, the residue was suspended in H₂O and acidified with 1N HCl to pH 2. The precipitate was filtrated and washed with water. The yellow solid was heated in EtOH and filtered to give the title compound (80.0 mg, 43.5%) as a white solid. $^1$H NMR (300 MHz, DMSO-d6) δ ppm: 12.63 (br s, 1H), 8.32 (d, J=8.7 Hz, 1H), 8.19 (d, J=8.2 Hz, 1H), 8.14 (d, J=1.9 Hz, 1H), 8.1-7.9 (m, 1H), 7.28 (d, J=8.2 Hz, 1H), 7.22 (s, 1H), 2.59 (s, 3H), 2.33 (s, 3H). [ES+MS] m/z 389 (MH⁺).

Compounds 2 to 30 of formula (I) of the present invention were prepared by a method analogous to that described for compound 1, replacing Intermediate IV-1 and II-1 with the corresponding Intermediates IV and II as indicated in the table below. Modifications in the protocol and purification step are also indicated.

| Cpd | Intermediate IV | Intermediate II | Physical data |
| --- | --- | --- | --- |
| 2 | IV-1<br>0.42 mmol | II-2<br>0.38 mmol | $^1$H NMR (300 MHz, DMSO-d6) δ ppm: 12.36 (br s, 1H), 8.16-8.12 (m, 1H), 7.96 (d, J = 8.0 Hz, 1H), 7.68 (t, J = 8.0 Hz, 1H), 1.6-1.5 (m, 1H), 7.25-7.17 (m, 1H), 7.11 (s, 1H), 2.49 (s, 3H), 2.30 (s, 3H). [ES+ MS] m/z 389 (MH⁺). |

-continued

| Cpd | Intermediate IV | Intermediate II | Physical data |
|---|---|---|---|
| 3 | IV-1<br>0.42 mmol | 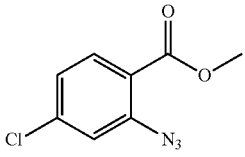<br>Keyorganics<br>0.38 mmol | $^1$H NMR (300 MHz, CD$_2$Cl$_2$) δ ppm: 9.54 (br s, 1H), 8.42 (d, J = 1.9 Hz, 1H), 8.33 (d, J = 8.6 Hz, 1H), 8.08 (d, J = 8.1 Hz, 1H), 7.69 (dd, J = 8.6 & 1.9 Hz, 1H), 7.26 (d, J = 8.3 Hz, 1H), 7.19 (s, 1H), 2.68 (s, 3H), 2.41 (s, 3H). [ES+ MS] m/z 389 (MH$^+$). |
| 4[1] | IV-1<br>0.42 mmol | II-3<br>0.38 mmol | $^1$H NMR (300 MHz, CD$_2$Cl$_2$) δ ppm: 9.86 (br s, 1H), 8.42 (dd, J = 8.2 & 1.3 Hz, 1H), 8.12 (d, J = 8.1 Hz, 1H), 8.01 (dd, J = 7.9 & 1.3 Hz, 1H), 7.49 (t, J = 8.1 Hz, 1H), 7.27 (d, J = 8.2 Hz, 1H), 7.21 (s, 1H), 2.69 (s, 3H), 2.41 (s, 3H). [ES+ MS] m/z 389 (MH$^+$). |
| 5 | IV-1<br>0.42 mmol | II-5<br>0.38 mmol | $^1$H NMR (300 MHz, CD$_2$Cl$_2$) δ ppm: 9.43 (br s, 1H), 8.28 (d, J = 9 Hz, 1H), 8.09 (d, J = 8.3 Hz, 1H), 7.81 (d, J = 2.5 Hz, 1H), 7.28-7.17 (m, 3H), 4.04 (s, 3H), 2.67 (s, 3H), 2.41 (s, 3H). [ES+ MS] m/z 385 (MH$^+$). |
| 6 | IV-1<br>0.42 mmol | 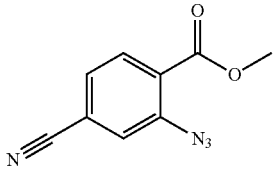<br>Keyorganics<br>0.38 mmol | $^1$H NMR (300 MHz, CD$_2$Cl$_2$) δ ppm: 8.72-8.69 (m, 1H), 8.51 (d, J = 8.1 Hz, 1H), 8.08 (d, J = 8.1 Hz, 1H), 7.96 (dd, J = 8.2 & 1.5 Hz, 1H), 7.27 (d, J = 8.2 Hz, 1H), 7.20 (s, 1H), 2.69 (s, 3H), 2.41 (s, 3H). [ES+ MS] m/z 380 (MH$^+$). |
| 7 | IV-1<br>0.42 mmol | 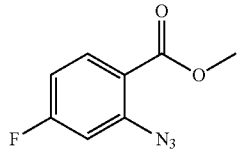<br>Keyorganics<br>0.38 mmol | $^1$H NMR (300 MHz, CD$_2$Cl$_2$) δ ppm: 9.55 (br s, 1H), 8.43 (dd, J = 8.9 & 5.4 Hz, 1H), 8.11-8.05 (m, 1H), 7.42 (ddd, J = 8.9 & 8.2 & 2.5 Hz, 1H), 7.29-7.23 (m, 1H), 7.19 (s, 1H), 2.68 (s, 3H), 2.41 (s, 3H). [ES+ MS] m/z 373 (MH$^+$). |
| 8[2] | 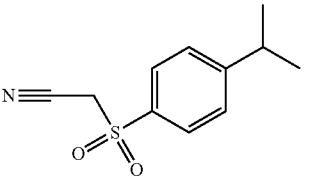<br>AKScientific<br>0.42 mmol | II-2<br>0.38 mmol | $^1$H NMR (300 MHz, DMSO-d6) δ ppm: 12.47 (br s, 1H), 8.29 (d, J = 8.2 Hz, 1H), 8.08 (d, J = 8.3 Hz, 2H), 7.89 (t, J = 8.1 Hz, 1H), 7.73 (d, J = 8.0 Hz, 1H), 7.52 (d, J = 8.3 Hz, 2H), 3.06-2.95 (m, 1H), 1.19 (d, J = 6.9 Hz, 6H). [ES+ MS] m/z 403 (MH$^+$). |
| 9[2] | 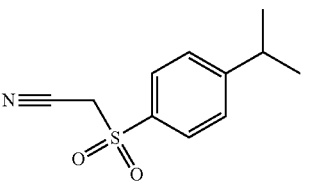<br>AKScientific<br>0.42 mmol | II-3<br>0.38 mmol | $^1$H NMR (300 MHz, CD$_2$Cl$_2$) δ ppm: 9.85 (br s, 1H), 8.42 (dd, J = 8.2 & 1.3 Hz, 1H), 8.05 (d, J = 8.5 Hz, 2H), 8.01 (dd, J = 7.9 & 1.3 Hz, 1H), 7.55-7.45 (m, 3H), 3.09-2.95 (m, 1H), 1.28 (d, J = 6.9 Hz, 6H). [ES+ MS] m/z 403 (MH$^+$). |
| 10[3] | IV-3<br>0.22 mmol | II-5<br>0.2 mmol | $^1$H NMR (500 MHz, DMSO-d6) δ ppm: 1.74 (br s, 1H), 8.16 (d, J = 9.0 Hz, 1H), 7.92 (d, J = 7.9 Hz, 1H), 7.75-7.69 (m, 1H), 7.29 (dd, J = 8.7 & 1.5 Hz, 1H), 7.05-6.96 (m, 2H), 3.99 (s, 3H), 3.70 (s, 3H), 2.36 (s, 3H). [ES+ MS] m/z 401 (MH$^+$). |

| Cpd | Intermediate IV | Intermediate II | Physical data |
|---|---|---|---|
| 11[4] | IV-4<br>0.2 mmol | II-5<br>0.2 mmol | $^1$H NMR (500 MHz, Pyr-d5) δ ppm: 8.47-8.39 (m, 2H), 7.82 (d, J = 2.1 Hz, 1H), 7.25-7.17 (m, 1H, under solvent), 6.94-6.88 (m, 2H), 4.54 (sep, J = 6.0 H, 1H), 3.79 (s, 3H), 2.89 (s, 3H), 1.20 (d, J = 6.1 Hz, 6H). [ES+ MS] m/z 429 (MH+). |
| 12[3] | IV-5<br>0.22 mmol | II-5<br>0.2 mmol | $^1$H NMR (500 MHz, DMSO-d6) δ ppm: 12.26 (br s, 1H), 8.26 (d, J = 8.2 Hz, 1H), 8.14 (d, J = 8.9 Hz, 1H), 7.73 (d, J = 2.4 Hz, 1H), 7.52 (s, 1H), 7.46 (dd, J = 8.2, 0.7 Hz, 1H), 7.29 (dd, J = 8.9, 2.4 Hz, 1H), 4.00 (s, 3H), 2.39 (s, 3H). [ES+ MS] m/z 405 (MH+). |
| 13[4] | IV-6<br>0.18 mmol | II-5<br>0.16 mmol | $^1$H NMR (600 MHz, DMSO-d6) δ ppm: 12.39 (br s, 1H), 8.24 (d, J = 7.9 Hz, 1H), 8.12 (d, J = 8.2 Hz, 1H), 7.80-7.56 (m, 3H), 7.31-7.22 (m, 1H), 3.98 (s, 3H), 2.62 (s, 3H). [ES+ MS] m/z 449, 451 (MH+). |
| 14[4] | <br>Keyorganics<br>0.23 mmol | II-5<br>0.23 mmol | $^1$H NMR (500 MHz, Pyr-d5) δ ppm: 8.48 (d, J = 8.9 Hz, 1H), 8.23 (t, J = 7.7 Hz, 1H), 7.84-7.77 (m, 1H), 7.28-7.12 (m, 1H, under solvent), 6.99-6.88 (m, 2H), 3.76 (s, 3H), 2.11 (s, 3H). [ES+ MS] m/z 389 (MH+). |
| 15[4] | IV-7<br>0.22 mmol | II-5<br>0.2 mmol | $^1$H NMR (300 MHz, DMSO-d6) δ ppm: 12.22 (br s, 1H), 8.26 (d, J = 8.59 Hz, 1H), 8.12 (d, J = 8.80 Hz, 1H), 7.69 (d, J = 2.40 Hz, 1H), 7.26 (dd, J = 8.80, 2.20 Hz, 1H), 7.02-6.92 (m, 2H), 3.97 (s, 3H), 3.81 (s, 3H), 2.57 (s, 3H) [ES+ MS] m/z 401 (MH+). |
| 16[4] | IV-8<br>0.2 mmol | II-5<br>0.18 mmol | $^1$H NMR (300 MHz, Pyr-d5) δ ppm: 11.14 (s, 1H), 8.43 (d, J = 2.53 Hz, 1H), 8.42 (d, J = 2.71 Hz, 1H), 7.95 (bs, 1H), 7.87 (dd, J = 8.84, 2.01 Hz, 1H), 7.83 (d, J = 2.36 Hz, 1H), 7.22-7.19 (m, 2H, under solvent peak), 3.79 (s, 3H), 2.85 (s, 3H), 2.15 (s, 3H). [ES+ MS] m/z 428 (MH+). |
| 17[3] | IV-9<br>0.23 mmol | II-5<br>0.21 mmol | $^1$H NMR (300 MHz, Pyr-d5) δ ppm: 8.50-8.39 (m, 2H), 7.84 (s, 1H), 7.21 (s, 1H, under solvent), 7.13-7.02 (m, 2H), 3.80 (s, 3H), 2.86 (s, 3H). [ES+ MS] m/z 389 (MH+). |
| 18[3,5] | IV-10<br>0.18 mmol | II-5<br>0.18 mmol | $^1$H NMR (500 MHz, Pyr-d5) δ ppm: 8.57 (d, J = 8.1 Hz, 1H), 8.45 (d, J = 9.0 Hz, 1H), 7.81 (d, J = 2.3 Hz, 1H), 7.45 (s, 1H), 7.25-7.18 (m, 2H, under solvent), 3.80 (s, 3H), 2.12 (s, 3H). [ES+ MS] m/z 449, 451 (MH+). |
| 19[3,6] | IV-15<br>0.18 mmol | II-5<br>0.18 mmol | $^1$H NMR (500 MHz, Pyr-d5) δ ppm: 8.47 (d, J = 9.3 Hz, 1H), 8.43 (d, J = 8.9 Hz, 1H), 7.85 (d, J = 1.7 Hz; 1H), 7.28-7.18 (m, 3H, under solvent), 3.80 (s, 3H), 2,89 (s, 3H). [ES+ MS] m/z 455 (MH+). |
| 20[4] | IV-2<br>0.22 mmol | II-5<br>0.2 mmol | $^1$H NMR (300 MHz, DMSO-d6) δ ppm: 12.36 (br s, 1H), 8.32 (d, J = 8.11 Hz, 1H), 8.12 (d, J = 8.94 Hz, 1H), 7.70 (d, J = 2.25 Hz, 1H), 7.60-7.52 (m, 2H), 7.27(dd, J = 9.14, 2.38 Hz, 1H), 3.98 (s, 3H), 2.62 (s, 3H) [ES+ MS] m/z 405 (MH+). |
| 21[4] | IV-11<br>0.23 mmol | II-5<br>0.23 mmol | $^1$H NMR (500 MHz, Pyr-d5) δ ppm: 8.44 (d, J = 8.2 Hz, 1H), 8.26 (d, J = 6.9 Hz, 2H), 7.82 (s, 1H), 7.38-7.04 (m, 3H, under solvent), 3.79 (s, 3H), 1.92-1.72 (m, 1H), 1.01-0.76 (m, 2H), 0.75-0.55 (m, 2H). [ES+ MS] m/z 397 (MH+). |
| 22[7] | IV-16<br>0.9 mmol | II-5<br>0.9 mmol | $^1$H NMR (500 MHz, Pyr-d5) δ ppm: 8.50-8.40 (m, 2H), 7.89-7.82 (m, 1H), 7.64 (d, J = 8.2 Hz, 1H), 7.30-7.10 (m, 2H, under solvent), 3.80 (s, 3H), 2.87 (s, 3H). [ES+ MS] m/z 396 (MH+). |

| Cpd | Intermediate IV | Intermediate II | Physical data |
|---|---|---|---|
| 23[8] | IV-17<br>0.2 mmol | II-5<br>0.18 mmol | $^1$H NMR (300 MHz, Pyr-d5) δ ppm: 8.58 (d, J = 8.15 Hz, 1H), 8.47 (d, J = 8.97 Hz, 1H), 8.31-8.22 (m, 2H), 7.85 (d, J = 2.22 Hz, 1H), 7.21-7.17 (m, 1H, under solvent), 3.79 (s, 3H), 2.98 (s, 3H). [ES+ MS] m/z 415 (MH$^+$). |
| 24[8] | IV-17<br>0.2 mmol | II-5<br>0.18 mmol | $^1$H NMR (500 MHz, DMSO-d6) δ ppm: 8.40 (d, J = 8.29 Hz, 1H), 8.11 (d, J = 9.02 Hz, 1H), 8.00-7.90 (m, 2H), 7.69 (d, J = 2.00 Hz, 1H), 7.26 (dd, J = 9.38, 2.46 Hz, 1H), 4.33 (q, J = 14.30, 7.10 Hz, 2H), 3.97 (s, 3H), 2.67 (s, 3H), 1.31 (t, J = 7.01 Hz, 3H). [ES+ MS] m/z 443 (MH$^+$). |
| 25[4] | IV-12<br>0.2 mmol | II-5<br>0.18 mmol | $^1$H NMR (300 MHz, DMSO-d6) δ ppm: 12.51 (br s, 1H), 8.37 (d, J = 8.30 Hz, 2H), 8.13 (d, J = 8.98 Hz, 1H), 8.05 (d, J = 8.40 Hz, 2H), 7.69 (d, J = 2.41 Hz, 1H), 7.27 (dd, J = 9.07, 2.32 Hz, 1H), 3.98 (s, 3H). [ES+ MS] m/z 425 (MH$^+$). |
| 26[5,7] | IV-18<br>0.33 mmol | II-5<br>0.3 mmol | $^1$H NMR (600 MHz, DMSO-d6) δ ppm: 8.36 (d, J = 8.29 Hz, 1H), 8.12 (d, J = 8.79 Hz, 1H, A), 7.84 (s, 1H, A), 7.73 (d, J = 7.95 Hz, 1H, A), 7.69 (s, 1H, A), 7.25 (d, J = 8.62 Hz, 1H, A), 3.99 (s, 3H, A), 2.48 (s, 3H, A). [ES+ MS] m/z 439 (MH$^+$). |
| 27[3] | IV-19<br>0.05 mmol | II-5<br>0.05 mmol | $^1$H NMR (600 MHz, Pyr-d5) δ ppm: 8.43 (d, J = 9.0 Hz, 1H), 8.35 (d, J = 8.2 Hz, 1H), 7.83 (d, J = 2.3 Hz, 1H), 7.27-7.13 (m, 1H, under solvent), 7.02-6.95 (m, 2H), 3.79 (s, 3H), 2.87 (s, 3H), 1.84-1.76 (m, 1H), 0.95-0.89 (m, 2H), 0.72-0.67 (m, 2H).. [ES+ MS] m/z 411 (MH$^+$). |
| 28[5,6] | IV-20<br>0.04 mmol | II-5<br>0.04 mmol | $^1$H NMR (600 MHz, CDCl$_3$) δ ppm: 9.40 (br.s, 1H), 8.27 (d, J = 8.8 Hz, 1H), 8.11 (d, J = 8.2 Hz, 1H), 7.76 (d, J = 2.3 Hz, 1H), 7.22 (d, J = 8.6 Hz, 1H), 7.18 (dd, J = 8.9, 2.3 Hz, 1H), 7.14 (s, 1H), 4.01 (s, 3H), 2.71 (s, 3H), 2.67 (q, J = 7.6 Hz, 2H), 1.23 (t, J = 7.7, 3H). [ES+ MS] m/z 399 (MH$^+$). |
| 29[5,7] | IV-13<br>0.22 mmol | II-5<br>0.22 mmol | $^1$H NMR (500 MHz, Pyr-d5) δ ppm: 8.47-8.39 (m, 3H), 7.91-7.81 (m, 3H), 7.28-7.15 (m, 1H, under solvent), 3.80 (s, 3H). [ES+ MS] m/z 382 (MH$^+$). |
| 30[7] | IV-1<br>0.44 mmol | II-4<br>0.39 mmol | $^1$H NMR (300 MHz, DMSO-d6) δ ppm: 12.45 (br s, 1H), 8.24 (d, J = 8.9 Hz, 1H), 8.18 (d, J = 8.1 Hz, 1H), 7.61-7.53 (m, 2H), 7.27 (d, J = 8.5 Hz, 1H), 7.21 (s, 1H), 3.90 (s, 3H), 3.58 (s, 3H), 3.32 (s, 3H). [ES+ MS] m/z 385 (MH$^+$). |

[1] The compound was triturated, filtered and washed with ACN
[2] The compound was recrystallized in EtOH
[3] The compound was purified by flash chromatography eluant DCM:MeOH (10:0.05)
[4] The compound was washed with water, cold i-PrOH and cold Et$_2$O
[5] the reaction was stirred at 50° C. for 1 h then at rt overnight
[6] the reaction was stirred at rt overnight
[7] purified by preparative HPLC (ACN/NH$_4$HCO$_3$ (10 mM), pH 10, 3/97 to 80/20, 10 min)
[8] purified by preparative HPLC (ACN/NH$_4$HCO$_3$ (10 mM), pH 10, 3/97 to 50/50, 10 min)

Compound 31: 8-methoxy-3-[2-methyl-4-(2H-tetrazol-5-yl)phenyl]sulfonyl-4H-triazolo[1,5-a]quinazolin-5-one

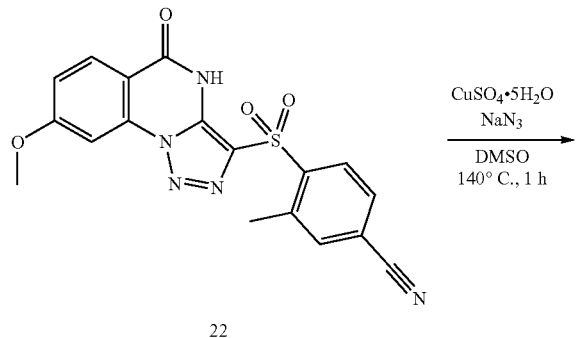

22

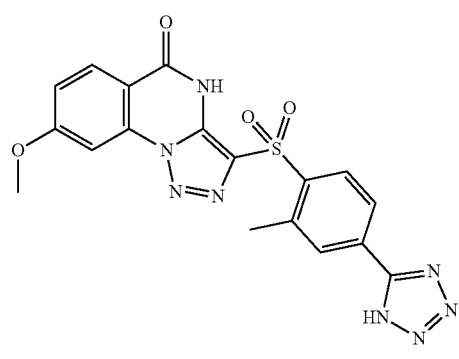

31

Compound 31 can be prepared by [3+2] cycloaddition from compound 22 using sodium azide and copper(II) sulfate analogously as described in Akhlaghinia, B. et al. *J. Braz. Chem. Soc.* 2012, 23 (12), 2197-2203.

A mixture of Compound 22 (0.0910 mmol, 40.0 mg), copper(II) sulfate pentahydrate (Kemika, 0.0018 mmol, 0.5 mg), sodium azide (Sigma-aldrich, 0.091 mmol, 5.9 mg) in DMSO (0.4 mL) was stirred and heated at 140° C. for 1 h. The reaction mixture was poured in HCl (aqueous solution 4 M) and the resulting suspension was extracted with EtOAc (3×30 mL). The aqueous layer was neutralized with NaHCO₃ (saturated aqueous solution) and re-extracted with DCM/i-PrOH (7:2). Combined organic layers were dried over Na₂SO₄, filtered and evaporated under vacuo to yield crude product which was submitted to preparative HPLC purification (high pH, method B) to give the title compound (6.3 mg, 15.5%) as a white solid. ¹H NMR (500 MHz, Pyr-d5) δ ppm: 8.58-8.48 (m, 2H), 8.48-8.42 (m, 2H), 7.83 (d, J=2.2 Hz, 1H), 7.20-7.15 (m, 1H, under solvent), 3.78 (s, 3H), 2.94 (s, 3H). [ES+MS] m/z 439 (MH⁺).

Compound 32: 4-[(8-methoxy-5-oxo-4H-triazolo[1,5-a]quinazolin-3-yl)sulfonyl]-3-methyl-benzamide

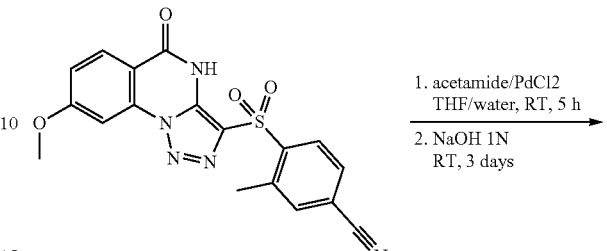

22

32

Compound 32 can be prepared by hydrolysis of compound 22 using acetamide and palladium(II) chloride analogously as described in Maffioli, S. Et al. *Org. Lett.* 2005, 7, (13), 5237-5239.

To a solution of Compound 22 (0.06 mmol, 25.0 mg) in a mixture of water/THF 1:3 (1.3 mL), acetamide (15 mg, 0.25 mmol) and PdCl₂ (2.2 mg, 0.012 mmol) were added and the mixture was stirred at rt for 5 h. A 1N solution of NaOH (0.1 mL) was added and the reaction mixture was stirred at rt for 3 days. Reaction mixture was evaporated in vacuo. Water was added to the residue and pH adjusted to pH 2 to yield a brown precipitate. The precipitate was purified by flash chromatography (eluant DCM:MeOH 10:0.05) to yield the title compound (6.39 mg, 24%) as a beige solid. ¹H NMR (500 MHz, Pyr-d5) δ ppm: 9.07 (br s., 1H), 8.66 (br s., 1H), 8.54-8.50 (m, 1H), 8.45-8.20 (m, 1H), 8.25-8.20 (m, 2H), 7.84 (d, J=2.1 Hz, 1H), 3.80 (s, 3H), 2.92 (s, 3H). [ES+MS] m/z 414 (MH+).

Compound 33: 8-methoxy-3-[2-methyl-4-(5-methyl-4H-1,2,4-triazol-3-yl)phenyl]sulfonyl-4H-triazolo[1,5-a]quinazolin-5-one

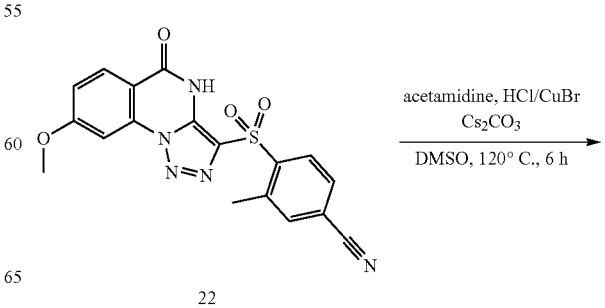

22

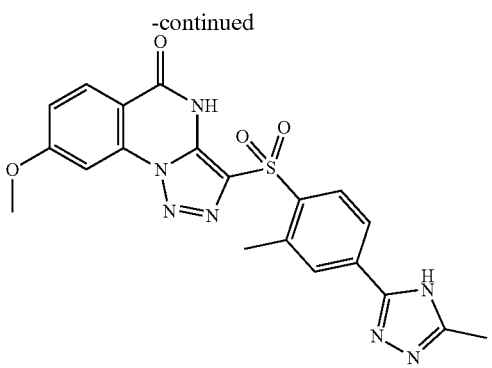

33

Compound 33 can be prepared by copper-catalyzed oxidative cyclization of compound 22 using acetamidine and copper(I) bromide analogously as described in Ueda, S. et al. *J. Am. Chem. Soc.* 2009 131 (42), 15080-15081.

To a mixture of Compound 22 (0.601 mmol, 25.0 mg), copper(I) bromide (0.003 mmol, 0.43 mg), cesium carbonate (0.180 mmol, 58.7 mg) and acetamidine hydrochloride (0.0901 mmol, 8.52 mg) was added DMSO (0.19 mL). The resulting mixture was stirred and heated at 120° C. for 6 h. Reaction mixture was cooled down to rt and diluted with a mixture of EtOAc (5 mL) and NaHCO₃ saturated aqueous solution (10 mL). The resulting suspension was extracted with EtOAc (3×10 mL). Combined organic layers were dried over MgSO₄, filtered and evaporated on vacuo. The residue was purified by flash chromatography (reverse phase, eluant NH₄HCO₃ aqueous solution/MeCN 8:2) to give the title compound (5.5 mg, 19.5%) as a white solid. $^1$H NMR (500 MHz, Pyr-d5) δ ppm: 8.58-8.53 (m, 1H), 8.49-8.39 (m, 3H), 7.83 (d, J=1.95 Hz, 1H), 7.24-7.17 (m, 1H, under solvent), 3.79 (s, 3H), 2.99 (s, 3H), 2.49 (s, 3H). [ES+MS] m/z 452 (MH+).

Compound 35: 3-(2-chloro-4-methyl-phenyl)sulfonyl-4H-triazolo[1,5-a]quinazolin-5-one

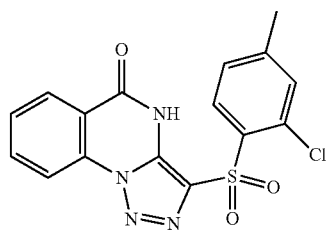

35

A sodium ethoxide 20% solution (0.655 mL, 1.69 mmol) diluted in anhydrous EtOH (2 mL) with 3 Å molecular sieves and stirred under nitrogen atmosphere for 2 h was added to a suspension of Intermediate IV-5 (194.5 mg, 0.85 mmol) in anhydrous EtOH (3 mL) and 4 Å molecular sieves under nitrogen atmosphere. The resulting mixture was stirred at rt for 15 min. Then a solution of intermediate II-6 (100 mg, 0.56 mmol) in dry EtOH was slowly and the resulting yellowish solution was stirred overnight at rt. After filtration and concentration under reduced pressure, the residue was purified by flash chromatography (DCM to 1% MeOH in DCM). The residue was dissolved in MeOH and precipitated with Et2O. The residue was dried to give the title compound (8 mg, 4%) as a white solid. $^1$H NMR (500 MHz, CDCl₃) δ ppm: 9.58 (bs, 1H), 8.46-8.60 (m, 2H), 8.34 (d, J=8.3 Hz, 1H), 7.97 (t, J=8.0 Hz, 1H), 7.72 (t, J=7.8 Hz, 1H), 7.35 (d, J=8.6 Hz, 1H), 7.31 (s, 1H), 2.43 (s, 3H). [ES+MS] m/z 375 (MH+).

Compound 36: 3-(2,4-dimethylphenyl)sulfonyl-8-hydroxy-4H-triazolo[1,5-a]quinazolin-5-one

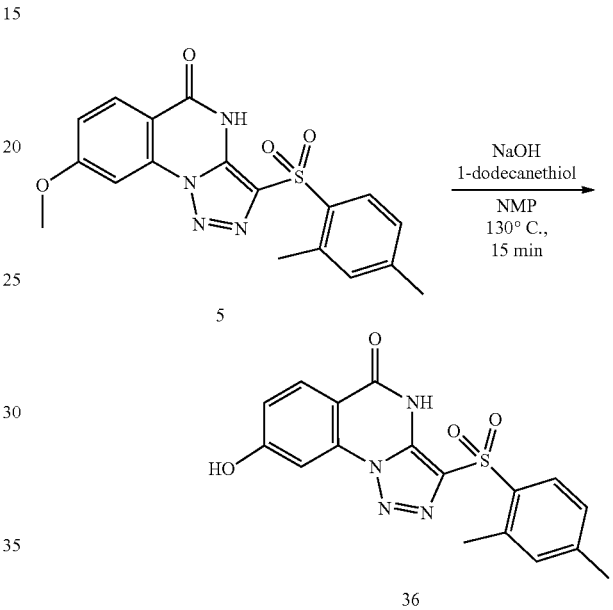

Compound 36 can be prepared demethylation of the methoxy group of compound 5 sodium hydroxide and 1-dodecanethiol analogously as described in Chae, J. *Arch. Pharm. Res.* 2008, 31 (3), 305-309.

Compound 5 (40 mg, 0.102 mmol) and NaOH (12.2 mg, 0.306 mmol) were dissolved in NMP (0.4 mL) and 1-dodecanethiol (37 μL, 0.153 mmol) was added to the solution. The reaction mixture was stirred at 130° C. for 15 min. Ethyl acetate (30 mL) was added to the reaction mixture and washed with 3×30 ml of water. Organic layer was dried over MgSO4, filtered and evaporated to dryness. The residue was purified by flash chromatography (DCM to DCM:MeOH:NH3 (90:9:1.5) 10-100%) to afford the title compound (8 mg, 21%) as a white solid. $^1$H NMR (500 MHz, DMSO-d6) δ ppm: 12.13 (bs, 1H), 11.27 (s, 1H), 8.18 (d, J=8.0 Hz, 1H), 8.04 (d, J=8.5 Hz, 1H), 7.54 (d, J=2.8 Hz, 1H), 7.27 (d, J=8.2 Hz, 1H), 7.07 (dd, J=8.8, 2.3 Hz, 1H), 7.31 (s, 1H), 2.57 (s, 3H), 2.32 (s, 3H). [ES+MS] m/z 371 (MH+).

Compounds 46 and 50 of formula (I) of the present invention were prepared by a method analogous to that described for compound 36, replacing compound 5 as starting material with those indicated in the table below. Modifications in the protocol and purification step are also indicated.

| Cpd | Starting material | Physical data |
|---|---|---|
| 46[1] | Compound 30 | $^1$H NMR (600 MHz, DMSO-d6) δ ppm: 10.50 (s, 1H), 8.15-8.19 (m, 2H), 7.49 (s, 1H), 7.39 (d, J = 8.4 Hz, 1H), 7.28 (d, J = 8.4 |

-continued

| Cpd | Starting material | Physical data |
|---|---|---|
| 50[2] | Compound 47 | Hz, 1H), 7.22 (s, 1H), 2.58 (s, 3H), 2.33 (s, 3H). [ES + MS] 371 m/z (MH+).<br>$^1$H NMR (600 MHz, DMSO-d6) δ ppm: 10.55 (s, 1H), 8.21 (d, J = 7.8 Hz, 1H), 7.72 (dd, J = 7.8, 1.8 Hz, 1H), 7.50-7.56 (m, 2H), 7.29 (d, J = 8.4 Hz, 1H), 7.24 (s, 1H), 2.60 (s, 3H), 2.35 (s, 3H). [ES + MS] m/z 371 (MH+). |

[1]the reaction was stirred at 130° C. for 3 h
[2]the reaction was stirred at 130° C. for 2 h Compound 37: 3-(2-Bromo-4-methyl-phenyl)sulfonyl-4H-triazolo[1,5-a]quinazolin-5-one

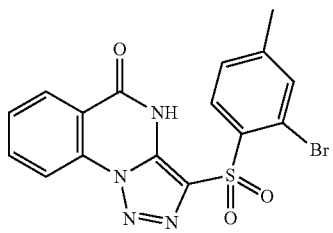

37

A sodium ethoxide solution was prepared carefully in situ by dissolving sodium (13 mg, 0.56 mmol) in anhydrous EtOH (2 mL) cooled in an ice bath, under nitrogen. To this solution, Intermediate IV-10 (61.3 mg, 0.22 mmol) was added and the solution was stirred 15 min. The intermediate II-6 (33 mg, 0.19 mmol) dissolved in dry EtOH (0.5 mL) was added and the resulting yellowish solution was stirred overnight at rt. After concentrating under reduced pressure, the residue was purified by flash chromatography (DCM to DCM:MeOH:NH$_3$ (90:9:1.5) 3-100%), then by preparative HPLC (ACN/HCOOH (1% v/v in water), 30/70 to 80/20, 14 min) to give the title compound (1.1 mg, 1.4%) as an orange solid. $^1$H NMR (500 MHz, CDCl$_3$) δ ppm: 9.60 (bs, 1H), 8.48-8.36 (m, 3H), 7.98 (t, J=7.5 Hz, 1H), 7.73 (t, J=8.2 Hz, 1H), 7.53 (s, 1H), 7.41 (d, J=8.4 Hz, 1H), 7.43 (s, 3H). [ES+MS] m/z 419, 421 (MH$^+$).

Compound 38: 3-(2-Bromo-4-methyl-phenyl)sulfonyl-4H-triazolo[1,5-a]quinazolin-5-one

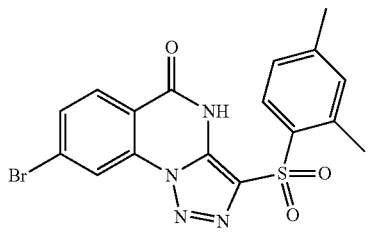

38

To a solution of Intermediate IV-1 (20.4 mg, 0.1 mmol) in dry EtOH (0.5 mL), a 20% solution of NaOEt in EtOH (75.5 μL, 0.2 mmol) was added and the resulting solution was stirred at rt for 20 min. Then a solution of intermediate II-7 (25 mg, 0.1 mmol) in dry EtOH (0.5 mL) was added and the resulting yellowish solution was stirred at rt for 1 h. Ethanol was evaporated, the residue dissolved in water (3 ml) and pH adjusted to ~2 followed by extraction with EtOAc (~100 ml). Organic layer was dried over Na$_2$SO$_4$ and evaporated to dryness. The residue was purified by flash chromatography (DCM to DCM:MeOH:NH$_3$ (90:9:1.5) 0-100%) to afford the title compound (13 mg, 31%) as a white solid. $^1$H NMR (400 MHz, CDCl$_3$) δ ppm: 9.51 (br.s, 1H), 8.54 (d, J=1.6 Hz, 1H), 8.22 (d, J=8.8 Hz, 1H), 8.06 (d, J=8.4 Hz, 1H), 7.79 (dd, J=8.4, 1.6 Hz, 1H), 7.19 (d, J=8 Hz, 1H), 7.12 (s, 1H), 2.68 (s, 3H), 2.36 (s, 3H). [ES+MS] m/z 433, 435 (MH$^+$).

Compound 39: 3-(2,4-dimethylphenyl)sulfonyl-6-methoxy-4H-triazolo[1,5-a]quinazolin-5-one

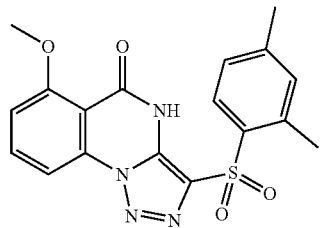

39

To a solution of Intermediate IV-1 (150 mg, 0.7 mmol) in dry EtOH (2.5 mL), a 20% solution of NaOEt in EtOH (543 μL, 1.4 mmol) was added and the resulting solution was stirred at rt for 20 min. Then a solution of intermediate II-8 (174.6 mg, 0.84 mmol) in dry EtOH (2 mL) was added and the resulting yellowish solution was stirred at rt overnight. Ethanol was evaporated, the residue dissolved in water (6 mL) and pH adjusted to ~2 followed by extraction with EtOAc (~100 ml). Organic layer was dried over Na$_2$SO$_4$ and evaporated to dryness. The residue was purified by flash chromatography (DCM to DCM:MeOH:NH$_4$OH (90:9:1.5) 0-100%) to afford the title compound (60 mg, 22%) as a white solid. $^1$H NMR (400 MHz, CDCl$_3$) δ ppm: 9.25 (br.s, 1H), 8.06 (d, J=8.4 Hz, 1H), 7.96 (d, J=8.4 Hz, 1H), 7.81 (t, J=8.4 Hz, 1H), 7.18 (d, J=8 Hz, 1H), 7.09-7.12 (m, 2H), 4.05 (s, 3H), 2.68 (s, 3H), 2.35 (s, 3H). [ES+MS] m/z 385 (MH$^+$).

Compounds 42, 44, 47, 51, 52, 57, 59 and 60 of formula (I) of the present invention were prepared by a method analogous to that described for compound 39, replacing Intermediate IV-1 and II-8 with the corresponding Intermediates IV and II as indicated in the table below. Modifications in the protocol and purification step are also indicated.

| Cpd | Intermediate IV | Intermediate II | Physical data |
|---|---|---|---|
| 42 | IV-1<br>0.94 mmol | II-9<br>0.84 mmol | $^1$H NMR (300 MHz, CDCl$_3$) δ ppm: 9.50 (br.s, 1H), 8.75 (s, 1H), 7.98-8.08 (m, 3H), 7.19 (d, J = 8.1 Hz, 1H), 7.11 (s, 1H), 2.67 (s, 3H), 2.36 (s, 3H). [ES + MS] m/z 481 (MH$^+$). |
| 44 | IV-14<br>0.52 mmol | II-6<br>0.48 mmol | $^1$H NMR (400 MHz, CDCl$_3$) δ ppm: 9.55 (bs, 1H), 8.43-8.37 (m, 2H), 8.24 (s, 1H), 7.97-7.91 (m, 1H), 7.72-7.65 (m, 1H), 7.44 (s, 1H), 2.33 (s, 3H), 2.29 (s 3H). [ES + MS] m/z 433 (MH$^+$). |
| 47 | IV-1<br>1.40 mmol | II-10<br>1.68 mmol | $^1$H NMR (300 MHz, CDCl$_3$) δ ppm: 9.70 (bs, 1H), 8.12-7.98 (m, 2H), 7.65-7.28 (m, 3H), 7.20-7.18 (m, 1H), 4.09 (s, 3H), 2.70 (s, 3H), 2.36 (s 3H). [ES + MS] m/z 385 (MH$^+$). |
| 51 | IV-21<br>0.24 mmol | II-6<br>0.22 mmol | $^1$H NMR (600 MHz, CDCl$_3$) δ ppm: 9.55 (bs, 1H), 8.47-8.42 (m, 2H), 8.00-7.96 (m, 1H), 7.75-7.71 (m, 1H), 7.18 (s, 1H), 7.14 (s, 1H), 2.96 (s, 3H), 2.36 (s, 3H). [ES + MS] m/z 389 (MH$^+$). |
| 52 | IV-22<br>0.55 mmol | II-6<br>0.46 mmol | $^1$H NMR (400 MHz, CDCl$_3$) δ ppm: 9.53 (bs, 1H), 8.42-8.36 (m, 2H), 7.97-7.90 (m, 1H), 7.71-7.65 (m, 1H), 7.38 (s, 1H), 7.14 (s, 1H), 2.94 (s, 3H), 2.31 (s, 3H). [ES + MS] m/z 434 (MH$^+$). |
| 57 | IV-1<br>0.23 mmol | II-11<br>0.23 mmol | $^1$H NMR (300 MHz, DMSO-d6) δ ppm: 12.22 (br.s, 1H), 11.16 (s, 1H), 8.19, (d, J = 8.1 Hz), 7.61 (s, 1H), 7.53 (s, 1H), 7.27 (d, J = 8.7 Hz, 1H), 7.21 (s, 1H), 3.91 (s, 3H), 2.57 (s, 3H), 2.32 (s, 3H). [ES + MS] m/z 401 (MH$^+$). |
| 59 | IV-1<br>0.37 mmol | II-14<br>0.37 mmol | $^1$H NMR (300 MHz, DMSO-d6) δ ppm: 12.27 (br.s, 1H), 8.19, (d, J = 8.1 Hz), 8.11 (d, J = 9.0 Hz, 1H), 7.71 (d, J = 2.4 Hz, 1H), 7.27 (dd, J = 9.0, 2.4 Hz, 2H), 7.22 (s, 1H), 4.33-4.37 (m, 2H), 3.78-3.82 (m, 2H), 3.57-3.61, (m, 2H), 3.45-3.54 (m, 4H), 3.36-3.40 (m, 2H), 3.20 (s, 3H), 2.58 (s, 3H), 2.33 (s, 3H). [ES + MS] m/z 517 (MH$^+$). |
| 60 | IV-1<br>0.28 mmol | II-15<br>0.28 mmol | $^1$H NMR (300 MHz, DMSO-d6) δ ppm: 12.29 (br.s, 1H), 8.19, (d, J = 8.1 Hz), 8.11 (d, J = 9.0 Hz, 1H), 7.73 (d, J = 2.4 Hz, 1H), 7.28 (dd, J = 9.0, 2.4 Hz, 2H), 7.22 (s, 1H), 4.44-4.49 (m, 1H), 4.29-4.35 (m, 1H), 4.18-4.25, (m, 1H), 4.11 (dd, J = 8.4, 6.6 Hz, 1H), 3.81 (dd, J = 8.4, 6.6, 1H), 2.58 (s, 3H), 2.33 (s, 3H), 1.35 (s, 3H), 1.30 (s, 3H). [ES + MS] m/z 517 (MH$^+$). |

Compound 40: 3-(2,4-dimethylphenyl)sulfonyl-6-methoxy-4H-triazolo[1,5-a]quinazolin-5-one

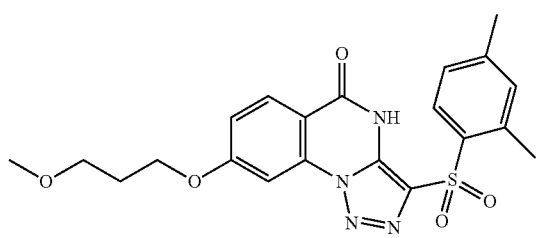

To a solution of Compound 36 (50 mg, 0.1 mmol) in DMF (1 mL) 1-bromo-3-methoxypropane (12 μL, 0.1 mmol) and potassium carbonate (43.7 mg, 0.3 mmol) were added and the resulting solution was stirred at rt overnight. The starting material was not completely consumed, thus 1-bromo-3-methoxypropane (12 μL, 0.1 mmol) and potassium carbonate (43.7 mg, 0.3 mmol) were added and the resulting solution was stirred at rt overnight. The reaction mixture was diluted in EtOAc (100 mL) and washed with water (3×00 mL). Aqueous layer was extracted with EtOAc (3×50 mL). Organic layers were gathered, dried over Na$_2$SO$_4$ and evaporated to dryness. The residue was purified by flash chromatography (DCM to DCM:MeOH:NH$_4$OH (90:9:1.5) 0-100%) to afford the title compound (20 mg, 40%) as a white solid. $^1$H NMR (400 MHz, CDCl$_3$) δ ppm: 9.59 (bs, 1H), 8.38 (d, J=8.88 Hz, 1H), 8.21 (d, J=7.99 Hz, 1H), 7.89 (s, 1H), 7.35-7.21 (m, 3H), 4.38 (t, J=6.22 Hz, 2H), 3.69 (t, J=5.86 Hz, 2H), 3.48 (s, 3H), 2.81 (s, 3H), 2.49 (s, 3H), 2.31-2.18 (m, 2H). [ES+MS] m/z 443 (MH$^+$).

Compounds 41, 43, 54 and 55 of formula (I) of the present invention were prepared by a method analogous to that described for compound 40, replacing 1-bromo-3-methoxypropane with those indicated as starting material in the table below. Modifications in the protocol and purification step are also indicated.

| Cpd | Starting material | Physical data |
|---|---|---|
| 41 | 4-bromobutanenitrile<br>0.10 mmol | $^1$H NMR (300 MHz, CDCl$_3$) δ ppm: 9.40 (bs, 1H), 8.28 (d, J = 8.82 Hz, 1H), 8.06 (d, J = 8.02 Hz, 1H), 7.75 (d, J = 2.33 Hz, 1H), 7.21-7.13 (m, 2H), 7.12-7.09 (m, 1H), 4.28 (t, J = 5.55 Hz, |

-continued

| Cpd | Starting material | Physical data |
|---|---|---|
| | | 2H), 2.67 (s, 3H), 2.63 (t, J = 7.09 Hz, 2H), 2.36 (s, 3H), 2.29-2.18 (m, 2H). [ES + MS] m/z 438 (MH+). |
| 43 | 1-bromo-2-methoxy-ethane 0.16 mmol | $^1$H NMR (300 MHz, CDCl$_3$) δ ppm: 9.38 (bs, 1H), 8.25 (d, J = 9.10 Hz, 1H), 8.06 (d, J = 8.19 Hz, 1H), 7.78 (d, J = 2.27 Hz, 1H), 7.23-7.14 (m, 2H), 7.11 (bs, 1H), 4.33-4.26 (m, 2H), 3.83-3.77 (m, 2H), 3.44 (s, 3H), 2.67 (s, 3H), 2.35 (s, 3H). [ES + MS] m/z 429 (MH+). |
| 54 | 3-bromoprop-1-yne 0.083 mmol | $^1$H NMR (300 MHz, CDCl$_3$) δ ppm: 9.38 (br.s, 1H), 8.29 (d, J = 9.0 Hz, 1H), 8.06 (d, J = 8.1 Hz, 1H), 7.87 (d, J = 2.4 Hz, 1H), 7.21 (d, J = 2.7 Hz, 1H), 7.18 (d, J = 8.4 Hz, 1H), 7.11 (s, 1H), 4.88 (d, J = 2.4 Hz, 2H), 2.68 (s, 3H), 2.59 (t, J = 2.4 Hz, 1H), 2.36 (s, 3H). |
| 55 | methyl 4-bromobutanoate 0.29 mmol | $^1$H NMR (300 MHz, CDCl$_3$) δ ppm: 9.36 (br.s, 1H), 8.25 (d, J = 9.0 Hz, 1H), 8.07 (d, J = 8.1 Hz, 1H), 7.73 (d, J = 2.4 Hz, 1H), 7.18 (d, J = 7.5 Hz, 1H), 7.11-7.16 (m, 2H), 4.20 (t, J = 6.0 Hz, 2H), 3.69 (s, 3H), 2.67 (s, 3H), 2.55 (t, J = 7.2 Hz, 2H), 2.36 (s, 3H), 2.14-2.24 (m, 2H). |

Compound 45: 8-(azetidin-1-yl)-3-(2,4-dimethylphenyl)sulfonyl-4H-triazolo[1,5-a]quinazolin-5-one

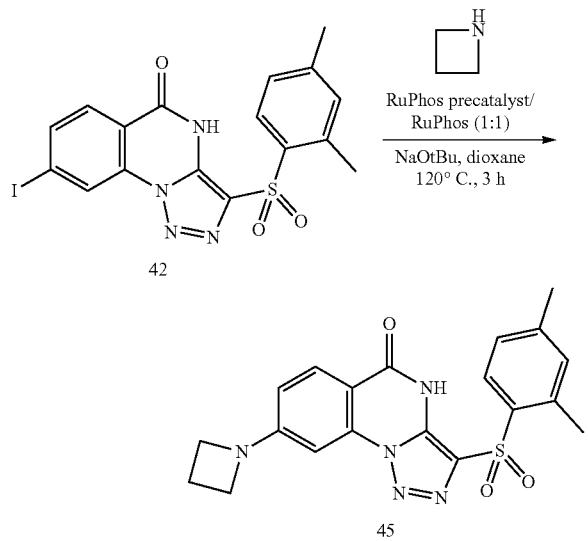

To a solution of compound 42 (40 mg, 0.08 mmol) in dioxane (1.5 mL), were added azetidine (8.25 μL, 0.12 mmol), sodium tert-butoxide (11.8 mg, 0.12 mmol), chloro (2-dicyclohexylphosphino-2',6'-di-i-propoxy-1,1'-biphenyl) [2-(2-aminoethylphenyl)]palladium (II), methyl-t-butyl ether adduct (RuPhos precatalyst, 6.6 mg, 0.008 mmol), and 2-dicyclohexylphosphino-2',6'-diisopropoxy-1,1'-biphenyl (RuPhos, 3.8 mg, 0.008 mmol). The reaction mixture was heated at 120° C. for 3 h. The solvent was evaporated, and the residue was purified by flash chromatography (DCM to DCM:MeOH:NH$_4$OH (90:9:1.5) 0-100%) to afford the title compound (20 mg, 59%) as a white powder. $^1$H NMR (300 MHz, CDCl$_3$) δ ppm: 9.18 (br.s, 1H), 8.07 (d, J=8.7 Hz, 2H), 7.17 (d, J=8.1 Hz, 1H), 7.09 (s, 1H), 7.00 (d, J=2.4 Hz, 1H), 6.50 (dd, J=8.7, 2.4 Hz, 1H), 4.12 (t, J=7.5 Hz, 4H), 2.66 (s, 3H), 2.45-2.55 (m, 2H), 2.35 (s, 3H). [ES+MS] m/z 410 (MH+).

Compounds 48 and 49 of formula (I) of the present invention were prepared by a method analogous to that described for compound 45, replacing azetidine with those indicated as starting material in the table below. Modifications in the protocol and purification step are also indicated.

| Cpd | Starting material | Physical data |
|---|---|---|
| 48 | 2-morpholinoethanamine 0.15 mmol | $^1$H NMR (500 MHz, DMSO-d6) δ ppm: 8.16 (d, J = 8.5 Hz, 1H), 7.85 (d, J = 8.5 Hz, 1H) 7.23-7.28 (m, 2H), 7.21 (s, 1H), 7.15 (br.s, 1H), 6.89 (dd, J = 9.0, 2.0 Hz, 1H), 3.59 (t, J = 4.5 Hz, 4H), 2.56 (s, 3H), 2.51-2.55 (m, 4H), 2.44 (br.s, 4H), 2.33 (s, 3H). [ES + MS] m/z 483 (MH+). |
| 49 | tetrahydropyran-4-amine 0.15 mmol | $^1$H NMR (500 MHz, DMSO-d6) δ ppm: 8.09 (d, J = 8.5 Hz, 1H), 7.82 (d, J = 9.0 Hz, 1H) 7.24 (d, J = 8.0 Hz, 1H), 7.21 (s, 1H), 7.17 (s, 1H), 6.98 (br.s, 1H), 6.85 (d, J = 9.0 Hz, 1H), 3.86-3.90 (m, 2H), 3.65-3.69 (m, 1H), 3.47 (t, J = 11.5 Hz, 2H), 2.53 (s, 3H), 2.32 (s, 3H), 1.90-1.93 (m, 2H), 1.40-1.55 (m, 2H). [ES + MS] m/z 454 (MH+). |

Compound 53: 3-(2,4-dimethylphenyl)sulfonyl-8-(2-hydroxyethoxy)-4H-triazolo[1,5-a]quinazolin-5-one

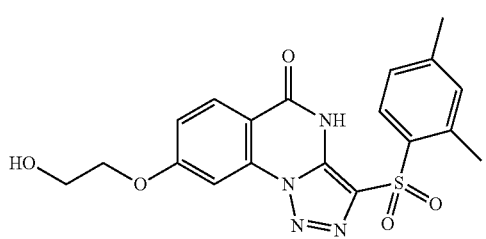

53

To a solution of Compound 36 (150 mg, 0.4 mmol) in DMF (1 mL) 2-bromoethyl acetate (100 mg, 0.6 mmol) and potassium carbonate (222 mg, 1.6 mmol) were added and the resulting solution was stirred at rt overnight. The starting material was not completely consumed, thus 2-bromoethyl acetate (33.5 mg, 0.2 mmol) and potassium carbonate (55 mg, 0.4 mmol) were added and the resulting solution was stirred at rt overnight. The reaction mixture was diluted in EtOAc (150 mL) and washed with water (2×10 mL). Organic layer was dried over $Na_2SO_4$ and evaporated to dryness. The residue was purified by flash chromatography (DCM to DCM:MeOH:$NH_4OH$ (90:9:1.5) 0-100%). The residue was washed with $Et_2O$ and dried under vacuo. Then, it was suspended in water, acidified to pH~2, extracted with DCM, dried over sodium sulfate, evaporated to dryness and washed with diethyl ether to afford 2-[[3-(2,4-dimethylphenyl)sulfonyl-5-oxo-4H-triazolo[1,5-a]quinazolin-8-yl]oxy]ethyl acetate (86 mg, 46%). [ES+MS] m/z 457 (MH+).

To a solution of 2-[[3-(2,4-dimethylphenyl)sulfonyl-5-oxo-4H-triazolo[1,5-a]quinazolin-8-yl]oxy]ethyl acetate (20 mg, 0.043 mmol) in MeOH:water (2 mL, 1:1) was added lithium hydroxide (10.3 mg, 0.43 mmol). The reaction mixture was stirred at r.t. for 2 h. MeOH was evaporated in vacuo and aqueous layer was extracted with EtOAc (2×30 mL). Organic layer was dried over $Na_2SO_4$ and evaporated to dryness. The residue was purified by flash chromatography (DCM to DCM:MeOH:$NH_4OH$ (90:9:1.5) 0-100%) to afford the title compound (17 mg, 92%) as a white powder. $^1$H NMR (300 MHz, DMSO-d6) δ ppm: 12.27 (bs, 1H), 8.14 (d, J=8.21 Hz, 1H), 8.08 (d, J=8.86 Hz, 1H), 7.66 (d, J=2.38 Hz, 1H), 7.29-7.15 (m, 3H), 4.97 (t, J=5.50 Hz, 1H), 4.21 (t, J=4.35 Hz, 2H), 3.81-3.71 (m, 2H), 2.55 (s, 3H), 2.32 (s, 3H). [ES+MS] m/z 415 (MH+).

Compound 56: 4-[[3-(2,4-dimethylphenyl)sulfonyl-5-oxo-4H-triazolo[1,5-a]quinazol-in-8-yl]oxy]butanamide

56

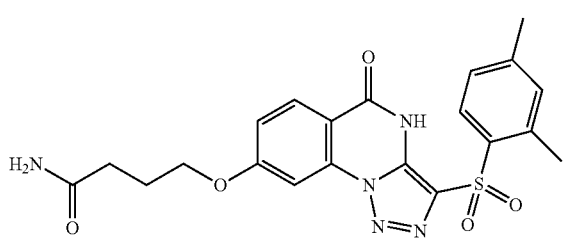 [SMILES: Cc1ccc(S(=O)(=O)c2nnn3c2[nH]c(=O)c2ccc(OCCCC(N)=O)cc23)c(C)c1]

To a solution of Compound 55 (150 mg, 0.3 mmol) in MeOH (20 mL), LiOH (27 mg, 0.64 mmol) was added and the resulting solution was stirred at rt overnight. The solvent was evaporated and the residue was dissolved in water (2.5 mL) and acidified with a solution of HCl 2N. The precipitate was filtered and dried in vacuo to afford 4-[[3-(2,4-dimethylphenyl)sulfonyl-5-oxo-4H-triazolo[1,5-a]quinazolin-8-yl]oxy]butanoic acid (40 mg, 28%). $^1$H NMR (300 MHz, DMSO-d6) δ ppm: 12.26 (br.s, 1H), 12.18 (br.s, 1H), 8.18 (d, J=7.8 Hz, 1H), 8.10 (d, J=8.1 Hz, 1H), 7.68 (d, J=2.4 Hz, 1H), 7.21-7.29 (m, 3H), 4.23 (t, J=6.0 Hz, 2H), 2.72 (s, 3H), 2.41 (t, J=7.2 Hz, 2H), 2.33 (s, 3H), 1.95-2.05 (m, 2H).

A solution of methyl 4-[[3-(2,4-dimethylphenyl)sulfonyl-5-oxo-4H-triazolo[1,5-a]quinazolin-8-yl]oxy]butanoic acid (20 mg, 0.044 mmol), HOBt (10.1 mg, 0.066 mmol), DIPEA (30.5 μL, 0.175 mmol), and HATU (25 mg, 0.066 mmol) in DMF (1 mL) was stirred at r.t. for 5 min. Then ammonium chloride (47 mg, 0.088 mmol) was added and the mixture stirred at rt overnight. The reaction mixture was diluted with EtOAc (100 ml), washed with sat. NH4Cl solution and brine, dried over Na2SO4, and evaporated to dryness. The residue was purified by flash chromatography (DCM to DCM:MeOH:$NH_4OH$ (90:9:1.5) 0-100%) to afford the title compound (12 mg, 60%) as a white powder. $^1$H NMR (300 MHz, DMSO-d6) δ ppm: 8.15 (d, J=8.1 Hz, 1H), 8.09 (d, J=8.7 Hz, 1H), 7.65 (d, J=2.4 Hz, 1H), 7.20-7.34 (m, 4H), 6.79 (s, 1H), 4.19 (t, J=6.3 Hz, 2H), 2.56 (s, 3H), 2.32 (s, 3H), 2.25 (t, J=7.4 Hz, 2H), 1.94-2.03 (m, 2H). [ES+MS] m/z 456 (MH+).

Compound 61: 3-(2,4-dimethylphenyl)sulfonyl-7-hydroxy-8-(2-hydroxyethoxy)-4H-triazolo[1,5-a]quinazolin-5-one

61

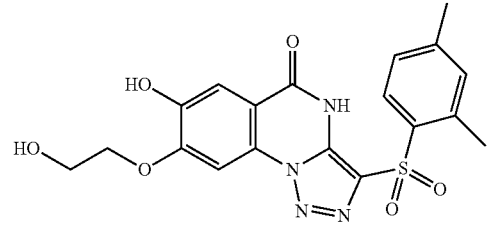

To a solution of Intermediate IV-1 (100 mg, 0.47 mmol) in dry EtOH (1 mL), a 20% solution of NaOEt in EtOH (362 μL, 0.94 mmol) was added and the resulting solution was stirred at rt for 20 min. Then a solution of intermediate II-16 (199 mg, 0.47 mmol) in dry EtOH (2 mL) was added and the resulting yellowish solution was stirred at rt overnight. Ethanol was evaporated, the residue dissolved in water (6 mL) and pH adjusted to ~2 followed by extraction with EtOAc (~250 ml). Organic layer was dried over $Na_2SO_4$ and evaporated to dryness. The residue was purified by flash chromatography (DCM to DCM:MeOH:$NH_4OH$ (90:9:1.5) 0-100%) to afford 3-(2,4-dimethylphenyl)sulfonyl-8-(2-hydroxyethoxy)-7-methoxy-4H-triazolo[1,5-a]quinazolin-5-one (75 mg, 36%) as a white solid. $^1$H NMR (300 MHz, DMSO-d6) δ ppm: 12.38 (br.s, 1H), 8.20, (d, J=8.4 Hz), 7.75 (s, 1H), 7.55 (s, 1H), 7.27 (d, J=8.7 Hz, 1H), 7.21 (s, 1H), 4.98 (br.s, 1H), 4.22-4.26 (m, 2H), 3.92 (s, 3H), 3.78-3.80 (m, 2H), 2.57 (s, 3H), 2.33 (s, 3H). [ES+MS] m/z 445 (MH+).

3-(2,4-dimethylphenyl)sulfonyl-8-(2-hydroxyethoxy)-7-methoxy-4H-triazolo[1,5-a]quinazolin-5-one (50 mg, 0.11 mmol) and NaOH (13.5 mg, 0.34 mmol) were dissolved in NMP (1.5 mL) and 1-dodecanethiol (40.4 μL, 0.17 mmol)

was added to the solution. The reaction mixture was stirred at 130° C. for 3 h. the reaction mixture was cooled to RT. Ethyl acetate (300 mL) was added to the reaction mixture and washed with 3×50 ml of water. Organic layer was dried over MgSO4, filtered and evaporated to dryness. The residue was purified by flash chromatography (DCM to DCM: MeOH:NH3 (90:9:1.5) 10-100%) to afford the title compound (7 mg, 14%) as a white solid. $^1$H NMR (500 MHz, DMSO-d6) δ ppm: 12.22 (br.s, 1H), 10.08 (s, 1H), 8.19, (d, J=8.5 Hz), 7.72 (s, 1H), 7.49 (s, 1H), 7.28 (d, J=9.0 Hz, 1H), 7.22 (s, 1H), 4.96 (t, J=6 Hz, 1H), 4.24 (t, J=4.5 Hz, 2H), 3.78-3.81 (m, 2H), 2.57 (s, 3H), 2.33 (s, 3H). [ES+MS] m/z 431 (MH+).

$^1$H,$^{15}$N HSQC NMR Spectroscopy:

2D $^1$H,$^{15}$N HSQC spectra (96 scans) were typically acquired on either 100 μM or 200 μM $^{15}$N-AgrAc samples, with 3072 and 180 points in the $^1$H and $^{15}$N dimensions respectively. All the spectra were acquired in the presence of 3% DMSO-d6.

For each sample tested, 400 μL of 15N-AgrAc @ 100 M in [50 mM NaPi pH6.3; 100 mM NaCl 3 mM THP; 5% D20; + TMSP] were mixed with 13 μL of the stock solution of the compound (dissolved in DMSO-d6). 13 μL of DMSO-d6 were added for the control experiment. In each NMR sample the final DMSO-d6 concentration was 3%. After a centrifugation step (few minutes @~7000xg.) the supernatant was transferred into a shigemi NMR tube. The samples were analysed on the 600 MHz spectrometer with the sample changer. For each tube a 1D $^1$H spectrum and a 2D $^1$H,$^{15}$N-HSQC were acquired.

Figure 2:
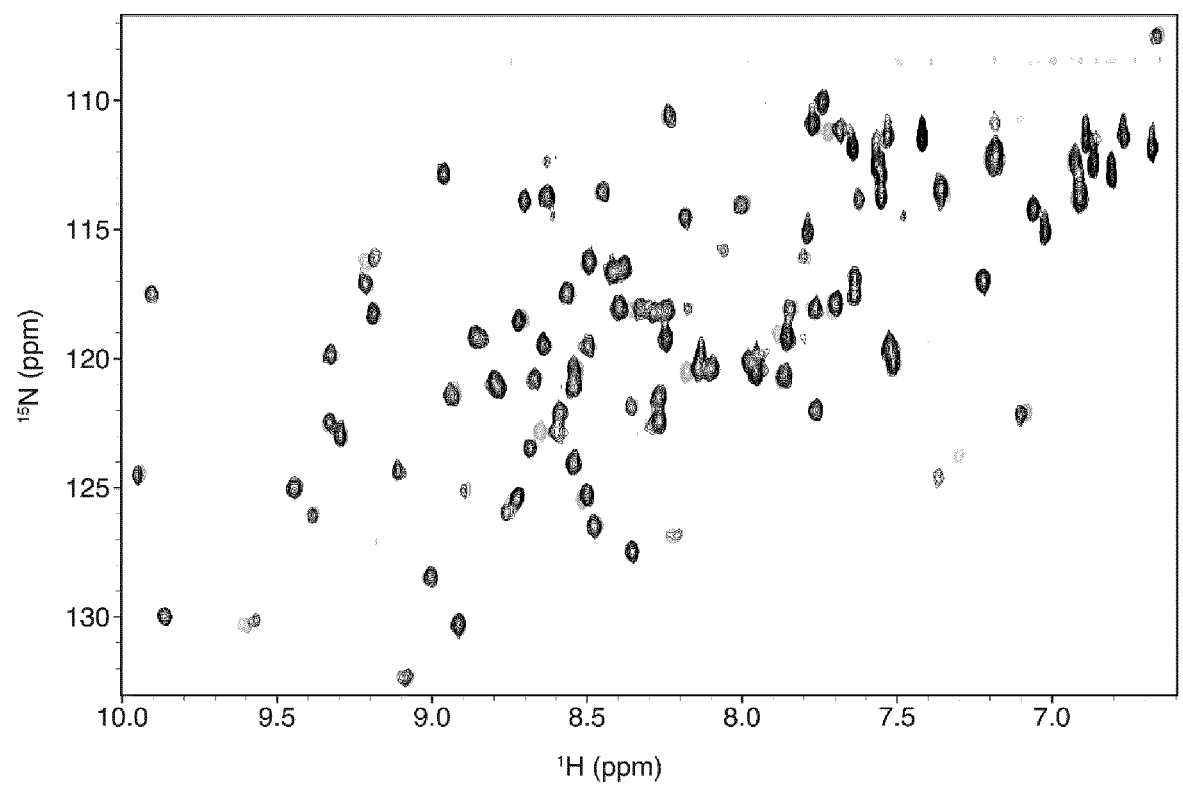
FIG. 2 shows chemical shift perturbations observed upon binding of compound to AgrAc. $^1$H $^{15}$N-HSQC spectra of $^{15}$N-AgrAc (100 µM) was recorded in the absence (grey) or in the presence of 1.6 mM of compound 34 of the present invention (black). Addition of compound 34 resulted in the perturbation of chemical shifts corresponding to the backbone amides for several residues at the C-terminal end of the protein. These perturbations clearly show an interaction between the compound 34 and AgrAc.

FIG. 2 describes chemical shift perturbations observed upon binding of compound 34 to AgrA$_C$ showing that these inhibitors indeed are binding the C-terminal domain of AgrA.

MIC:

Minimal inhibitory concentrations (MIC) were determined by broth microdilution method in cation-adjusted Mueller-Hinton (CA-MHB) broth according to the CLSI guideline. From an overnight culture plate, cells were resuspended in 0.9% (w/v) saline solution and bacterial inoculum was prepared in CA-MHB with 5×10^5 CFU/ml. Compounds were two-fold serially diluted in CA-MHB and 10 μL of this 10× concentrated samples were added into the 96-well plate. 90 μL of bacterial suspension was finally added to the compounds. Plates were covered and incubated without shaking at 35° C. for 18 hours. Every experiment contained an antibiotic as quality control. MIC was determined visually as the lowest concentration of a compound that prevents visible growth of the bacteria and the plates were scanned for documentation.

Lethal Dose 50% ($LD_{50}$):

Human hepatocellular carcinoma cells (HepG2) engineered for stable expression of human secreted embryonic alkaline phosphatase (hSEAP) were used for LD50 determination. Cells were cultured in EMEM (EBSS)+2 mM Glutamine+1% Non-Essential Amino Acids (NEAA)+10% Fetal Bovine Serum (FBS)+1% Penicillin/Streptomycin (PS) (Sigma) in 10 cm Petri dishes at 37° C. with 5% $CO_2$ in a humidified atmosphere. For LD50 determination, 20.000 cells per well were seeded into a clear 96-well tissue culture plate and incubated o/n at 37° C. with 5% $CO_2$ for cell attachment. The next morning, the medium was replaced by fresh culture medium containing two-fold serially diluted compounds ranging from 0.8-100 μM or DMSO (solvent control). Plates were incubated for 48 h at 37° C. with 5% $CO_2$ and humidification. For SLAP quantification, the culture supernatants were collected and heat-inactivated for 15 minutes at 65° C., afterwards 10 μL heat-inactivated supernatant, 70 μL MilliQ and 100 μL 2×SLAP buffer (20 mM Homoarginine, 1 m $MgCl_2$, 21 Diethanolamin, adjusted to pH 9.8 with HCl) were mixed in a fresh 96 well flat bottom plate (Greiner). The enzymatic activity was measured for 25 min by determining the Absorbance at 405 nm using a Microplate reader and the specific SLAP activity was calculated within the linear range of absorbance using Lambert-Beer's law. Compounds with $LD_{50}$>100 μM are considered non-cytotoxic.

TABLE 2

Biological data for MIC and $LD_{50}$ for very preferred compounds of formula (I).

| Compound | MIC on MRSA [μM] | LD50 HepG2 [μM] |
| --- | --- | --- |
| Savirin | >=100 | >=100 |
| 1 | >=100 | >=100 |
| 2 | >=100 | >=100 |
| 3 | >=100 | >=100 |
| 4 | >=100 | 50 |
| 5 | >=100 | >=100 |
| 6 | >=100 | >=100 |
| 7 | >=100 | >=100 |
| 8 | >=100 | >=100 |
| 9 | 25 | 25 |
| 10 | >=100 | >=100 |
| 11 | >=100 | >=100 |
| 12 | >=100 | >=100 |
| 13 | >=100 | >=100 |
| 14 | >=100 | >=100 |
| 15 | >=100 | >=100 |
| 16 | >=100 | >=100 |
| 17 | >=100 | >=100 |
| 18 | >=100 | >=100 |
| 19 | >=100 | >=100 |
| 20 | >=100 | >=100 |
| 21 | >=100 | >=100 |
| 22 | >=100 | >=100 |
| 23 | >=100 | >=100 |
| 24 | >=100 | >=100 |
| 25 | >=100 | >=100 |
| 26 | >=100 | >=100 |
| 27 | >=100 | >=100 |
| 28 | >=100 | >=100 |
| 29 | >=100 | >=100 |
| 30 | >=100 | >=100 |
| 31 | >=100 | >=100 |
| 32 | >=100 | >=100 |
| 33 | >=100 | >=100 |
| 34 | >=100 | >=100 |
| 35 | >=100 | >=100 |
| 36 | >=100 | >=100 |
| 37 | >=100 | >=100 |
| 38 | 50 | >=100 |
| 39 | >=100 | >=100 |
| 40 | >=100 | >=100 |
| 41 | >=100 | >=100 |
| 42 | >=100 | >=100 |
| 43 | >=100 | >=100 |
| 44 | >=100 | >=100 |
| 45 | >=100 | >=100 |
| 46 | >=100 | >=100 |
| 47 | >=100 | >=100 |
| 48 | 50 | 50 |
| 49 | >=100 | 50 |
| 50 | >=100 | >=100 |
| 51 | >=100 | >=100 |
| 52 | >=100 | >=100 |
| 53 | >=100 | >=100 |
| 54 | >=100 | >=100 |
| 55 | >=100 | >=100 |
| 56 | >=100 | >=100 |
| 57 | >=100 | >=100 |
| 58 | >=100 | >=100 |
| 59 | >=100 | >=100 |
| 60 | >=100 | >=100 |
| 61 | >=100 | >=100 |

Hemolysis Assays:

The hemolysis assay is a phenotypic assay to measure lysis of red blood cells (RBC) which is mediated by exotoxins collected from the supernatant (SN) of *Staphylococ-* cus aureus cultures. The assay was developed to evaluate the potency of compounds in reducing exotoxin expression by inhibition of AgrA.

Two hemolysis assays were conducted. In a first hemolysis assay (Hemolysis Assay I) overnight cultures of MRSA (USA300 isolate) were inoculated to an $OD_{600}$ of 0.1 into tubes containing 1 mL of fresh TSB and either 10 µM compound (primary test, fix concentration) or 30/10/3.3/1.1 and 0.37 µM compounds ($IC_{50}$ determination). Cultures were grown for 8 h at 220 rpm at 37° C., after which, cell densities were measured, adjusted to $OD_{600}$ of 6.0 by diluting with fresh media. Cultures were passed through a 0.2-µm filter and used immediately for the hemolysis assay. The filtrate with the toxins was serially diluted in PBS and dilutions 1:2 to 1:256 were tested. The hemolytic activity was assessed using a modification of the protocol described by Sully et at. In brief, defibrinated rabbit blood (10% washed pooled cells, Rockland) were diluted 1:5 in PBS to a cell concentration of 2%. The diluted filtrate including the toxins were mixed 1:1 with the red blood cells (100 uL each). Blood cells treated with PBS or 0.4% TX-100 were used to determine baselines for no lysis and complete lysis, respectively. Reactions were mixed by gentle pipetting and incubated at 37° C. for 1 h. After incubation, the plates were centrifuged at 1000×g for 5 min at rt. 30-µL aliquots of the supernatants were transferred to a 96-well U-bottom plate and the absorbance at 405 nm was measured. Values of the PBS control were subtracted from the experimental data, and the difference was normalized to the absorbance values from the TX-100 lysis control. These values were plotted versus the concentration of extract to generate an activity curve, which was fitted to a four-parameter logistic model ($EC_{50}$) using Graph-Pad. The compounds were further analysed in the presence of 30/10/3.3/1.1/0.37 µM compound. For $IC_{50}$ determination, the absorbance values at $OD_{600}$ of 0.75 of all 5 concentrations were used (Table 3, right column). The lower the value, the more active the compound. Compounds 12, 18 and 26 are the most potent compounds with an $IC_{50}$ around 1 µM.

In a second hemolysis assay (Hemolysis Assay II), Compounds were serially diluted from 32 µg/ml to 0.0156 µg/ml, using 2-fold dilutions in Cation-adjusted Mueller Hinton Broth (CA-MHB). DMSO (0.9%, N=6) and BV2985 (16 µg/ml, n=6) were used to determine baselines for no inhibition and complete inhibition of lysis, respectively. 250 µl of the prepared compound dilutions and controls were transferred to a 96 deep well plate. Staphylococcus aureus MRSA strain (USA300 isolate) was scraped from fresh Orientation Agar plates, suspended in saline solution with the turbidity adjusted to OD610 of 0.1 (corresponds to 0.5 McFarland scale). Subsequently bacterial suspensions were diluted 100× in CA-MHB and mixed 1:1 with the compound dilutions, resulting in a 2-fold dilution of the latter. Plates were incubated for 18 h at 37° C., 600 rpm, after which cultures were filter sterilized using a 96 well, 0.2 µm filter plate (Corning) stacked on top of a receiver plate by centrifugation at 4500 rpm for 2 min, rt. The hemolytic activity was assessed using a modification of the protocol described by Sully et al. In brief, defibrinated rabbit blood (10% washed pooled cells, Rockland) were diluted 1:5 in PBS to a cell concentration of 2%. The diluted filtrate including the toxins were mixed 1:1 with the red blood cells (100 µl each). Reactions were mixed by gentle pipetting and incubated at 37° C. for 1 h. After incubation, the plates were centrifuged at 1000×g for 5 min at rt. 30 µL aliquots of the supernatants were transferred to a 96-well U-bottom plate and the absorbance at 405 nm was measured. Values of the complete inhibition control (HTS007753) were subtracted from experimental data and subsequently the difference was normalized to the values of the no inhibition control (DMSO). These values were plotted against the concentration of the test compound to generate an inhibitory concentration response curve, which was fitted to a four-parameter logistic model (IC50; eC95) using GraphPad. Minimal effective concentration (MEC) was directly determined from the raw data, as the compound concentrations resulting in an absorbance of <2× the average of the complete inhibition control. The lower the values, the more active the compound.

TABLE 3

Biological data obtained by hemolysis assays for very preferred compounds of formula (I).

| | Hemolysis assay I | | Hemolysis assay II | | |
|---|---|---|---|---|---|
| Compound | $EC_{50}$ [at 10 µM of cpd] | $IC_{50}$ [µM] | $IC_{50}$ [µg/ml] | $IC_{95}$ [µg/ml] | MEC [µg/ml] |
| Savirin | 0.86 | 15 | 2.6 | 7.8 | 8 |
| 1 | 3 | | 1.1 | 2.95 | 4 |
| 2 | 3 | | 0.85 | 2.5 | 2 |
| 3 | 3 | 5 | 1.65 | 3.45 | 4 |
| 4 | 3 | | 2.3 | 5.2 | 8 |
| 5 | 0.98 | 6 | 2.05 | 11.65 | 6 |
| 7 | | | 1.7 | 4.8 | 4 |
| 8 | 3 | | 2.2 | 3.8 | 4 |
| 12 | 3 | 1.3 | 0.85 | 2.75 | 3 |
| 18 | 3 | 0.8 | 0.95 | 2.75 | 3 |
| 21 | | | 1.5 | 3.4 | 4 |
| 26 | 3 | 0.7 | 1 | 4.15 | 6 |
| 27 | | | 0.15 | 1.9 | 2 |
| 28 | | | 2 | 4.5 | 8 |
| 34 | 2 | 5 | 0.9 | 3.2 | 4 |
| 35 | 3 | 1.5 | 1.25 | 3.7 | 4 |
| 36 | 3 | 2.8 | 1.7 | 4.5 | 4 |
| 37 | 3 | 1.5 | 1.25 | 3.65 | 4 |
| 38 | 3 | | 1.4 | 4.6 | 4 |
| 39 | 3 | 0.8 | 0.8 | 3.25 | 4 |
| 40 | | | 1.05 | 4.4 | 3 |
| 41 | | | 0.65 | 2.5 | 2 |
| 42 | | | 2.05 | 10.05 | 6 |
| 43 | | | 0.8 | 3.5 | 2 |
| 44 | | | 1.85 | 7.2 | 6 |
| 45 | | | 1.7 | 8.85 | 6 |
| 46 | | | 0.4 | 1.4 | 1 |
| 47 | | | 0.5 | 1.95 | 2 |
| 48 | | | 1.6 | 7 | 8 |
| 49 | | | 0.75 | 4.5 | 3 |
| 50 | | | 1.05 | 3.75 | 3 |
| 51 | | | 1.9 | 5.25 | 6 |
| 52 | | | 1.95 | 6.1 | 6 |
| 53 | | | 0.7 | 2.2 | 2 |
| 55 | | | 1 | 2.45 | 3 |
| 58 | | | 0.9 | 4.1 | 4 |
| 59 | | | 2.6 | 6.5 | 8 |
| 60 | | | 1 | 3.05 | 3 |

Quantitative RT-PCR Analysis for psma and RNAIII:

Overnight cultures of MRSA (USA300 isolate) were inoculated into 100 mL Erlenmeyer flasks containing 25 mL of fresh TSB with a starting $OD_{600}$ of 0.05. Cultures were grown at 220 rpm at 37° C. until reaching an $OD_{600}$ of 0.5. One milliliter of the mid-log culture was transferred into each well of a 12-well plate and 10 µM compound or 1% v/v DMSO were added. Cultures were grown for two hours at 300 rpm shaking at 37° C. The cells were collected by centrifugation, the cell metabolism and RNA degradation were stopped by addition of 500 µL RNAlater and the total RNA was extracted using a PureLink RNA minikit (Ambion) according to the manufacturer's recommendations. Residual DNA contaminations were removed using a Turbo DNA-free kit (Ambion). Quantitative reverse transcription-PCR (qRT-PCR) was performed using a GoTaq 1-Step RT-qPCR System kit (Promega) on a CFX96 Real Time PCR Detection System (BioRad). Extracted RNA (25 ng) was mixed with 10 µL of GoTaq MasterMix, 1 µL of 8 µM primers, 0.4 µL of GoScript RT mix and 0.3 µL of carboxy-X-rhodamine (CXR) standard dye in a total volume of 20

µL. As a housekeeping gene, the RNA polymerase sigma factor D (rpoD) was quantified and psma and RNAIII expression was normalized to rpoD using the comparative ΔΔCT (where CT is threshold cycle) method.

Sequence information of probes used in qRT-PCR for transcript detection (5'-3'):

```
psmα-fw
                                      (SEQ ID NO: 1)
TATCAAAAGCTTAATCGAACAATTC;

psmα-rev
                                      (SEQ ID NO: 2)
CCCCTTCAAATAAGATGTTCATATC;

RNAIII-fw
                                      (SEQ ID NO: 3)
TTCACTGTGTCGATAATCCA;

RNAIII-rev
                                      (SEQ ID NO: 4)
TGATTTCAATGGCACAAGAT;

rpoD-fw
                                      (SEQ ID NO: 5)
GAGGATCAGGAAGCACAAAGTC;

rpoD-rev
                                      (SEQ ID NO: 6)
GCCGTCATCAAGACCAAATC.
```

TABLE 4

Biological data for AgrA target gene expression in the presence of very preferred compounds of formula (I).

| Compound | Downregulation of psmα expression at 10 µM | Downregulation of RNAIII expression at 10 µM |
| --- | --- | --- |
| Savirin | + | 0 |
| 3 | ++ | ++ |
| 5 | ++ | + |
| 12 | ++ | ++ |
| 18 | ++ | ++ |
| 26 | ++ | ++ |
| 34 | ++ | ++ |

The main effector of AgrA is RNAIII which is under the control of P3 promoter (see FIG. 1). RNAIII itself is then responsible for the regulation of a plethora of virulence genes including α-hemolysin. In contrast, psma is directly regulated by AgrA. Both genes are significantly less expressed in the presence of strong AgrA inhibitors. Legend: 0=downregulation between 0 and 10-fold, + downregulation>10-fold (1 $\log_{10}$), ++ downregulation>100-fold (2 $\log_{10}$). All tested compounds are significantly more potent in downregulating psma and RNAIII than Savirin.

Expression and Purification of AgrAc:

To produce $^{15}$N-labeled C-terminal domain of AgrA (AgrAc), *Escherichia coli* BL21(DE3) cells were grown in a M9-based semi-rich medium: M9 medium supplemented with [$^{15}$N]—NH$_4$Cl (1.5 g/liter), unlabeled D-glucose (4 g/liter), Isogro-$^{15}$N Powder-Growth medium (1 g/liter, 10%; Sigma-Aldrich). When the optical density at 600 nm reached the value of ~0.8-1.0, the temperature was lowered to 18° C. and the protein production was induced with 0.4 mM isopropyl-β-D-1-thiogalactopyranoside. Cells were harvested by centrifugation at 20 hours postinduction, resuspended in the lysis buffer [50 mM Na$_2$HPO$_4$/NaH$_2$PO$_4$ (NaPi) pH7.8, 500 mM NaCl, Proteases inhibitors cocktail (Complete EDTA-free, Roche)] and lysed using a homogenizer (20000 psi). Following removal of cell debris by centrifugation (30,000×g), the resulting supernatant was submitted to Ni affinity chromatography (HisTrap column, 5 ml; GE Healthcare Europe) equilibrated in [50 mM NaPi pH7.8, 500 mM NaCl]. Elution of AgrAc was performed with a sharp gradient of imidazole (0-400 mM) and the fractions were analyzed by SDS-PAGE (4-20%). Selected fractions containing $^{15}$N-AgrAc were pooled and dialyzed against 50 mM NaPi, pH 6.8, 100 mM NaCl, 4 mM DTT. The protein was concentrated up to 200 µM using a Vivaspin Turbo 4 concentrator (cutoff, 5 kDa, Sartorius Stedim Biotech, Aubagne, France), filtered at 0.2 µm, flash frozen in liquid nitrogen, and then stored at −80° C. Protein concentration was estimated based on its UV absorbance at 280 nm.

The invention claimed is:
1. A compound of formula (I)

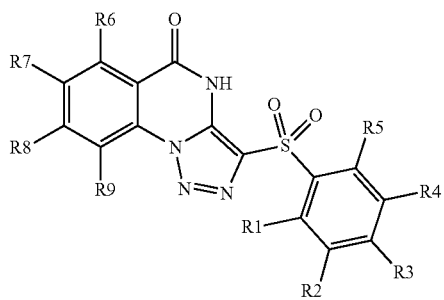

(I)

wherein
R1 is independently selected from halogen, hydroxyl, $NO_2$, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$SO_2$—N(R14)-C(O)—R15, —$C_n$-alkyl-N(R14)—C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3, —O—$C_n$-alkyl-R18 with n=0-3, —OPO(OR10)$_2$, —PO(OR10)$_2$, and a heterocycle optionally substituted by one or more R17;

R5 is H;

R3 is selected from halogen, hydroxyl, $NO_2$, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$SO_2$—N(R14)-C(O)—R15, —$C_n$-alkyl-N(R14)—C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3, —O—$C_n$-alkyl-R18 with n=0-3, —OPO(OR10)$_2$, —PO(OR10)$_2$, and a heterocycle optionally substituted by one or more R17;

R2 and R4 are independently selected from H, halogen, and $C_1$-$C_6$-alkyl optionally substituted by one or more R11;

R6, R7, R8 and R9 are independently selected from H, halogen, hydroxyl, $NO_2$, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$SO_2$—N(R12)(R13), —$SO_2$—N(R14)-C(O)—R15, —$C_n$-alkyl-N(R14)-C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3, —O—$C_n$-alkyl-R18 with n=0-3, —OPO(OR10)$_2$, —PO(OR10)$_2$, and a heterocycle optionally substituted by one or more R17;

R10 is selected from H and $C_1$-$C_6$-alkyl optionally substituted by one or more R11, R11 is independently selected from Cl, F and hydroxy;

R12, R13, R14, R15 and R16 are independently selected from H, $C_1$-$C_6$-alkyl optionally substituted by one or more R11, $C_3$-$C_6$-cycloalkyl optionally substituted by one or more R11, —$SO_2$—$C_1$-$C_6$-alkyl optionally substituted by one or more R11, or wherein said R12 and R13 together with the nitrogen to which they are attached form a heterocycle optionally substituted by one or more R17;

R17 is independently selected from halogen, hydroxy, $NO_2$, CN, —N(R12)(R13), —C(O)—R16, —C(O)—OR16, —$C_n$-alkyl-OR16 with n=0-3, $C_1$-$C_6$-alkyl optionally substituted by one or more R11, and $C_1$-$C_6$-alkoxy optionally substituted by one or more R11;

R18 is selected from —N(R12)(R13), —OR10, —C(O)—R16, —C(O)—OR16, —C(O)—N(R12)(R13), CN, and a heterocycle optionally substituted by one or more R17;

wherein, if R3 is methyl and R1 is methyl, then at least one of said R2, R4 to R9 is not H; and pharmaceutically acceptable salts, stereoisomers, enantiomers, tautomers of the compounds of formula (I).

2. The compound according to claim 1, wherein said R2 and R4 are H.

3. The compound according to claim 1, wherein at least one of said R6, R7, R8 and R9 is not H.

4. The compound according to claim 1, wherein said R1 is independently selected from $C_1$-$C_6$-alkyl optionally substituted by one or more R11, halogen and $C_1$-$C_6$-alkoxy.

5. The compound according to claim 1, wherein said R1 is independently selected from $C_1$-$C_2$-alkyl, $CF_3$ and halogen.

6. The compound according to claim 1, wherein said R3 is selected from halogen, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —N(R12)(R13), —C(O)N(R12)(R13), —N(R14)-C(O)—R15, —C(O)—OR16, —O($C_1$-$C_3$-alkyl-O)$_n$—$C_1$-$C_3$-alkyl-OR10 with n=0-3, $C_1$-$C_3$-alkyl-O—$C_1$-$C_3$-alkyl, —OPO(OR10)$_2$, —PO(OR10)$_2$, and 5 to 6 membered heterocycle optionally substituted by one or more R17, wherein said heterocycle is aromatic, partially saturated or fully saturated and contains 1 to 4 nitrogen hetero atoms.

7. The compound according to claim 1, wherein said R3 is selected from $C_1$-$C_3$-alkyl; and $C_3$-$C_5$-cycloalkyl wherein said $C_3$-$C_5$-cycloalkyl is optionally substituted by one to three R11.

8. The compound according to claim 1, wherein said R6, R7, R8 and R9 are independently selected from H, halogen, CN, hydroxyl, $C_1$-$C_3$-alkyl optionally substituted by one or more F or hydroxyl, $C_1$-$C_3$-alkoxy optionally substituted by one or more F, $C_3$-$C_6$-cycloalkyl, —O($C_1$-$C_3$-alkyl-O)$_n$—$C_1$-$C_3$-alkyl-OR10 with n=0-3, —$C_n$-alkyl-OR16 with n=0-3, —NH—$C_n$-alkyl-R18 with n=0-3; —O—$C_n$-alkyl-R18 with n=0-3, and a heterocycle optionally substituted by one or more R17.

9. The compound of claim 1, wherein the compound is selected from 7-chloro-3-(2,4-dimethylphenyl)sulfonyl-4H-triazolo[1,5-a]quinazolin-5-one;
6-chloro-3-(2,4-dimethylphenyl)sulfonyl-4H-triazolo[1,5-a]quinazolin-5-one;
8-chloro-3-(2,4-dimethylphenyl)sulfonyl-4H-triazolo[1,5-a]quinazolin-5-one;
9-chloro-3-(2,4-dimethylphenyl)sulfonyl-4H-triazolo[1,5-a]quinazolin-5-one;
3-(2,4-dimethylphenyl)sulfonyl-8-methoxy-4H-triazolo[1,5-a]quinazolin-5-one;
3-(2,4-dimethylphenyl)sulfonyl-5-oxo-4H-triazolo[1,5-a]quinazoline-8-carbonitrile;
3-(2,4-dimethylphenyl)sulfonyl-8-fluoro-4H-triazolo[1,5-a]quinazolin-5-one;
8-methoxy-3-(2-methoxy-4-methyl-phenyl)sulfonyl-4H-triazolo[1,5-a]quinazolin-5-one;
3-(4-isopropoxy-2-methyl-phenyl)sulfonyl-8-methoxy-4H-triazolo[1,5-a]quinazolin-5-one;
3-(2-chloro-4-methyl-phenyl)sulfonyl-8-methoxy-4H-triazolo[1,5-a]quinazolin-5-one;
3-(4-bromo-2-methyl-phenyl)sulfonyl-8-methoxy-4H-triazolo[1,5-a]quinazolin-5-one;
3-(2-fluoro-4-methyl-phenyl)sulfonyl-8-methoxy-4H-triazolo[1,5-a]quinazolin-5-one;
8-methoxy-3-(4-methoxy-2-methyl-phenyl)sulfonyl-4H-triazolo[1,5-a]quinazolin-5-one;
N-[4-[(8-methoxy-5-oxo-4H-triazolo[1,5-a]quinazolin-3-yl)sulfonyl]-3-methyl-phenyl]acetamide;
3-(4-fluoro-2-methyl-phenyl)sulfonyl-8-methoxy-4H-triazolo[1,5-a]quinazolin-5-one;
3-(2-bromo-4-methyl-phenyl)sulfonyl-8-methoxy-4H-triazolo[1,5-a]quinazolin-5-one;
8-methoxy-3-[2-methyl-4-(trifluoromethoxy)phenyl]sulfonyl-4H-triazolo[1,5-a]quinazolin-5-one;
3-(4-chloro-2-methyl-phenyl)sulfonyl-8-methoxy-4H-triazolo[1,5-a]quinazolin-5-one;
4-[(8-methoxy-5-oxo-4H-triazolo[1,5-a]quinazolin-3-yl)sulfonyl]-3-methyl-benzonitrile;
4-[(8-methoxy-5-oxo-4H-triazolo[1,5-a]quinazolin-3-yl)sulfonyl]-3-methyl-benzoic acid;
ethyl 4-[(8-methoxy-5-oxo-4H-triazolo[1,5-a]quinazolin-3-yl)sulfonyl]-3-methyl-benzoate;
8-methoxy-3-[4-methyl-2-(trifluoromethyl)phenyl]sulfonyl-4H-triazolo[1,5-a]quinazolin-5-one;
3-(4-cyclopropyl-2-methyl-phenyl)sulfonyl-8-methoxy-4H-triazolo[1,5-a]quinazolin-5-one;
3-(4-ethyl-2-methyl-phenyl)sulfonyl-8-methoxy-4H-triazolo[1,5-a]quinazolin-5-one;
3-(2,4-dimethylphenyl)sulfonyl-7-methoxy-4H-triazolo[1,5-a]quinazolin-5-one;
8-methoxy-3-[2-methyl-4-(2H-tetrazol-5-yl)phenyl]sulfonyl-4H-triazolo[1,5-a]quinazolin-5-one;
4-[(8-methoxy-5-oxo-4H-triazolo[1,5-a]quinazolin-3-yl)sulfonyl]-3-methyl-benzamide;
8-methoxy-3-[2-methyl-4-(5-methyl-4H-1,2,4-triazol-3-yl)phenyl]sulfonyl-4H-triazolo[1,5-a]quinazolin-5-one;
3-(2-chloro-4-methyl-phenyl)sulfonyl-4H-triazolo[1,5-a]quinazolin-5-one;
3-(2,4-dimethylphenyl)sulfonyl-8-hydroxy-4H-triazolo[1,5-a]quinazolin-5-one;
3-(2-Bromo-4-methyl-phenyl)sulfonyl-4H-triazolo[1,5-a]quinazolin-5-one;
8-bromo-3-(2,4-dimethylphenyl)sulfonyl-4H-triazolo[1,5-a]quinazolin-5-one;
3-(2,4-dimethylphenyl)sulfonyl-6-methoxy-4H-triazolo[1,5-a]quinazolin-5-one;
3-(2,4-dimethylphenyl)sulfonyl-8-(3-methoxypropoxy)-4H-triazolo[1,5-a]quinazolin-5-one;
4-[[3-(2,4-dimethylphenyl)sulfonyl-5-oxo-4H-triazolo[1,5-a]quinazolin-8-yl]oxy]butanenitrile;

3-(2,4-dimethylphenyl)sulfonyl-8-iodo-4H-triazolo[1,5-a]quinazolin-5-one;
3-(2,4-dimethylphenyl)sulfonyl-8-(2-methoxyethoxy)-4H-triazolo[1,5-a]quinazolin-5-one;
3-(2-bromo-4,5-dimethyl-phenyl)sulfonyl-4H-triazolo[1,5-a]quinazolin-5-one;
8-(azetidin-1-yl)-3-(2,4-dimethylphenyl)sulfonyl-4H-triazolo[1,5-a]quinazolin-5-one;
3-(2,4-dimethylphenyl)sulfonyl-7-hydroxy-4H-triazolo[1,5-a]quinazolin-5-one;
3-(2,4-dimethylphenyl)sulfonyl-9-methoxy-4H-triazolo[1,5-a]quinazolin-5-one;
3-(2,4-dimethylphenyl)sulfonyl-8-(2-morpholinoethylamino)-4H-triazolo[1,5-a]quinazolin-5-one;
3-(2,4-dimethylphenyl)sulfonyl-8-(tetrahydropyran-4-ylamino)-4H-triazolo[1,5-a]quinazolin-5-one;
3-(2,4-dimethylphenyl)sulfonyl-9-hydroxy-4H-triazolo[1,5-a]quinazolin-5-one;
3-(2,4-dimethylphenyl)sulfonyl-8-(2-hydroxyethoxy)-4H-triazolo[1,5-a]quinazolin-5-one;
2-[[3-(2,4-dimethylphenyl)sulfonyl-5-oxo-4H-triazolo[1,5-a]quinazolin-8-yl]oxy]acetonitrile;
methyl 4-[[3-(2,4-dimethylphenyl)sulfonyl-5-oxo-4H-triazolo[1,5-a]quinazolin-8-yl]oxy]butanoate;
4-[[3-(2,4-dimethylphenyl)sulfonyl-5-oxo-4H-triazolo[1,5-a]quinazolin-8-yl]oxy]butanamide;
3-(2,4-dimethylphenyl)sulfonyl-8-hydroxy-7-methoxy-4H-triazolo[1,5-a]quinazolin-5-one;
3-(2,4-dimethylphenyl)sulfonyl-7-hydroxy-8-(2-methoxyethoxy)-4H-triazolo[1,5-a]quinazolin-5-one;
3-(2,4-dimethylphenyl)sulfonyl-8-[2-[2-(2-methoxyethoxy)ethoxy]ethoxy]-4H-triazolo[1,5-a]quinazolin-5-one;
8-[(2,2-dimethyl-1,3-dioxolan-4-yl)methoxy]-3-(2,4-dimethylphenyl)sulfonyl-4H-triazolo[1,5-a]quinazolin-5-one; and
3-(2,4-dimethylphenyl)sulfonyl-7-hydroxy-8-(2-hydroxyethoxy)-4H-triazolo[1,5-a]quinazolin-5-one.

10. The compound of claim 1, wherein:
R1 is independently selected from halogen, $C_1$-$C_3$-alkyl optionally substituted by one or more R11, or $C_1$-$C_3$-alkoxy;
R3 is selected from halogen, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —N(R12)(R13), —C(O)N(R12)(R13), —N(R14)-C(O)—R15, —C(O)—OR16, and a 5 to 6 membered aromatic heterocycle containing 1 to 4 nitrogen hetero atoms optionally substituted by one or more R17;
R5 is H;
R2 and R4 are independently selected from H, halogen, $C_1$-$C_6$-alkyl optionally substituted by one or more R11;
R6 and R9 are independently selected from H, halogen, hydroxyl, $C_1$-$C_3$-alkyl optionally substituted by one or more F, $C_1$-$C_3$-alkoxy optionally substituted by one or more F;
R7 and R8 are independently selected from H, halogen, hydroxyl, NO$_2$, CN, $C_1$-$C_6$-alkyl optionally substituted by one or more R11, $C_1$-$C_6$-alkoxy optionally substituted by one or more R11, $C_3$-$C_6$-cycloalkyl optionally substituted by one or more R11, —$C_n$-alkyl-N(R12)(R13) with n=0-3, —$C_n$-alkyl-C(O)N(R12)(R13) with n=0-3, —$C_n$-alkyl-N(R14)—C(O)—R15 with n=0-3, —$C_n$-alkyl-C(O)—OR16 with n=0-3, —O($C_1$-$C_3$-alkyl-O)$_m$—$C_1$-$C_3$-alkyl-OR10 with m=0-3, —$C_n$-alkyl-OR16 with n=0-3, —NH—$C_n$-alkyl-R18 with n=0-3, —O—$C_n$-alkyl-R18 with n=0-3, and a heterocycle optionally substituted by one or more R17;
R10 is selected from H and $C_1$-$C_6$-alkyl optionally substituted by one or more R11;
said one or more R11 is independently selected from Cl, F and hydroxy;
R12, R13, R14, R15 and R16 are independently selected from H, $C_1$-$C_6$-alkyl optionally substituted by one or more R11, $C_3$-$C_6$-cycloalkyl optionally substituted by one or more R11, —SO$_2$—$C_1$-$C_6$-alkyl optionally substituted by one or more R11, or wherein said R12 and R13 together with the nitrogen to which they are attached form a heterocycle optionally substituted by one or more R17;
said one or more R17 is independently selected from halogen, hydroxy, NO$_2$, CN, —N(R12)(R13), —C(O)—R16, —C(O)—OR16, —$C_n$-alkyl-OR16 with n=0-3, $C_1$-$C_6$-alkyl optionally substituted by one or more R11, and $C_1$-$C_6$-alkoxy optionally substituted by one or more R11;
R18 is selected from —N(R12)(R13), —OR10, —C(O)—R16, —C(O)—OR16, —C(O)—N(R12)(R13), CN, and a heterocycle optionally substituted by one or more R17; wherein
wherein, if R3 is methyl and R1 is methyl, then at least one of said R2, R4 to R9 is not H; and
pharmaceutically acceptable salts, stereoisomers, enantiomers, tautomers of the compounds of formula (I).

11. The compound of claim 1, wherein said R1 is independently selected from methyl, ethyl, CF$_3$, F, Cl, or Br.

12. The compound of claim 1, wherein said R2 and R4 is H, and wherein R1 is independently selected from $C_1$-$C_3$-alkyl optionally substituted by one or more R11, halogen or $C_1$-$C_3$-alkoxy, and wherein exactly one of said R6 to R9 is not H.

13. The compound of claim 1, wherein said R1 is selected from Cl, Br and $C_1$-$C_2$-alkyl optionally substituted by one or more F, and wherein said R3 is selected from methyl, ethyl, isopropyl, $C_3$-$C_5$-cycloalkyl optionally substituted by one or more R11.

14. The compound of claim 1, wherein one or two of said R6 to R9 is not H.

15. A pharmaceutical composition comprising at least one compound according to formula (I) of claim 1, or pharmaceutically acceptable salts, stereoisomers, enantiomers, or tautomers thereof, and a pharmaceutically acceptable excipient.

16. The pharmaceutical composition of claim 15 further comprising at least one antibiotic active against bacteria or an anti-inflammatory agent.

17. The pharmaceutical composition according to claim 16, wherein said at least one antibiotic active agent against bacteria or anti-inflammatory agent is an antibiotic active against bacteria.

18. The pharmaceutical composition of claim 17, wherein said bacteria is bacteria of a genus selected from *Staphylococcus, Streptococcus* and *Clostridium*.

* * * * *

SEQUENCE LISTING

```
<160> NUMBER OF SEQ ID NOS: 6

<210> SEQ ID NO 1
<211> LENGTH: 25
<212> TYPE: DNA
<213> ORGANISM: artificial sequence
<220> FEATURE:
<223> OTHER INFORMATION: primer psma-fw

<400> SEQUENCE: 1
tatcaaaagc ttaatcgaac aattc                                    25

<210> SEQ ID NO 2
<211> LENGTH: 25
<212> TYPE: DNA
<213> ORGANISM: artificial sequence
<220> FEATURE:
<223> OTHER INFORMATION: primer psma-rev

<400> SEQUENCE: 2 cccottcaaa taagatgttc atatc                                    25
```

```
<210> SEQ ID NO 3
<211> LENGTH: 20
<212> TYPE: DNA
<213> ORGANISM: artificial sequence
<220> FEATURE:
<223> OTHER INFORMATION: primer RNAIII-fw

<400> SEQUENCE: 3
ttcactgtgt cgataatcca                                                20

<210> SEQ ID NO 4
<211> LENGTH: 20
<212> TYPE: DNA
<213> ORGANISM: artificial sequence
<220> FEATURE:
<223> OTHER INFORMATION: primer RNAIII-rev

<400> SEQUENCE: 4
tgatttcaat ggcacaagat                                                20

<210> SEQ ID NO 5
<211> LENGTH: 22
<212> TYPE: DNA
<213> ORGANISM: artificial sequence
<220> FEATURE:
<223> OTHER INFORMATION: primer rpoD-fw

<400> SEQUENCE: 5
gaggatcagg aagcacaaag tc                                             22

<210> SEQ ID NO 6
<211> LENGTH: 20
<212> TYPE: DNA
<213> ORGANISM: artificial sequence
<220> FEATURE:
<223> OTHER INFORMATION: primer rpoD-rev

<400> SEQUENCE: 6
gccgtcatca agaccaaatc                                                20
```